(12) United States Patent
Nazarathy et al.

(10) Patent No.: US 10,496,069 B2
(45) Date of Patent: Dec. 3, 2019

(54) MULTI-DEGREE-OF-FREEDOM STABILIZATION OF LARGE-SCALE PHOTONIC INTEGRATED CIRCUITS

(71) Applicant: TECHNION RESEARCH & DEVELOPMENT FOUNDATION LIMITED, Technion, Haifa (IL)

(72) Inventors: Moshe Nazarathy, Haifa (IL); Jonathan Fisher, Givatayim (IL)

(73) Assignee: Technion research and development foundation Ltd., Haifa (IL)

( * ) Notice: Subject to any disclaimer, the term of this patent is extended or adjusted under 35 U.S.C. 154(b) by 77 days.

(21) Appl. No.: 15/314,099

(22) PCT Filed: Jun. 4, 2015

(86) PCT No.: PCT/IL2015/050572
§ 371 (c)(1),
(2) Date: Nov. 28, 2016

(87) PCT Pub. No.: WO2015/186133
PCT Pub. Date: Dec. 10, 2015

(65) Prior Publication Data
US 2017/0192408 A1    Jul. 6, 2017

Related U.S. Application Data

(60) Provisional application No. 62/008,081, filed on Jun. 5, 2014.

(51) Int. Cl.
*G05B 19/402* (2006.01)
*G05B 13/00* (2006.01)
*G05B 13/04* (2006.01)

(52) U.S. Cl.
CPC .......... *G05B 19/402* (2013.01); *G05B 13/00* (2013.01); *G05B 13/04* (2013.01);
(Continued)

(58) Field of Classification Search
None
See application file for complete search history.

(56) References Cited

U.S. PATENT DOCUMENTS

2011/0196514 A1* 8/2011 Cao ................. G05B 13/048
700/50
2011/0276180 A1* 11/2011 Seem ................. F25B 49/027
700/275

OTHER PUBLICATIONS

E. I. Ackerman and C. H. Cox, "Effect of pilot tone-based modulator bias control on external modulation link performance", 2000, IEEE, pp. 121-124. (Year: 2000).*

(Continued)

*Primary Examiner* — Qing Yuan Wu
(74) *Attorney, Agent, or Firm* — Reches Patents

(57) ABSTRACT

A method for controlling a controlled system by a control device, the method may include transmitting multiple actuation signals to multiple degree of freedom (DOF) points of the controlled system; wherein the multiple actuation signals comprise multiple alternating current (AC) components that are mutually orthogonal; measuring at least one feedback signal from at least one probe point of the controlled system; wherein a number of DOF points exceeds a number of the at least one probe point; determining, based upon the at least one feedback signal, values of line search pulses to be sent to the multiple DOF points during at least one line search iteration; and performing the at least one line search iteration.

23 Claims, 16 Drawing Sheets

(52) U.S. Cl.
CPC .......... *G05B 2219/39414* (2013.01); *G05B 2219/39415* (2013.01); *G05B 2219/39416* (2013.01); *G05B 2219/39417* (2013.01); *G05B 2219/39418* (2013.01); *G05B 2219/39419* (2013.01); *G05B 2219/39421* (2013.01); *G05B 2219/39422* (2013.01); *G05B 2219/39423* (2013.01); *G05B 2219/39424* (2013.01); *G05B 2219/39425* (2013.01); *G05B 2219/39426* (2013.01)

(56) References Cited

OTHER PUBLICATIONS

Y. Chen, X. Zhang, and D. Li, "A control system design for the optimal bias point of external modulator", 2009, ICEMI'2009, pp. 3950-3954. (Year: 2009).*

K. Padmaraju, J. Chan, L. Chen, M. Lipson, and K. Bergman, "Thermal stabilization of a microring modulator using feedback control", Dec. 2012, Optics Express, vol. 20, No. 27, pp. 27999-28008. (Year: 2012).*

Y. Zhang, L. Yu, S. Feng, and A. W. Poon, "Towards adaptively tuned silicon microring resonators for optical networks-on-chip applications", Jul./Aug. 2014, IEEE J. Sel. Top. Quantum Electron., vol. 20, No. 4, pp. 1-14. (Year: 2014).*

K. Aruyr and M. Krstic, Real-Time Optimization by Extremum Seeking Control, 2003, Wiley-Interscience. (Year: 2003).*

J. Nocedal and S. Wright, Numerical Optimization, 2006, Springer. (Year: 2006).*

* cited by examiner

Learning, during a calibration phase, a transfer function between at least one input port and multiple output ports of the control device, wherein the multiple actuation signals are provided via the multiple output ports of the control device and wherein the at least one feedback signal is received via the at least one input port of the control device. 805

Transmitting multiple actuation signals to multiple degree of freedom (DOF) points of the controlled system. The multiple actuation signals includes multiple alternating current (AC) components that are mutually orthogonal. Measuring at least one feedback signal from at least one probe point of the controlled system. A number of DOF points of the controlled system exceeds a number of the at least one probe point. 810

Determining based upon the at least one feedback signal, values of line search pulses to be sent to the multiple DOF points during at least one line search iteration. 820

Performing, the at least one line search iteration. 830

Perform a next iteration of steps 810, 820 and 830 ? 840

YES

MULTI-DEGREE-OF-FREEDOM STABILIZATION OF LARGE-SCALE PHOTONIC INTEGRATED CIRCUITS

RELATED APPLICATIONS

This patent application claims priority from U.S. provisional patent Ser. No. 62/008,081 filing date Jun. 5, 2014, which is incorporated herein in its entirety.

BACKGROUND OF THE INVENTION

Photonic Integrated Circuits (PIC) have multiple relatively slow tuning degrees of freedom (DOF), that must be adjusted in order to stabilize the PICs to their optimum operating points. Methods are needed to perform this stabilization. Without such methods, large scale integration of many photonic devices on the PIC would not be possible.

One approach is to associate with each tuning DOF a probe point and actuate feedback on the DOF based on the probe observation, but this is cumbersome and does not work well when the tuning DOFs are coupled.

SUMMARY

According to an embodiment of the invention there may be provided a method for controlling a controlled system by a control device, the method may include transmitting multiple actuation signals to multiple degree of freedom (DOF) points of the controlled system; wherein the multiple actuation signals may include multiple alternating current (AC) components that may be mutually orthogonal; measuring at least one feedback signal from at least one probe point of the controlled system; wherein a number of DOF points of the controlled system exceeds a number of the at least one probe point; determining based upon the at least one feedback signal, values of line search pulses to be sent to the multiple DOF points during at least one line search iteration; and performing, the at least one line search iteration.

The transmitting of the multiple actuation signals occurs during a first portion of a frame period; wherein the determining occurs during a second portion of the frame period and the performing of the at least one line search iteration occurs during a third portion of the frame period.

The controlled system may be a photonic integrated circuit.

The at least one line search iteration may be a back tracking line search iteration.

The at least one line search iteration may be a forward tracking line search iteration.

The method may include deciding to repeat the transmitting, the measuring, the determining and the preforming during a next frame period upon a failure of the at least one line search iteration to place the controlled system at an optimum operating point.

The method may include repeating the transmitting, the measuring, the determining and the preforming during multiple frames.

The determining of the values of the line search pulses may be responsive to a value of a multidimensional function that represents a relationship between at least one state of the at least one probe point and multiple states of the multiple DOF points.

The performing of the at least one line search iteration may include searching for an extremum of the multidimensional function.

The searching for the extremum of the multidimensional function may include determining a descent direction of the multidimensional function.

The searching for the extremum of the multidimensional function may include selecting between different types of descent direction determinations.

The determining of the values of line search pulses to be sent to the multiple DOF points during the at least one line search iteration may be responsive to at least one of the first and second derivatives of the multidimensional function.

The multiple actuation signals may include the multiple AC components.

The multiple AC components of the multiple actuation signals may be sinusoidal waves.

The multiple AC components of the multiple actuation signals may be non-sinusoidal waves.

The multiple AC components of the multiple actuation signals may be rectangular signals.

The method may include determining the multiple actuation signals transmitted to the multiple DOF points of the controlled system.

The method may include learning, during a calibration phase, a transfer function between at least one input port and multiple output ports of the control device, wherein the multiple actuation signals may be provided via the multiple output ports of the control device and wherein the at least one feedback signal may be received via the at least one input port of the control device.

The determining of the values of line search pulses may be responsive to the transfer function.

The method may include generating the multiple AC components by summing a plurality of input AC components; wherein the input AC components may be mutually orthogonal.

According to an embodiment of the invention there may be provided a control device for controlling a controlled system, wherein the control device may include at least one input, multiple output ports, a processor and a signal generator; wherein the signal generator may be configured to transmit multiple actuation signals to multiple degree of freedom (DOF) points of the controlled system; wherein the multiple actuation signals may include multiple alternating current (AC) components that may be mutually orthogonal; wherein the processor may be configured to measure at least one feedback signal from at least one probe point of the controlled system; wherein a number of DOF points of the controlled system exceeds a number of the at least one probe point; wherein the processor may be configured to determine, based upon the at least one feedback signal, values of line search pulses to be sent to the multiple DOF points during at least one line search iteration; and wherein the signal generator and the processor may be configured to participate in a performing, of the at least one line search iteration.

The signal generator may be configured to transmit the multiple actuation signals during a first portion of a frame period; wherein the processor may be configured to perform the determining during a second portion of the frame period and the signal generator and the processor may be configured to participate in the performing, of the at least one line search iteration during a third portion of the frame period.

The controlled system may be a photonic integrated circuit.

The at least one line search iteration may be a back tracking line search iteration.

The at least one line search iteration may be a forward tracking line search iteration.

The processor may be configured to decide to repeat a transmission of multiple actuation signals, a measurement of at least one feedback signal a determining of values of line search pulses and the performing of the at least one line search iteration, during a next frame period upon a failure of the at least one line search iteration to place the controlled system at an optimum operating point.

The control device configured to repeat, during multiple frames, a transmission of multiple actuation signals, a measurement of at least one feedback signal a determining of values of line search pulses and the performing of the at least one line search iteration.

The processor may be configured to determine the values of the line search pulses in response to a value of a multidimensional function that represents a relationship between at least one state of the at least one probe point and multiple states of the multiple DOF points.

The processor may be configured to search, during at least one line search iteration, for an extremum of the multidimensional function.

The search for the extremum of the multidimensional function may include determining, by the processor, a descent direction of the multidimensional function.

The processor may be configured to select, during the search for the extremum of the multidimensional function, between different types of descent direction determinations.

The processor may be configured to determine the values of the line search pulses to be sent to the multiple DOF points during the at least one line search iteration in response to second derivatives of the multidimensional function.

The multiple actuation signals may include the multiple AC.

The multiple AC components of the multiple actuation signals may be sinusoidal waves.

The multiple AC components of the multiple actuation signals may be non-sinusoidal waves.

The multiple AC components of the multiple actuation signals may be rectangular signals.

The control device may include determining the multiple actuation signals transmitted to the multiple DOF points of the controlled system.

The control device that may be configured to learn, during a calibration phase, a transfer function between at least one input port and multiple output ports of the control device, wherein the multiple actuation signals may be provided via the multiple output ports of the control device and wherein the at least one feedback signal may be received via the at least one input port of the control device.

The processor may be configured to determine the values of line search pulses in response to the transfer function.

The control device may include a matrix for generating the multiple AC components by summing a plurality of input AC components; wherein the input AC components may be mutually orthogonal.

According to an embodiment of the invention there may be provided a non-transitory computer readable medium that stores instructions that once executed by a control device cause the control device to execute the steps of: transmitting multiple actuation signals to multiple degree of freedom (DOF) points of the controlled system; wherein the multiple actuation signals may include multiple alternating current (AC) components that may be mutually orthogonal; measuring at least one feedback signal from at least one probe point of the controlled system; wherein a number of DOF points exceeds a number of the at least one probe point; determining, based upon the at least one feedback signal, values of line search pulses to be sent to the multiple DOF points during at least one line search iteration; and performing the at least one line search iteration.

The transmitting of the multiple actuation signals occurs during a first portion of a frame period; wherein the determining occurs during a second portion of the frame period and the performing of the at least one line search iteration occurs during a third portion of the frame period.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 17 illustrates a method according to an embodiment of the invention.

DETAILED DESCRIPTION OF THE DRAWINGS

Figure 1:
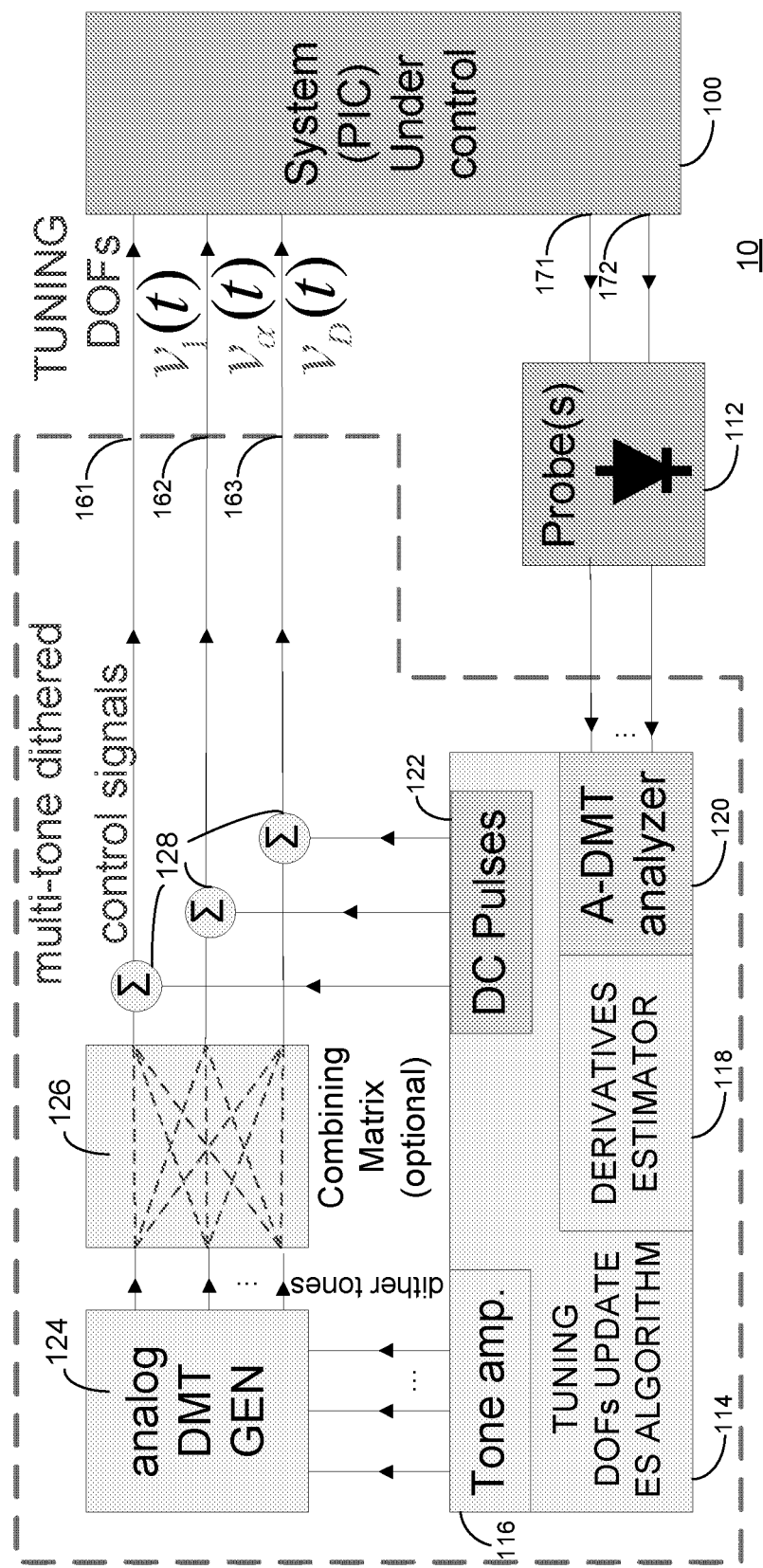
FIG. 1 illustrates a control system and a controlled system according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

Various documents are referred to.

These documents include:

[1] K. Padmaraju et al, "Wavelength Locking of Microring Resonators and Modulators using a Dithering Signal," P. 2.3, ECOC'13.

[2] C. Qiu and Q. Xu, "Ultraprecise measurement of resonance shift for sensing applications," Optics Letters 37, 5012-5014 (2012).

[3] E. Timurdogan et al, "Automated Wavelength Recovery for Microring Resonators," CLEO'12 (2012).

[4] K. Aryur and M. Krstic, Real-time Optimization by Extremum Seeking Control, Wiley 2003.

[5] Y. Li and P. Dabkus, "Silicon-Microring-Based Modulation of 120 Gbps DPSK Signal," CLEO'13 (2013).

[6] S. 6 and L. Vandenberghe, Convex Optimization, Cambridge, 2004.

[7] Scofield, John H. (February 1994). "Frequency-domain description of a lock-in amplifier". American Journal of Physics (AAPT) 62 (2): 129-133.

The following references numbers are used in the figures:
10 controlling device
11 controlling device
13 controlling device
14 controlling device
16 controlling device
100 controlled system
101 first degreed of freedom (DOF) point
102 second DOF point
103 third DOF point
104 DOF point
105 DOF point
107 DOF point
108 DOF point
109 DOF point
112 probe
114 tuning DOF upgrade extremum search (ES) algorithm
116 tone amplitude
118 derivatives estimator
120 Analog Discrete-Multi-Tone (A-DMT) analyzer
120' Digital Discrete-Multi-Tone (D-DMT) analyzer
122 DC pulse
124 digital Discrete-Multi-Tone (DMT) generator
126 combining matrix
130 ADCs
132 DACs
133 Frame synchronizer
134 DAC
136 adder
137 amplifier
138 ACC or other loop filter
161 first output of control device
162 second output of control device
163 third output of control device
171 first input of control device
172 second input of control device
180 channel estimation
182 one tap pre-equalizer
190 bypass circuit
191 switch
192 switch
310 first phase
312 second phase
313 third phase
300 frame
320 alternating current (AC) component of actuation signals
322 direct current (DC) component of actuation signals
330 line search pulses
320' AC component of actuation signals
322' DC component of actuation signals
330' line search pulses
401 first spectral component
402 second spectral component
403 third spectral component
510 backtracking line search
520 phase drift model
530 controlled system model
540 optical receiver model
550 analog to digital converter (ADC)
560 digital to analog converter (DAC)
610 graph
620 graph
710 graph
720 graph
721 mixer
722 integrate and dump (I&D)

The terms "controlled system", "device under test", "DUT", "device under control" and "DUC" are used in an interchangeable manner The term "adaptive controller", "controller" and "control device" are used in an interchangeable manner.

Methods are needed to perform stabilization of the multi-dimensional operating point of the PIC a minimum or a maximum by tuning a large number of DOFs based on observing one or a few probe point(s). Similar methods are needed in a variety of non-optical applications for stabilization to an optimum or zero (minimum or maximum=extremum) operating point of multi-dimensional systems which are not necessarily photonic. A control discipline called "Extremum-Seeking" (ES) control exists as prior art [4] but has never been applied to photonic systems with their unique characteristic. Moreover, some of the aspects of the invention are novel even in the context of prior art ES control techniques and may be applicable more generally than to optics, by substituting "general multidimensional system" for PIC.

There is provided control and calibration (C&C) systematic approach, based on refinement of extremum-seeking (ES) control and on real-time optimization techniques, aiming at feedback stabilization of relatively large scale Photonic Integrated Circuits (PIC) to their nominal operating points in D-dimensional spaces of tuning parameters. The novel methodology enables, in principle, stabilizing a large number D of tuning degrees of freedom (DOF) of PICs, with just one or a few optical power monitoring point(s). The proposed C&C digital controller ports ES concepts to photonics for the first time and is novel relative to known ES techniques, introducing a new frame-based Discrete-Multi-Tone (DMT) method of actuation signals generation and probes detection, akin to an OFDM modulation format, and in its digital frame based formulation, enabling real-time usage of unconstrained optimization techniques for memoryless maps or maps with memory in the I/O interfaces (actuators and probes). Moreover, the algorithm adaptively selects between various methods to find the descent direction (for example gradient, Newton method or similar ones) as well as various methods to find the step size in particular back tracking line search, and a novel forward tracking line search). The new technique is exemplified by numeric simulations of two C&C applications: (i): Si microrim—concurrently tuning both resonant phase and a second coupling phase parameter optimizing critical coupling into the microrim (D=2 tuning DOFs). (ii): IQ nested modulator stabilization (D=3 tuning DOFs) using a single monitoring point.

There is provided an ES control methodology and it is applied to PIC stabilization. This is based on dithering each of the tuning DOFs with low level AC signals superposed onto the slow controls applied to these tuning DOFs.

The inventors further enhanced the prior art ES control methodology with a digital iterative frame-based Discrete-Multi-Tone (DMT) novel method, akin to OFDM transmission and detection in communication theory (the key idea is to uses mutually orthogonal multitone signals as dithers superposed onto each of the tuning DOFs). This improves ES control performance significantly and enables adopting iterative methods of unconstrained optimization of memoryless maps, in order to better address the problem at hand, namely stabilization of either PICs or any generic systems with multidimensional DOFs at their optimum operating points. It should be mentioned that the method even works in the presence of memory (latency, delay-spread) of the actuation responses of the tuning DOFs and of the observation response of the probe point(s). This case of systems with interfaces which have memory is reduced to the memoryless case by using cyclic extensions of the DMT transmission frames.

Applications

Stabilization of Photonic integrated circuits (PIC) with two or more tuning DOFs, unlocking the potential of large-scale integration of PICs; any multi-dimensional generic system to be stabilized to an optimum operating point;

The suggested invention provides an adoption of ES control techniques to multi-dimensional stabilization of PICs; introduction of iterative frame-based technique based on DMT transmission and detection akin to OFDM, including mitigation of memory effects in tuning actuators and probe interfaces.

The establishment of a Moore's law in photonics is currently hindered by lack of adequate tools to reliably control the manufacturing and operation of photonic integrated circuits (PIC) scaled up to tens or hundreds of optical functional elements. Photonic circuits cascading a very large number of elements are potentially feasible today over Silicon photonics and other material platforms. Nevertheless, it is a different type of impediment that prevents the advent of integrated photonics to large-scale integration (LSI) PICs. The complexity barrier is currently posed not by optical physics but rather by control theory. Removing this complexity barrier would enable breaking away from today's "device" level, up to a "system-on-a-chip" new paradigm Towards this objective, in order to enable circuit control procedures, we shall realize essential algorithmic intelligence will be imparted to complex PICs through a novel digital control and calibration (C&C) layer. A suite of digital C&C algorithms, on the large scale has never been realized or even conceptualized, yet it is a mandatory enabling function, absolutely essential for making functionally complex large scale PICs, as the absence of such means, environmental drifts of the multiple device parameters would severely impair the intended function of the PIC. Feedback control techniques have been proposed and demonstrated for stabilizing small scale PICs such as Mach-Zehnder Modulator (MZM) or IQ modulators or microrings. In contrast, on a Large Scale Integration (LSI) PIC, each of the individual devices aboard may be in principle separately controlled/calibrated by electrically or thermally adjusting slow-phase biases. Sufficient actuating resolution is typically available by thermo-optic or electro-optic means. Unfortunately, when there are too many devices on the PIC, we simply do not know what values should the multiple bias 'knobs' be set to. The problem is further compounded by the presence of mutual coupling between the various tuning DOFs, such that tuning one of them affects some others. A procedure to accomplish PIC stabilization on a large scale does not currently exist, especially when it is further required that a limited number of (ideal a single) probe(s) be used to monitor the PIC.

There is provided a systematic algorithm approach to the multi-dimensional control of an arbitrarily large PIC with a single or a few probes. This methodology bears the potential to unlock the advent of complex LSI PICs, eventually enabling tens or even hundreds of devices on photonic circuits to be concurrently actuated by tracking a small number of probes, in order to reach the nominal operating point in the acquisition stage, whereas in the subsequent tracking stage, the PIC continually steers its actuation parameters such as to counteract the environmental disturbances.

The proposed C&C digital controller for arbitrary scale PICs is novel in various aspects including its adoption of Extremum-Seeking (ES) real-time optimization techniques, and in particular in its frame-based Discrete-Multi-Tone (DMT) generation and detection, akin to an OFDM modulation format (customary in communication theory but heretofore applied to neither PIC feedback control nor to ES control problems in any other application field), as well as in its unique adaptive signal processing methodology, such as iterative updates with dynamic selection between gradient-vs. Newton-based steepest descent and back-tracking line-search [6] or any other optimization method. In this document the principles of the new technique are introduced, then the technique is exemplified by numeric simulations for two C&C applications.

(i): Si microrim—concurrently tuning both resonant phase and a second coupling phase parameter optimizing critical coupling into the microrim (D=2 tuning DOFs). (ii): IQ nested modulator stabilization (D=3 tuning DOFs) using a single monitoring point. We mention that one feature of the proposed method is that it is possible to control D tuning DOFs based on just one or two power monitoring points. This in contrast with existing approaches whereby to stabilize D elementary photonic devices or functions on a PIC, D power monitoring points are required. Such an example would be the conventional control of an IQ modulator, whereby three monitoring photo-diodes (PD) are required for the two "children" MZM and for their 90 degrees relative phase, respectively. In contrast, our novel methodology enables controlling the three tuning DOFs of the IQ modulator with just one monitoring PD.

Thus, our method operates just based on observing the outputs of a limited number of probing points, or even just one point (avoiding placement of probes on every device on the PIC), yet we aim to eventually simultaneously adjust tens of actuators (e.g., bias phases) steering the overall photonic circuit to its optimal point in multi-dimensional parameter space. In the first mentioned application of Si photonic microring, this quality is exemplified by having just a single monitoring PD yet being able to control two phase DOFs of the microring (coupling phase and resonance phase).

Finally, a key feature of the proposed technique is that it is blind, in the sense that it may operate without explicit knowledge of the PIC tuning model (the mapping from the multiple tuning DOFs to the power of the monitoring point. Rather, the C&C system is able to "navigate" from any initial condition to a local minimum or maximum or zero (an extremum) or a null in the vicinity of the initial point in D-dimensional parameter space. In a PIC fabrication context, this implies that reasonably small deviations of the system parameters, away from the nominal multi-dimensional operating point may be automatically (blindly) corrected by the digital controller, providing that the initial condition has its local extremum still being the nominal optimal operating point of the system.

Novel Digital Realization Of Extremum Seeking Real-Time Model-Blind Optimization In this section we introduce the blind ES real-time optimization framework and our unique algorithmic approach. The description of the principles of operation aims to be self-contained, assuming no prior knowledge of control, optimization or communication theories, rather resorting to minimal background in analog and digital signal processing.

Overview of blind ES DMT frame-based C&C approach

In this sub-section we introduce a generic mathematical model for the PIC under control and overview the general approach and principles of operation of the C&C controller. FIG. 1 describes system 10 according to an embodiment of the invention.

System 10 is an ES-based Calibration and Control (C&C) system.

The proposed C&C controller acts on a generic nonlinear memoryless system map $\Box^D \rightarrow \Box^+$ (PIC device under control (DUC)), as specified by a multi-variable function $I(\phi_1, \phi_2, \ldots, \phi_D)$, to be stabilized to a local extremum point in the D-dimensional space of tuning parameters. In this generic form, the proposed C&C system may generically apply even to non-photonic applications, however for photonic applications, I typically refers to the optical power (intensity) or photo-current. In fact, given any black box with inputs (parameters) $\underline{\phi} \equiv \{\phi_1, \phi_2, \ldots, \phi_D\}$, referred to as C&C Degrees of Freedom (DOF), and assuming the system map $I(\phi_1, \phi_2, \ldots, \phi_D)$ is unknown to us, the proposed C&C digital system may be used to navigate the "black-box" output, I, to a local minimum or maximum in the vicinity of the initial condition of the vector of parameters, by iteratively adjusting the input DOFs under the adaptive C&C system control. The fact that the characteristic map $I(\phi_1, \phi_2, \ldots, \phi_D)$ is unknown is captured by the qualifier "blind" for our proposed real-time optimization algorithm In some cases, the lack of information on the system map amounts to a parameterization of a known function by a set of parameters which are be affected by unknown (random) additive disturbances, $\delta\theta_i$: $I(\phi_1, \phi_2, \ldots, \phi_D) = I(\theta_1^c + \delta\theta_1, \theta_2^c + \delta\theta_2, \ldots, \theta_D^c + \delta\theta_D)$ (1) Were the memoryless map $I(\phi_1, \phi_2, \ldots, \phi_D)$ precisely known (say analytically), then bringing it to an extremum would be a much easier problem, as in this case the partial derivatives (gradient, hessian) could be evaluated at any point on the known hyper-surface, applying an iterative unconstrained optimization algorithm such as the steepest descent one, to attain the optimum (minimum or maximum) operating point. In blind ES optimization, a key sub-task is then to evaluate the partial derivatives at the current operating point, such that iterative unconstrained optimization algorithms may be used.

In particular, for photonic C&C applications, the unknown generic map has its D inputs consisting of tuning voltages, typically applied to change interferometric tuning phases of the system via some electro- or thermo-optic effect. Notice that the system may exhibit memory effects re the propagation of high-speed modulated optical signals, however for slow "quasi-static" inputs (such as used in C&C) the PIC typically appears memoryless—this condition being satisfied to a very good approximation for most PICs. Equivalently, the system inputs are directly viewed as tuning phases rather than voltages inducing the phases. Thus, we alternatively view the tuning DOFs vector, $\underline{\phi}$, as having its components represent either voltages (potentials) or phases, depending on context. Typically, the static map from tuning DOFs to a probe intensity or optical power may be expressed in terms of a normalized power (or intensity) transmittance function, $\hat{I}(\phi_1, \phi_2, \ldots, \phi_D)$ multiplicatively relating input and output powers, $I_{in}$ and I, via, $$\hat{I}(\underline{\phi}) = I_{in}\hat{I}(\underline{\phi}) \qquad (2)$$

Extremum seeking (ES) optimization [4] is a real-time optimization technique for stabilizing a memoryless multi-dimensional, non-linear system map to a local extremum point, by evaluating the partial derivatives at each operating point along the system trajectory over the hyper-surface $\hat{I}(\underline{\phi})$ and using these partial derivative estimates to update the command phases $\underline{\theta}^c(t)$ such that the system advance towards a local extremum by applying various control policies (iterative optimization updates). The role of the dither phases, $\underline{\theta}^d(t)$, in the ES technique, is to enable the evaluation of the gradient and Hessian in every iteration by detecting the system map responses to these dither signals, from which partial derivatives information may be extracted. In fact, the ES methodology may be viewed as a multi-dimensional generalization of the one-dimensional dither techniques previously used for controlling a single tuning DOF, such as in [1].

Using an ES-based approach, D DOFs may be concurrently controlled while sensing a single (or a few) probe output(s), (with the tuning DOFs number D being in principle an arbitrary, though in practice D may typically have to be limited to the order of 10 or 100 for reasonable convergence). Here we shall conduct simulations for examples of D=2 and D=3, to exemplify the principles, but the method is extensible in principle to arbitrary D.

Viewing the tuning DOFs of the PIC as optical phases, notice that there are several generic additive components to these phase signals. The $\alpha^{th}$ DOF has phase:

$$\phi_\alpha(t) = \theta_\alpha^c(t) + \theta_\alpha^d(t) + \theta_\alpha^{env}(t) + \theta_\alpha^s(t) \cong \theta_\alpha^c(t) + \theta_\alpha^d(t) + \theta_\alpha^{env}(t), \quad (3)$$

$$\alpha = 1, 2, \ldots, D$$

where $\theta_\alpha^c(t)$ are the command phases, $\theta_\alpha^d(t)$ are the dither phases (multi-tone perturbations superimposed onto the command phases in order to enable partial derivatives estimation), $\theta_\alpha^s(t)$ are the (broadband) signal phases applied to the circuit in order to perform its intended functionality (typically a high-speed communication operation, such as modulation or other optical signal processing), and $\theta_\alpha^{env}(t)$ are additive disturbances due to environmental effects, affecting the phases induced in the optical paths. Note that $\theta_\alpha^s(t)$ was discarded to a good approximation in the second expression in (3), since the phases induced by the broadband communication signals applied to the PIC have negligible spectral content captured within the narrowband low-frequency pass-band of the relatively slow control signals $\theta_\alpha^c(t), \theta_\alpha^d(t)$ (typically up to ~MHz, sufficient for tracking environmental disturbances). To reiterate this point, the low-pass filtering effect of the C&C system essentially filters through a negligible amount of modulated power out due to the applied RF signal power, enabling to effectively set $\theta_\alpha^s(t)=0$. In case that the residual small low-frequency (random due to the randomness of the applied communication signals) fluctuations turn out to be non-negligible, we may view them as contributing to the environmental disturbances term, $\underline{\theta}^{env}(t)$, which these contributions may be lumped in.

We re-iterate that the particular structure and signal design of the ES digital controller proposed and simulated here are in fact novel, never previously introduced in the ES literature at large. The proposed digital ES controller is closer in spirit to adaptive signal processing or iterative optimization system rather than to an adaptive control one. To our knowledge, this is the first frame-based proposal porting the DMT communication concept to the realization of an ES controller. DMT is a communication technique closely related to Orthogonal Frequency Division Multiplexing (OFDM), typically used in wireline DSL communication.

Further notice that our ES system blindly is able to estimate not just the gradient (the set of first-order partial derivatives) as in "conventional" ES, but also higher-order derivatives. In practice we shall be content with estimating at most the first-order and second-order derivatives, but not extend the analysis to third-order derivatives estimation, as these higher order derivatives may be too noisy). The current approach extends prior art Newton-based estimation of the second-order derivatives [6], by performing it on a frame basis. This enables much faster iterative navigation towards the extremum point based on the estimation of the first-order as well as the second-order derivatives; knowledge of both gradient vector and hessian matrix enables the so-called Newton's method, enabling to navigate from any initial point on the system map hyper-surface to a local extremum in fewer iterations. In fact we adopt an adapting approach switching between gradient-based and, the Newton-based sub-iterations according to the local conditions on the surface. This approach is faster than a gradient-steepest descent method which is based on just first-order derivatives.

The principle of estimating the higher-order derivatives is to "lock-in" within in the probe signal, I, not just onto components at the original frequencies of the injected harmonic tones applied to the various actuating DOFs (which are indicative of partial derivatives), but also detect intermodulation tone frequencies (i.e., linear combinations with integer coefficients of the frequencies of the originally injected harmonic tones). These new inter-modulation frequencies are generated by the nonlinearity of the system map, I. It turns out that the amplitudes of the n-th order intermodulation products of the dither harmonic tones applied to each DOF, are proportional to the n-th-order derivatives of the hyperface at the operating point. Thus, $2^{nd}$ order intermodulation products (IP) are used to estimate the Hessian (matrix of second-order derivatives), $3^{rd}$ order products could be in principle used to estimate the tensor of $3^{rd}$ order derivatives, etc. One complication is that the various orders of IP, tend to fall atop each other along the frequency axis. Therefore, an ingredient of the proposed method is to select the harmonic tones applied to the DOFs onto a sparse spectral grid such that their various orders of IPs be as spectrally disjoint as possible. This objective is to be pursued, while reducing the spectral sparseness of the actuating signals as much as possible, since excess sparseness would negatively affect the time-bandwidth and system sensitivity and incur other penalties.

This completes the top-level overview of our ES controller. In the sequel we engage in more specific descriptions of the various parts of the ES C&C system.

DMT Transmitter

A key element of our proposal is to base the C&C controller on a DMT transceiver (i.e., a transmitter (Tx) and receiver (Rx)). In the current context, Tx/Rx refer to injecting control signals superposed with DMT training signals into the PIC under control and receiving the probe responses providing the feedback for the PIC stabilization. This subsection and the next one respectively describe a novel DMT adaptive digital realization of the ES controller, akin to OFDM transmission, detailing the structure and functionality of the DMT Tx and Rx modules.

We first introduce (FIGS. 1 and 3) an all-analog implementation of DMT Tx. This implementation is in turn based on a multi-tone generator (DMT GEN) with M outputs carrying sinusoidal dither voltages (one tone per DMT GEN output port) at frequencies selected from a regular spectral grid such that the dither tones are mutually orthogonal. The M ports of the DMT GEN are input into an analog linear M×D combining matrix, forming D linear combinations (weighted sums of voltages) of the multiple inputs. Each of the output ports of the synthesis matrix is applied to an actuation (tuning) port of the PIC. In addition, there are also staircase-DC command signals $\theta_\alpha^c(t)$ additively injected into the tuning ports of the PIC, e.g. via bias-Tee components in the analog realization. In this respect "stair-case-DC" means that the slowly-varying command waveforms $\theta_\alpha^c(t)$ (and their corresponding applied control voltages, $C_\alpha(t)$ are actually piecewise-constant as depicted in Fig. B, describing the "frame" temporal structure, i.e. the quasi-repetitive waveforms $C_\alpha(t)$ applied to the tuning DOFs.

In the simplest case, the synthesis matrix degenerates to the unity matrix, i.e. it may be removed. In this case, each output port of the DMT GEN is directly connected to a distinct tuning port of the PIC, applying to that port a particular dither tone, superposed onto its staircase-DC bias command voltage, assuming fixed levels over successive time intervals. We refer to this case as "one-tone-per-DOF".

Figure 2:
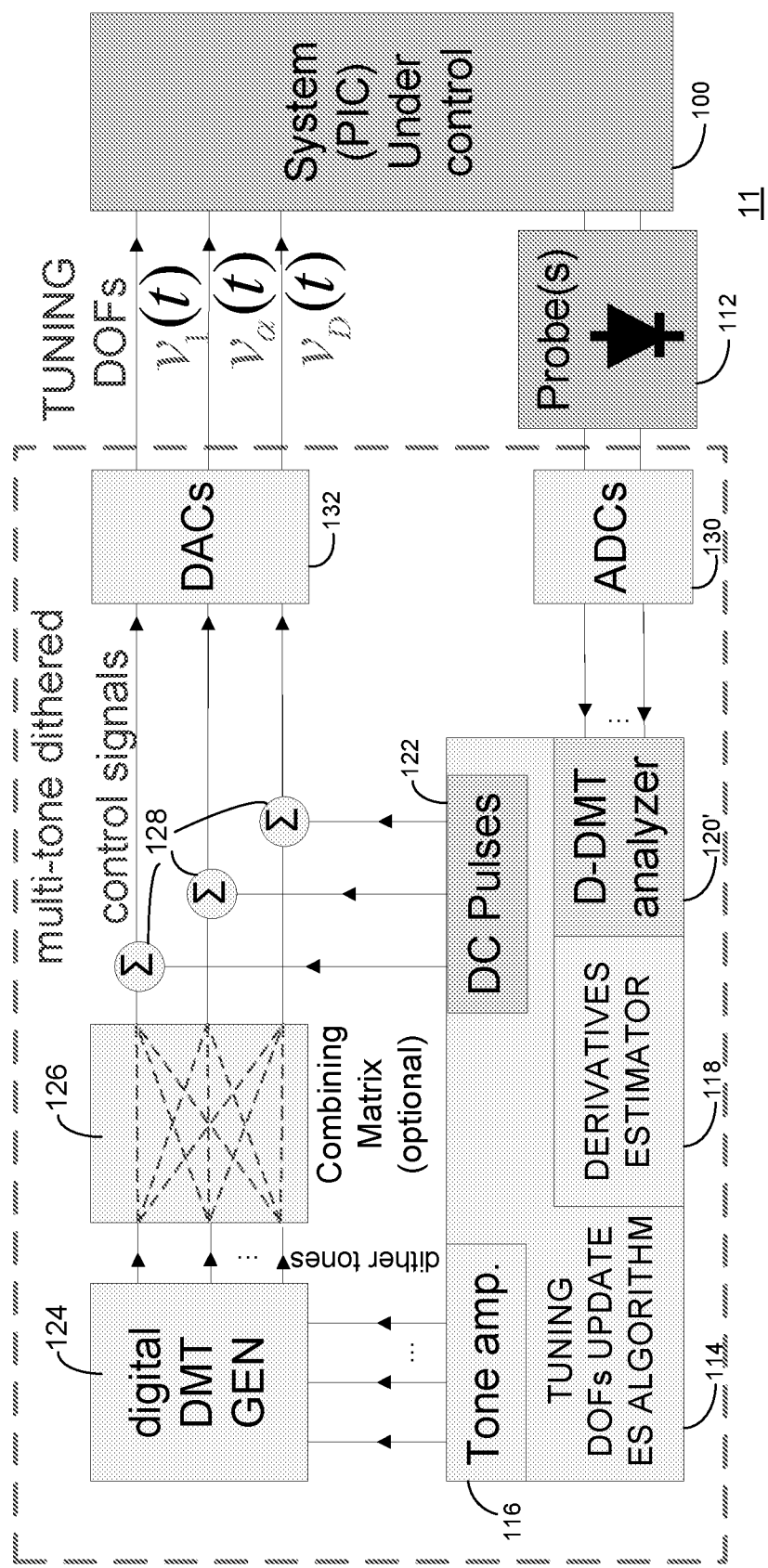
FIG. 2 illustrates a control system and a controlled system according to an embodiment of the invention.

We reiterate that the single dither tones respectively applied in this case to each the tuning ports are mutually orthogonal. In more complex configurations, each tuning port may be assigned not a single dither tone but rather a superposition of sinusoidal dither tones (with non-trivial combining matrix in as FIGS. 1 and 2) (this superposition being typically designed to be orthogonal to harmonic superpositions applied to other tuning ports), however the particular embodiments to follow will be based on the simpler unity synthesis matrix case described above (i.e., the combining matrix is removed from FIGS. 2 and 3). An exemplary large scale PIC to be controlled by means of a digital C&C controller is depicted in FIGS. 2 and 4. The C&C controller may be implemented as per the teaching of this invention, in particular comprise the sub-modules depicted in FIGS. 1-4.

In conventional DMT or OFDM transmission, as used in communication applications, a superposition of orthogonal sinusoidal tones is launched into the channel block-by-block (here the "channel" corresponds to the PIC under control). In addition, a cyclic prefix (CP) is prepended ahead of the T second DMT or OFDM symbol. The CP duration $T_{CP}$ is typically $T_{CP}<T$ and the DMT-block of duration $T_{CP}+T$ is the concatenation of the CP and the DMT-symbol.

Here each DMT block coincides with a constant level segment of duration $T_{CP}+T$ sec of the piecewise-DC command $\theta_\alpha^c(t)$ injected into the α-th tuning port of the PIC, superposed with a dither tone (or more generally with a superposition of orthogonal dither tones) $\theta_\alpha^d(t)$ serving to estimate the system map partial derivatives with respect to that DOF, as explained in section below Let us now elaborate on the the C&C transmission waveforms $\theta_\alpha^c(t)+\theta_\alpha^d(t)$ applied to the tuning DOFs. The DMT-blocks (DMT-symbols preceded by CP) are extended to variable-length frames, the sequence of which forms the complete analog waveform injected into each tuning port. These frames are structured into several intervals as detailed in FIGS. 6A and 6B.

Temporal Specification of the Frame Structure

We have already mentioned that the transmitted DMT-symbol of duration T is preceded by cyclic prefix (CP) interval (as conventionally used in OFDM or DMT transmission) intended here to absorb transients of the system response, arising whenever the end to end-system response displays memory (latency or delay spread, i.e., finite duration impulse response). The CP replicates the tail segment of the DMT-symbol (its waveform over the last $T_{CP}$ sec of the DMT-symbol). As there is an integer number of sinusoidal cycles in the DMT-symbol duration, T, for each dither tone frequency, the replication in the CP implies that the sinusoidal waveform has no discontinuity as it crosses over from the CP to the DMT-symbol.

The DMT-symbol is further followed by a Processing interval, $T_{PROC}$ serving to absorb the processing latency of the derivatives estimation as well as prepare in advance some iterative Line Search probing calculations of the algorithm. It is during the $T_{PROC}$ interval that the Derivatives Estimation (DE) is completed, as well as preparing the system for the subsequent calculation of the line search sub-iterations.

This is followed by a variable number of line search pulses, at intervals $T_{LS}$, at least having the CP duration ($T_{LS} \geq T_{CP}$). The number $n_{BTLS}$ of BTLS intervals is variable, being interactively determined as detailed in sub-section below The overall frame duration is then $$T_{FR}=T_{CP}+T_{DMT-SYM}+T_{PROC}+n_{BTLS}T_{BTLS} \qquad (4)$$

Spectral design of the DMT symbols

Figure 7:
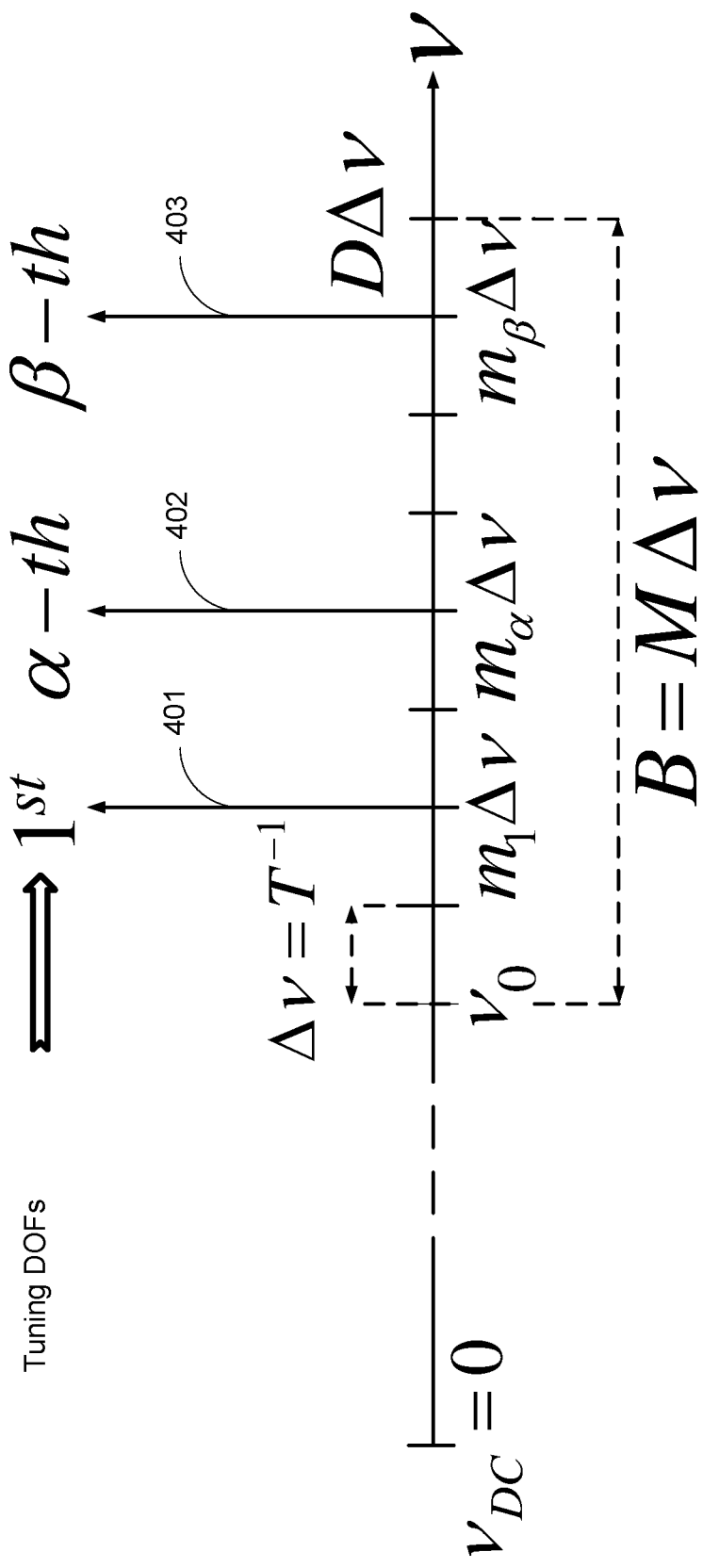
FIG. 7 illustrates a spectrum of some of the signals sent during a frame according to an embodiment of the invention.

The spectral design of the DMT symbols is depicted in FIG. 7. We transmit a line spectrum, over a frequency grid 401, 402 and 403, $$v_m = v_0 + m\Delta v = v_0 + \frac{m}{T}, m = 0, 1, 2, \ldots, M-1 \qquad (5)$$

with $v_0$ the initial frequency. The spectral components of the DMT-symbol are selected out of the grid and the selection is typically sparse (many grid frequencies are set to zero). At most M spectral positions are used, spanning the total transmission bandwidth $$B = M\Delta v = \frac{M}{T}. \qquad (6)$$

The frequency step was seen to be the inverse of the DMT-symbol duration, $T:\Delta v=T^{-1}$. Moreover, initial frequency $v_0$ is itself selected on the grid:

$$v_0 = \frac{m_0}{T},$$

$m_0$ integer. The actuation signals applied to the tuning DOFs consist of superpositions of various harmonics selected out of the frequency grid. The regular spectral grid structure ensures mutual orthogonality (over the T-interval) of the finite harmonics composing the DMT-symbol. We note that the relative phases of the sinusoidal components of the DMT-symbol are not important, hence it is convenient to take all tones generated by the DMT GEN as cosines, $\cos(2\pi v_m t)$ (i.e., set the phases of all sinusoids to zero). Each superposition of DMT GEN cosine tones (as formed at a particular output port of the synthesis matrix) amounts to generating an Analog Inverse Discrete-Cosine-Transform (A-IDCT) of a particular (typically sparse) M-dimensional input vector with elements, assigning the elements $\{A_m\}_{m=0}^{M-1}$ of the input vector as amplitudes of the various cosine tones, $A_m \cos(2\pi v_m t)$ participating in the superposition (these sinusoids are referred to as DMT-tones). The A-IDCT is formally defined for our purposes as:

$$a(t)=A\text{-IDCT}\{A_m\}=\Sigma_{m=0}^{M-1}A_m\cos(2\pi v_m t), t\in[0,T] \qquad (7)$$

As the various DMT-tones are orthogonal over the DMT-symbol duration, $$\frac{2}{T}\int_0^T \cos(2\pi \cdot v_m \cdot t)\cos(2\pi \cdot v_{m'} \cdot t) = \delta_{mm'} \qquad (8)$$

the I-ADCT may be in principle inverted by projecting its output onto the waveforms of the DMT-tones. This is an operation referred to as Analog Discrete Cosine Transform (A-DCT), recovering the original harmonic amplitudes, $A_m$, out of the time-domain A-IDCT output:

$$A_m = A\text{-}DCT\{a(t)\} = \frac{2}{T}\int_0^T a(t)\cos(2\pi \cdot v_m \cdot t) \qquad (9)$$

In particular, taking $v_m=0$, $v_m\neq 0$ the orthogonality condition (8) must be modified to read:

$$\frac{1}{T}\int_0^T \cos(2\pi \cdot v_m \cdot t) = 0 \qquad (10)$$

indicating hat each DMT tone has a null time-average over the DMT-symbol interval, [0,T] (equivalently, each DMT tone is orthogonal to DC). Although the DC tone (obtained for $v_m=0$, corresponding to a degenerate DC-harmonic $\cos(2\pi \cdot 0 \cdot t)=1$) is not explicitly included in the frequency grid (5), nevertheless each DMT-symbol generally includes a DC bias component, denoted $A_{DC}$ (this DC level, fixed over the DMT symbol interval, generally varies from one DMT-symbol to the next one). It is this sequence of staircase-DC values that is used to actuate the PIC C&C tuning. To formally account for these DC biases, the frequency grid (5) should be augmented by $v_{DC}=0$, the DC-(null) frequency.

Figures 8, 9:
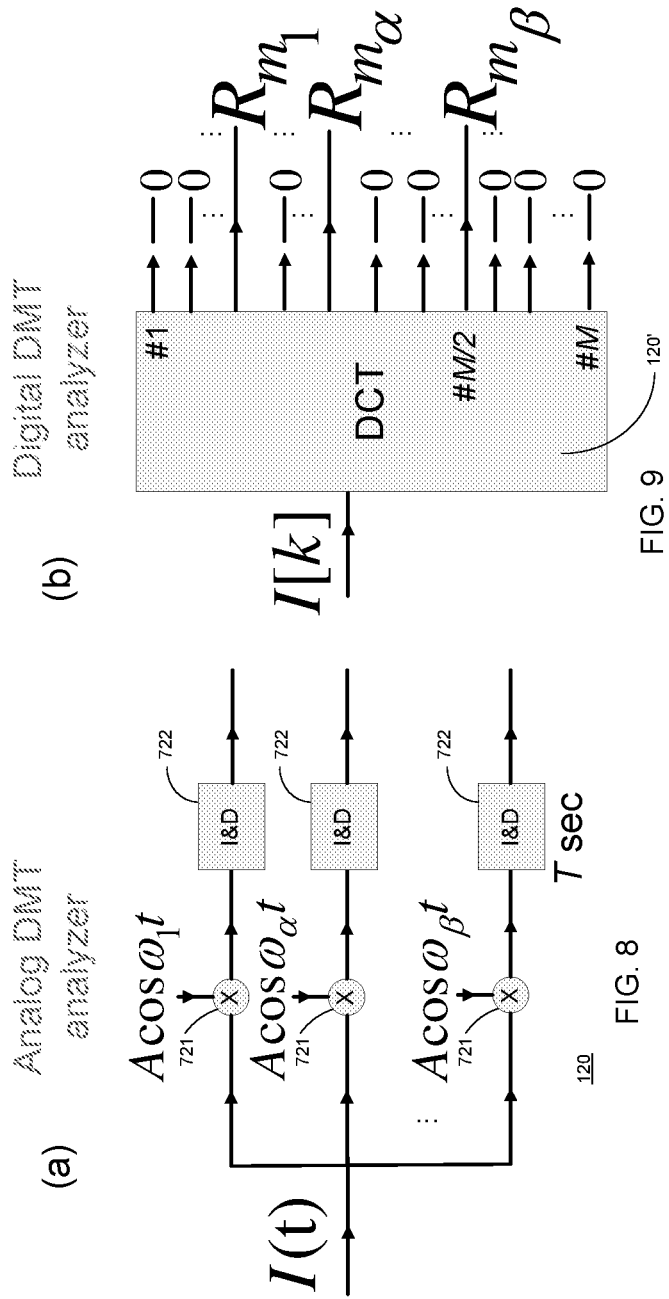
FIG. 8 illustrates an analog DMT analyzer according to an embodiment of the invention.
FIG. 9 illustrates a digital DMT analyzer according to an embodiment of the invention.

The DMT GEN in the Tx (in its most general form, comprising a non-trivial combining matrix, i.e. when multiple tones are generally injected into each tuning DOF) is equivalent to a bank of parallel A-IDCT modulators each of the outputs of which is connected to a tuning DOF of the PIC. This DMT GEN structure is depicted in FIG. 8, We refer to this analog structure as an "A-IDCT-like DMT GEN". The corresponding digital structure for the DMT GEN with multiple tones per tuning DOFs is shown in FIG. 9 and is referred to as "IDCT-like DMT GEN". The analog DMT analyzer includes multiple mixers 721 that mix a feedback signals with sinusoidal waves of different frequencies and provide the output of the multiplication to integrate and dump units 722. In FIG. 9 a digital DCT unit 120' is provided.

However, we shall typically consider the trivial case of one-tone-per DOF. In this special case the "(A-)IDCT-like DMT GEN" structure does not contribute a useful view, as there is no need for multiple (A-)IDCTs. Rather, now each tuning port is simply assigned a distinct sinusoidal tone selected out of the frequency grid (5), as generated by the analog or digital DMT GEN (see FIGS. 1-4)

Figure 3:
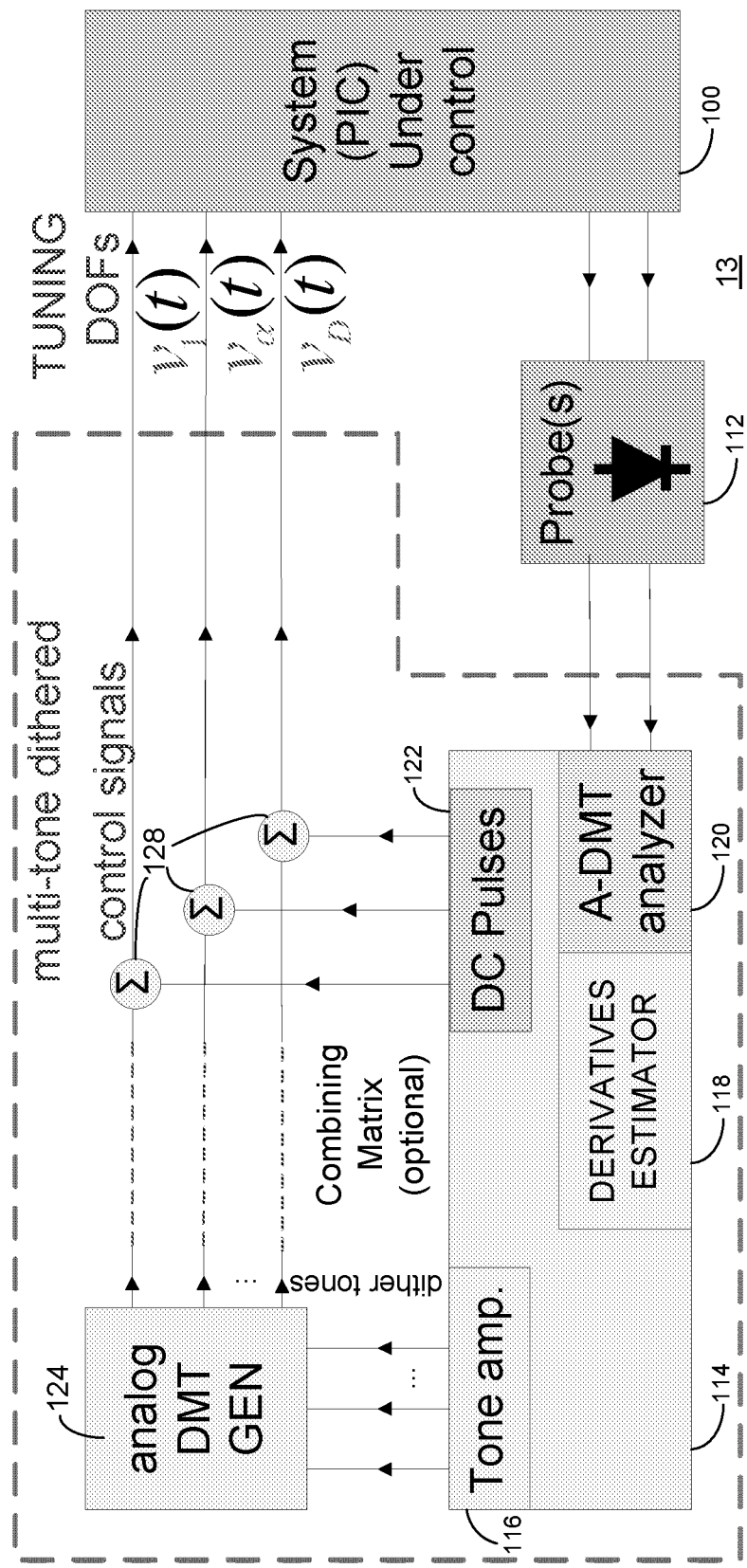
FIG. 3 illustrates a control system and a controlled system according to an embodiment of the invention.
Figure 4:
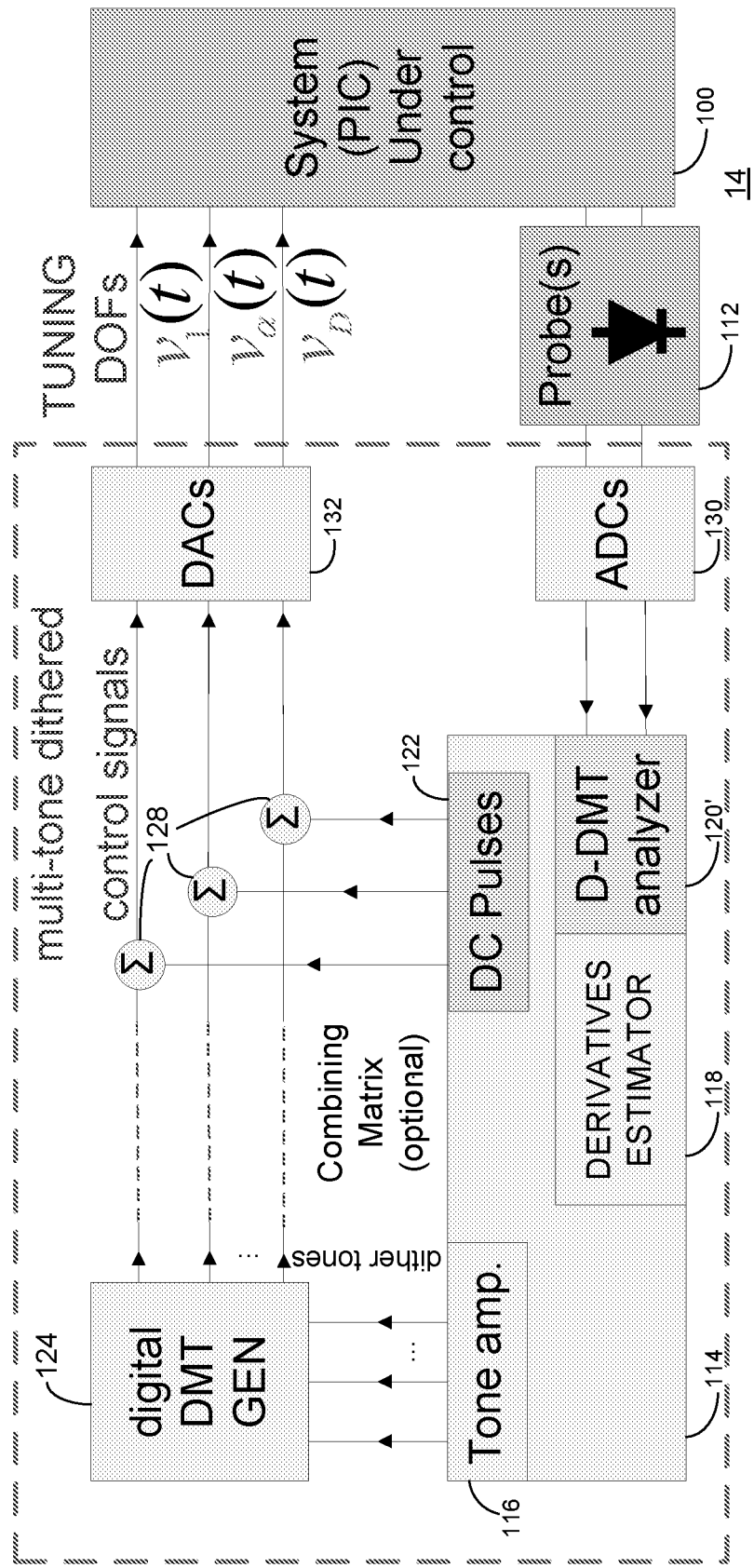
FIG. 4 illustrates a control system and a controlled system according to an embodiment of the invention.

The analog implementation of FIGS. 1 and 3 may be conveniently adopted whenever number of tones is relatively small (e.g. one or two DOFs), generating in analog fashion the DMT-tones in harmonic ratios by means of RF oscillators, based on conventional frequency-synthesis techniques. A preferred implementation is the "digital one of FIGS. 2 and 4, wherein Digital-Analog-Converters (DAC) and Analog-Digital-Converters (ADC) are introduced, but the processing is entirely performed in the discrete-time domain. Corresponding "single-tone-per-DOF" block diagrams are shown in FIGS. 3 and 4. Nevertheless, it is convenient to initially introduce the all-analog versions of the C&C system (the digital versions are further described below).

As per (5), the frequency grid contains M potential spectral locations. However, there are just D cosine tones actually applied to the D tuning DOFs. Thus, the actually applied tones typically occupy just a sparse sub-set out of the full frequency grid, indexed as follows:

$$v_\alpha = m_\alpha \Delta v, \alpha=1,2,\ldots,D, 0\leq m_\alpha \leq M-1 \qquad (11)$$

with D<M (typically D□M) and $\alpha$ an index tagging the D tuning DOFs. This amounts to nulling out M-D of the M tone amplitudes, $A_m$. The set of analog DMT-tones generated by the DMT GEN of our DMT Tx is then $$\left\{\cos\left(2\pi \cdot \frac{m_\alpha}{T} \cdot t\right)\right\}_{\alpha=0}^{D-1}.$$

Thus, over the overall bandwidth, B, we have a sparse regular line spectrum (FIG. 7). The sparse spectral design implies that D□M, thus the spectral picture is that of a mostly void regular spectral grid, with D non-zero lines (out of the M possible spectral locations) whereat there are non-null tones, each assigned to a tuning DOF. The more complex strategy is to generate, by means of the synthesis matrix, various superpositions (linear combinations) of DMT-tones and assign them to tuning DOFs. For now let us adopt the single-tone-per-DOF spectral design, tagging each tuning DOF with its unique dither frequency, having mutually orthogonal tones+DC biases applied to the various tuning DOF during each DMT-symbol interval. The actuating voltage applied to the $\alpha^{th}$ DOF is:

$$v_\alpha(t) = C_\alpha[l] + A_\alpha[l]\cos(\pi m_\alpha \Delta v \cdot t),$$

$$t[l] \leq t < t[l] + T \qquad (12)$$

with, l denoting the frame index, $C_\alpha[l]$ denoting the commanded constant DC bias level actuated onto $\alpha$-th tuning DOF the during the DMT-symbol interval [t[l],t[l]+T], with t[l] the start time of the l-th DMT-symbol interval and $A_\alpha[l]$ the amplitude of the DMT-tone during the l-th frame. Such time-domain waveform is visualized in FIGS. 6A and 6B. Over each DMT-symbol of duration $T=1/\Delta v$, the commanded DC offset $c_\alpha[l]$ and the tone amplitude $A_\alpha[l]$ are kept constant and these control parameters are updated by the iterative algorithms once per frame. Below we disclose the iterative optimization algorithm for the command values $C_\alpha[n]$, such that the system evolves to its local extremum as rapidly as possible.

For simplicity, the sinusoidal dither amplitudes will be typically maintained constant over all frames and/or for all tones, $A_\alpha[l]=A$ (though more sophisticated policies, varying the dither amplitudes among tones and from frame to frame may be considered).

Assuming linear electro-optic or thermo-optic effects in the PIC under control, the actuating voltages (12) are applied to the tuning ports of the PIC, induce optical phases are given by:

$$\phi_\alpha(t) = g_{Tx}^{(\alpha)} v^{(\alpha)}(t) \qquad (13)$$

where the voltage-to-phase conversion constants, $g_{Tx}^{(\alpha)}$, are typically unknown or just approximately known. In particular the sinusoidal voltage swing $A_\alpha[l]\cos(\pi m_\alpha \Delta v \cdot t)$ of the electrical dither signal induces a phase swing $\beta_\alpha[l]\cos(\pi m_\alpha \Delta v \cdot t)$, with amplitude (phase modulation index) given by:

$$\beta_\alpha[l] = g_{Tx}^{(\alpha)} A_\alpha[l] \qquad (14)$$

For PIC material platform such as Si or InP, the voltage-to-phase mapping $v^{(\alpha)}(t) \to \phi_\alpha(t)$ is nonlinear and for the low frequency dither tones it may be viewed as a memoryless nonlinear characteristic, $\phi_\alpha(t) = g_{Tx}^{(\alpha)}[v^{(\alpha)}(t)]$. In this case, $\phi_\alpha(t) = g_{Tx}^{(\alpha)}[\cdot]$ may be absorbed within a (modified) system map, which is now expressed as $I(v_1, v_2, \ldots, v_D)$, directly mapping the actuating voltages applied to the tuning ports into the observed intensity.

Notice that in model-based PIC control strategies the voltage-to-phase conversion gains or nonlinear transfer characteristics would have to be somehow estimated and calibrated out. A key advantage of a model-blind C&C approach such as ES, is that the voltage-to-phase conversion maps may be absorbed in the definition of the overall system map, I, which is unknown anyway, yet the blind algorithm is nevertheless able to navigate to a local extremum without being cognizant of the system and conversion maps.

Digital Realization of the DMT Tx

The DMT Tx description heretofore has been an analog one, The analog (superpositions of) harmonic tones actuating the various PIC tuning ports were generated by analog A-IDCT circuitry, cascading an analog DMT GEN module and the synthesis matrix. Not surprisingly, it is more convenient to realize the ES controller digitally, generating and detecting the multiple digital (poly-) harmonic discrete-time signals further equipped by data conversion interfaces (Digital to Analog Converters (DAC) and Analog to Digital Converters (ADC)), and conditioning the signals to be injected into the PIC as well as processing the probe signal(s) digitally.

It is the objective of the DMT Tx to digitally synthesize and then D/A-convert, the staircase-DC command signals plus the sinusoidal dither analog tones to be applied to the various DOFs in each DMT-symbol. In such digital implementation of the DMT Tx, it is the analog outputs of the DACs that are applied to the actuation ports of the PIC. The analog time-limited harmonic tones and superpositions thereof may be generated by DACs fed by corresponding discrete-time signals generated in a DSP processor. Accordingly, the DACs are driven by the DSP part of the DMT Tx, generating discrete-time IDCTs (rather than analog A-IDCT), as elaborated below. The digitally generated superpositions of discrete-time tones, as applied to the DACs, may be viewed as regularly spaced temporal samples of the A-IDCT collected at a sampling rate equal to the overall bandwidth, $$R_s \equiv (\Delta t)^{-1} = \frac{M}{T} = B \quad (15)$$

This sampling rate corresponds to collecting M samples per interval of T seconds. Thus the number M of possible harmonic tones in the frequency grid of bandwidth B just coincides with the number of temporal samples per DMT-symbol. The temporal sampling interval is then the inverse of the overall bandwidth:

$$\Delta t = T/M = 1/R_s = 1/B \quad (16)$$

An equivalent useful expression is the uncertainty product:

$$\Delta v \Delta t = \frac{2B}{M} \frac{1}{2B} = \frac{1}{M} \quad (17)$$

Sampling the analog cosine tones at time intervals $\Delta t$ amounts to setting $t = k\Delta t$, yielding the following expression for the $\alpha$-th discrete-time harmonic tone:

$$\cos(2\pi m_\alpha \Delta v \cdot t)|_{t=k\Delta t} = \cos[2\pi m_\alpha \Delta v \cdot k\Delta t] = \cos\left(\frac{2\pi}{M}mk\right) \quad (18)$$

Such discrete-time harmonic tones (18) may be shown to also be mutually orthogonal in the discrete-time domain, as their analog counterparts, (8), are in continuous-time:

$$\frac{2}{M}\sum_{k=0}^{M-1}\cos\left(\frac{2\pi}{M}mk\right)\cos\left(\frac{2\pi}{M}m'k\right) = \left\{\begin{array}{ll} 1 & \mathrm{mod}_M(m \pm m') = 0 \\ 0 & \mathrm{else} \end{array}\right\} \quad (19)$$

Indeed, $$\frac{2}{M}\sum_{k=0}^{M-1}\cos\left(\frac{2\pi}{M}mk\right)\cos\left(\frac{2\pi}{M}m'k\right) =$$

$$\frac{1}{M}\sum_{k=0}^{M-1}\cos\left[\frac{2\pi}{M}(m+m')k\right] + \frac{1}{M}\sum_{k=0}^{M-1}\cos\left[\frac{2\pi}{M}(m-m')k\right]$$

but if $m \pm m' = M$, then one of the terms yields $$\sum_{k=0}^{M-1}\cos\left[\frac{2\pi}{M}Mk\right] = 1,$$

thus orthogonality is lost. This indicates that unlike the case of the A-(I)DCT, when using digital DCT, we cannot use all M distinct tones but we must limit ourselves. The allowed transmitted frequencies have to ensure that all the receiver's relevant frequencies, $m_\alpha$, follow the next condition:

$$\forall \alpha \neq \alpha', \alpha, \alpha' \in \{1, 2, \ldots, D\}, \mathrm{mod}_M(m_\alpha \pm m_{\alpha'}) \neq 0 \quad (20)$$

Thus, the discrete-time harmonic tones (18), limited by condition (20), may then be adopted as a quasi-orthogonal basis, underlying (I)DCT transforms:

$$a_k = {}^k IDCT\{A_m\} = \sum_{m=0}^{M-1}A_m\cos\left(\frac{2\pi}{M}mk\right), \quad (21)$$

$$k \in \{0, 1, \ldots, M-1\}$$

$$A_m = {}^m DCT\{a_k\} = \frac{2}{M}\sum_{k=0}^{M-1}a_k\cos\left(\frac{2\pi}{M}mk\right),$$

$m$ meets *cond.* 20 where the left superscripts denote the output indexes of the respective transforms. We reiterate that the number of discrete time samples must be double that of the frequency samples.

Notice that the sampling rate (15) is actually the Nyquist sampling rate for the A-IDCT signal a(t) (7), equal to the spectral width of the DMT frequency grid (5), which is band-limited to the spectral support $[v_0, v_0+M\Delta v]=[v_0, v_0+B]$.

Consistent with the Nyquist sampling theorem, it is possible, in principle, to digitally synthesize the discrete-time samples $a_k=a(k\Delta t)=a(kT/M)$ and then reconstruct the analog A-IDCT signal by ideal D/A conversion. Thus, the DSP-version of the DMT Tx may be conceptually viewed as just providing an alternative implementation of the A-IDCT. Consistent with this view, conceptually sampling the actuating voltages (12) applied to the tuning DOF yields the discrete-time samples:

$$v_\alpha[k] \equiv v_\alpha(k\Delta t) = C_\alpha[l] + A_\alpha[l]\cos\left[2\pi/Mm_\alpha k\right],$$

$$k[l] \leq k < k[l]+M \quad (22)$$

where is the running discrete-time index k[l]=t[l]/Δt is the discrete-time index whereat the l-th DMT-symbol commences (the corresponding analog time is t[l], an integer multiple of Δt).

The discrete-time harmonic tones $$\left\{\cos\left[\frac{\pi}{M}mk\right]\right\}_{m=0}^{M-1}$$

were seen to be the basis vectors of the DCT. In our digital realization of the DMT Tx, they are digitally synthesized in the DSP processor, e.g., by numerically controlled oscillators (NCO) playing out sampled sinusoids from memory, then passed to DACs at clock rate $$(\Delta t)^{-1} = \frac{M}{T}$$

which is M times faster than the frame rate. The DACs map the discrete-time signals (22) back into the analog A-IDCT signals (12) to be applied to the system tuning DOFs.

To this end, ideally, the DAC should have a very large number of bits and feature an ideal staircase of levels (perfect DAC linearity) and its anti-imaging (reconstruction) pulse shape should ideally satisfy the Nyquist criterion of zero inter-symbol interference, i.e. the DAC pulse shape d(t) should be orthogonal to its T-translates. The impact of non-idealities of the DAC is analyzed below, showing that non-orthogonal DAC pulse-shaping yields a delay spread (system memory) which may nevertheless be mitigated by the CP portion of the transmission frame.

The Tx side of the ES controller features an array of D DACs, one DAC assigned per DOF. In terms of implementation, the DAC sampling rates are not envisioned to exceed ~1 . . . 10 MHz. the footprint and power consumption required for the CMOS electronic integration of tens of even large numbers of DACs will be very low; arrays of tens or even hundreds of relatively slow DACs may be readily integrated within the analog part of mixed-signal ASICs.

A. Response of the PIC+Interfaces to DMT Transmit Signals

Considering now a PIC with a generally non-linear system map (including its actuation and probe interfaces), we now derive the PIC response to the D actuating signals (12) applied to its tuning DOFs. Deriving the PIC temporal response and its spectral content are essential for designing the DMT Rx and the iterative real-time optimization algorithm.

We start from the memoryless model of the PIC, in terms of the system map, $I(\underline{\phi}(t))=I(\phi_1(t),\phi_2(t),\ldots,\phi_D(t))$, where the phase waveforms are given by (3), repeated here, $$\phi_\alpha(t)=\theta_\alpha^c(t)+\theta_\alpha^d(t)+\theta_\alpha^{env}(t) \qquad (23)$$

We assume that the memoryless map $I(\phi_1, \phi_2, \ldots, \phi_D)$ is at least twice differentiable, hence it is amenable to a Taylor series expansion, around the current commanded multi-dimensional point, with the expansion taken up to second order. The first two phase terms in (23) will be assumed constant over the DMT-symbol interval (in fact constant also over the frame interval), pinned at their value at the beginning of the interval:

$$\phi_\alpha(t)|_{t \in [t[l],t[l]+T]}=\theta_\alpha^c(t[l])+\theta_\alpha^{env}(t[l])+\theta_\alpha^d(t) \qquad (24)$$

To justify this assumption we recall that the commanded phase is synthesized as a staircase DC signal, constant over the DMT-symbol interval, however the effective constancy of $\theta_\alpha^{env}(t)$ over the interval implies that the DMT-symbol duration, T, satisfy $T \sqcup B_\phi^{-1}$ where $B_\phi^{-1}$ is bandwidth of the environmental phase variations random process. In fact, slightly more stringently we require $T<T_{fr}$,| | $B_\phi^{-1}$ where $T_{fr}$ is the frame duration (including the DMT-symbol interval, T, and the CP and CS pre- and post-ambles durations). Inverting the last inequality, the slowly-varying approximation condition amounts to the following frequency-domain condition: $T^{-1}=R_s>R_{fr} \sqcap B_\phi$ where $R_s$ is the DMT symbol rate and $R_{fr}$ is the frame rate, $R_{fr} \equiv T_{fr}^{-1}<B=R_s \equiv(\Delta t)^{-1}=MT^{-1}$ and (15) was used. E.g., assuming the environmental disturbances are band-limited to $B_\phi \approx 10$ KHz requires a frame rate satisfying $R_{fr} \geq 1/16$ MHz, for the system to be effectively "frozen" over the frame interval (the environmental changes being about an order of magnitude slower), effectively presenting a memoryless map (amenable to Taylor expansion) over the frame duration. We further assume that the system map $I[\underline{\phi}]$ is practically constant over the DMT-interval and that the sinusoidal dithers, $$\theta_\alpha^c(t)=\beta_\alpha\cos(\omega_\alpha t), \omega_\alpha=2\pi\nu_\alpha t, \alpha=1,2 \qquad (25)$$

have small amplitudes $\beta_\alpha| | 1$, such that $\theta_\alpha^d(t)$ is a small perturbation to the operating point, therefore a Taylor series expansion is valid over the interval and it suffices to carry it out just up to second-order:

$$I[\underline{\phi}(t)]|_{t\in[t[l],t[l]+T]} = I[\underline{\theta}^c(t[l]) + \underline{\theta}^{env}(t[l]) + \underline{\theta}^d(t)] \qquad (26)$$
$$\cong I[\underline{\theta}^c(t[l]) + \underline{\theta}^{env}(t[l])] + \underline{g}[l]^T \underline{\theta}^d(t) +$$
$$\frac{1}{2}(\underline{\theta}^d(t))^T H[l]\underline{\theta}^d(t)$$

where the time t[l] denotes the start of the l-th DMT-symbol and $\underline{g}[l] \equiv \nabla I(\underline{\phi}[l])$ is the gradient vector at the operating point where the system is at time at time t[l]:

$$\underline{\phi}[l] \equiv \underline{\phi}(t[l]) = \underline{\theta}^c(t[l]) + \underline{\theta}^{env}(t[l]) \qquad (27)$$

The gradient vector g[l] is a D-dim. column with its α-th element given by $$g_\alpha[l] = \frac{\partial I}{\partial \phi_\alpha}(\underline{\phi}[l]).$$

The matrix $H[l] \equiv \nabla^2 I[\underline{\phi}(t[l])]$ in the second-order term in (26) is the Hessian, having as its elements the second-order partial derivatives at the operating point (27) on the memoryless map:

$$[H[l]]_{\alpha,\alpha'} \equiv \frac{\partial^2 I(\underline{\phi}[l])}{\partial \phi_\alpha \partial \phi_{\alpha'}} \qquad (28)$$

The symmetric Hessian matrix characterizes the local curvature of the hyper-surface $I[\underline{\phi}(t)]$ at the commanded+ environmentally disturbed operating point (27) $\underline{\phi}[l]$ in the l-th iteration (the operating point is assumed frozen over the duration of the l-th transmitted DMT-symbol or even more stringently over the whole frame, hence equal it its value at the beginning of the DMT-symbol). The second-order term in the Taylor expansion (26) is then a quadratic form with kernel given by the Hessian matrix.

Rather than working with the most general Taylor series expansion in D variables, let us exemplify the formalism by assuming for now D=2, in order to keep the notation tractable. Thus, in two dimensions, using a short-hand notation for first-order derivatives, $$\partial_\phi I \equiv \frac{\partial I}{\partial \phi},$$

we have:

$$I(\phi_1(t), \phi_2(t)) \cong I(\phi_1[l], \phi_2[l]) + (\partial_{\phi_1} I \quad \partial_{\phi_2} I)\Big|_{\substack{\phi_1 = \phi_1[l] \\ \phi_2 = \phi_2[l]}} \begin{pmatrix} \theta_1^d \\ \theta_2^d \end{pmatrix} + $$

$$\frac{1}{2}(\theta_1^d \quad \theta_2^d) \begin{pmatrix} \partial_{\phi_1}^2 I & \partial_{\phi_1}\partial_{\phi_2} I \\ \partial_{\phi_2}\partial_{\phi_1} I & \partial_{\phi_2}^2 I \end{pmatrix}\Big|_{\substack{\phi_1 = \phi_1[l] \\ \phi_2 = \phi_2[l]}} \begin{pmatrix} \theta_1^d \\ \theta_2^d \end{pmatrix} \quad (29)$$

Substituting the explicit sinusoidal dithers (25) into (29) and simplifying yields:

$I(\phi_1(t),\phi_2(t))$ $=I(\phi_1[l]+\beta_1\cos(\omega_1 t),\phi_2[l]+\beta_2\cos(\omega_2 t))$ $+(\partial_{\phi_1} I)\beta_1\cos(\omega_1 t)+(\partial_{\phi_2} I)\beta_2\cos(\omega_2 t)$ where we assumed that all derivatives are $+\frac{1}{2}(\partial_{\phi_1}^2 I)\beta_1^2\cos^2(\omega_1 t)+\frac{1}{2}(\partial_{\phi_2}^2 I)\beta_2^2\cos^2(\omega_2 t)$ $+(\partial_{\phi_1}\partial_{\phi_2} I)\beta_1\beta_2\cos(\omega_1 t)\cos(\omega_2 t)$ (30)

evaluated at the commanded operating point (27) in the l-th iteration (as explicitly designated by the notation in (29)).

It is apparent that there are six frequencies present in the power (or current) photo-detected at the system map output (in the probe signal), namely $\omega_1$, $\omega_2$, $2\omega_1$, $2\omega_2$, $\omega_1 \pm \omega_2$, whereby the second-harmonics and sum and difference frequencies are respectively generated by the squared terms $\cos^2(\omega_\alpha t)=\frac{1}{2}+\frac{1}{2}\cos(2\omega_\alpha t)$ (31)

and by the cross-term, $\cos(\omega_1 t)\cos(\omega_2 t)=\frac{1}{2}\cos[(\omega_1+\omega_2)t]+\frac{1}{2}\cos[(\omega_1-\omega_2)t]$ (32)

If the transfer characteristic were a planar surface, just the terms at $\omega_1$, $\omega_2$ would be present, as these terms are proportional to the first derivatives whereas higher order derivatives of a planar surface are zero. In the case of a non-linear surface, its local curvature, as manifested in non-zero second-order derivatives, generates second-harmonic and inter-modulation terms, $2\omega_1$, $2\omega_2$, $\omega_1 \pm \omega_2$ in the system map output.

Substituting (31) and (32) into (30) yields $I(\phi_1(t),\phi_2(t))$ $=B_0+B_1\cos(\omega_1 t)+B_2\cos(\omega_2 t),$ where the output tones amplitudes are given by:

$+B_{11}\cos(2\omega_1 t)+B_{22}\cos(2\omega_2 t)$ (33)

$+B_{12}\cos[(\omega_1+\omega_2)t]+B_{12}\cos[(\omega_1-\omega_2)t]$ $B_\alpha \equiv (\partial_{\phi_\alpha} I)\beta_\alpha, B_{\alpha\alpha} \equiv \frac{1}{4}(\partial_{\phi_\alpha}^2 I)\beta_\alpha^2$ $B_0 \equiv B_{11}+B_{22}, B_{12} \equiv \frac{1}{2}(\partial_{\phi_1}\partial_{\phi_2} I)\beta_1\beta_2$ (34)

It is the role of the DMT ANALYZER module of the DMT Rx, as detailed in the next section, to analyze the spectral content of the probe intensity (33), estimating the tone amplitudes $B_\alpha$, $B_{\alpha\alpha}$, $B_{12}$, $\alpha=1, 2$ at the inter-modulation frequencies $\{2\omega_1,2\omega_2,\omega_1\pm\omega_2\}=\{2m_1,2m_2,m_1\pm m_2\}\Delta\nu,$ (35)

where in the second expression we labeled the double frequency the and sum and difference frequencies by corresponding integer indexes.

The partial derivatives up to second-order may be extracted from the original and IP tone amplitudes as follows. The two first-order partial derivatives are readily estimated as $\partial_{\phi_\alpha} I = B_\alpha/\beta_\alpha, \alpha=1,2$ (36)

The first-order derivatives are seen to be determined by the ratios of the probe dither amplitude to the dither amplitudes of the tuning phases respectively applied to the two tuning DOFs. This simple relation corresponds to tone propagation through a memoryless fixed slope—the slope along an axis, i.e., the partial derivative, is just the ratio of the output to the input amplitude of the dither perturbation around the operating point of the affine map.

We may further solve the second and last expressions in (34) for the second-order partial derivatives, yielding $\partial_{\phi_\alpha}^2 I = 4B_{\alpha\alpha}/\beta_\alpha^2, \alpha=1,2$ $\partial_{\phi_1}\partial_{\phi_2} I = 4B_{12}/(\beta_1\beta_2).$ (37)

These partial derivatives, as estimated in each frame according to the last two equations, are essential for the iterative optimization algorithm to be introduced in sub-section below Orienting ourselves in the system block diagram of Fig. A for the top level view of the C&C controller, the evaluation of partial derivatives, as per the last two expressions, is carried out in the DERIVATIVES ESTIMATOR module. The calculation of the next step in the iterative real-time optimization proceeds in the TUNING DOFS UPDATE module, implementing the iterative algorithm as further described below.

B. DMT Receiver—Discrete-Cosine-Transform Based Multi-Tone Lock-in Techniques and its DFT Generalization In the sub-section below we described the DMT transmitter as a generator of staircase-DC commands (constant over each DMT-symbol interval), onto which there are superposed harmonic dither tones, which are orthogonal by design and have zero time-averages over each DMT symbol, both in the digital or analog domains. In the last sub-section we have shown that once the harmonic tones amplitudes are injected into the system tuning DOFs, the amplitudes of the sinusoidal tones induced in the probe intensity at the same frequencies equal the input tone amplitudes multiplied by transfer factors proportional to the first-order partial derivatives associated with the respective tuning DOFs. When the memoryless system map is nonlinear (i.e., its hyper-surface has local curvature at the current operating point), in addition to the original injected frequencies, new harmonic tones are further generated at intermodulation frequencies of the applied harmonic tones, with amplitudes determined by the higher-order partial derivatives of the system map. As the exciting frequencies fall on a regular grid (11), the new intermodulation products also have their frequencies falling onto the same grid. The positioning of the transmitted tones onto a regular grid ensures that all tones present in the probe signal (either filtered through or generated by intermodulation) also fall onto the same grid, thus are mutually orthogonal, which property facilitates their detection.

A-DCT-Based Analog Realization of the DMT-Analyzer

The spectral analysis of the probe intensity is carried out in the DMT ANALYZER module of the DMT Rx, tasked with measuring the complex amplitudes $B_\alpha$, $B_{\alpha\alpha}$, $B_{12}$, (34) required as inputs for the derivatives estimation ((36),(37)). All output tone amplitudes may in principle be detected by projecting the received signal onto copies of the same harmonic tones, accomplished by means of a bank of parallel correlators (inner products). These correlators may be realized either in the analog domain by means of an A-DCTs or equivalently in the digital domain by discrete-time DCTs. The tones orthogonality ensures that the detection of each tone is decoupled from that of others. Moreover, the DC bias in each DMT-symbol does not affect the tones amplitude detection, as DC signals are orthogonal to any tones on the frequency grid, therefore having the received dither tones riding on DC biases does not affect detection of the dither tone amplitudes.

To quantify the detection process, let the received analog signal at the probe output (say the photo-current or corresponding voltage) be given by:

$$r(t) = g_{Rx} I(t) + N(t) \quad (38)$$

where $g_{Rx}$ is a detection gain mapping optical power, $I(t)$ into received photo-current or voltage (e.g., considering $r(t)$ to be photo-current, then $g_{Rx}$ is the optical receiver responsivity). Applying the A-DCT onto the received electrical signal $r(t)$ (akin to (9) but in the l-th DMT-symbol interval, $[t[l],t[l]+T]$) yields for the m-th A-DCT output coefficient:

$$R_m[l] = A\text{-}DCT\{r(t)\} = \frac{2}{T} \int_{t[l]}^{t[l]+T} r(t) \cos(2\pi v_m \cdot t) dt \quad (39)$$

$$= g_{Rx} \frac{2}{T} \int_{t[l]}^{t[l]+T} I(t) \cos(2\pi v_m \cdot t) + N_m^A[l]$$

where $N_m^A[l]$ is a noise sample given by:

$$N_m^A[l] \equiv A\text{-}DCT\{N(t)\} \quad (40)$$

$$= \frac{2}{T} \int_{t[l]}^{t[l]+T} N(t) \cos(2\pi v_m \cdot t) dt$$

Let us now compactly express the probe intensity (33) as $$I(t) = I(\phi_1(t), \phi_2(t)) = B^{(0)}[l] + \Sigma_\gamma B^{(\gamma)}[l] \cos(\omega^{(\gamma)} t) \quad (41)$$

where $$\{\omega^{(\gamma)}\}_{\gamma=1}^6 \equiv \{\omega_1, \omega_2, 2\omega_1, 2\omega_2, 107_1 + \omega_2, \omega_1 - \omega_2\} \quad (42)$$

lists all the frequencies present in the probe signal, namely the original frequencies and their inter-modulations. Let $$m^{(\gamma)} \equiv \omega^{(\gamma)} / (2\pi \Delta v) \quad (43)$$

denote the indexes of the six tones present in the probe signal. i.e., $\omega^{(\gamma)} = 2\pi v_m^{(\gamma)}$. The m-th output coefficient of the A-DCT (for $m \in \{0, 1, 2, \ldots, M-1\}$), as detected in the l-th DMT-symbol interval, is then given by:

$$R_m[l] = A\text{-}DCT\{r(t)\} = \frac{2}{T} \int_0^T r(t) \cos(2\pi v_m \cdot t) \quad (44)$$

$$= g_{Rx} \frac{2}{T} \int_0^T \sum_\gamma B^{(\gamma)}[l] \cos(2\pi v_{m(\gamma)} t) \cos(2\pi v_m \cdot t) + N_m$$

where it is noted that the DC term $B^{(0)}$ elicited no contribution, as its A-DCT is null, which is a consequence of the harmonic tones having null time-averages over the T-interval:

$$A\text{-}DCT\{B^{(0)}\}|_{v_m} = \frac{2}{T} \int_0^T B^{(0)} \cos(2\pi v_m \cdot t) = 0 \quad (45)$$

Finally, using the orthogonality (8) of the harmonic tones, over T-intervals, yields:

$$R_m[l] = g_{Rx} B^{(\gamma)}[l] \delta_{m^{(\gamma)} m} + N_m^A[l] \quad (46)$$

i.e., the M-dimensional output vector generated by the A-DCT is sparse (ignoring noise), with just six non-zero values, $\{R_{m^{(\gamma)}}[l]\}_{\gamma=1}^6$, linearly related (ignoring noise), up to a constant $g_{Rx}$, to the amplitudes $B^{(\gamma)}$ of the six desired tones, as indicated in (46), which implies $$R_{m^{(\gamma)}}[l] = g_{Rx} B^{(\gamma)}[l] + N_m^A[l]. \quad (47)$$

It is then unnecessary to evaluate all M coefficients of the sparse A-DCT output, but it suffices to evaluate the particular non-zero coefficients by means of just six analog correlators:

$$R_{m^{(\gamma)}}[l] = \frac{2}{T} \int_{t[l]}^{t[l]+T} r(t) \cos(2\pi v_{m(\gamma)} \cdot t).$$

Each such correlator may be in principle implemented as an analog mixer with inputs $r(t)$, $\cos(2\pi v_{m^{(\gamma)}} \cdot t)$ followed by an analog integrate&dump module (dumping the result of the integration after each DMT-symbol and re-starting the integration in the DMT-symbol of the next frame). In the sequel we shall introduce a digital implementation for the correlators, however their analog implementation corresponds to the well-known analog measurement technique of sinusoidal tones by means of "lock-in detection" [7]. For white electrical noise, $N(t)$ at the correlators input, with one-sided spectral density $N_0$, assuming the time interval T is long (i.e. its inverse $\Delta v = T^{-1}$ is small), the correlator then behaves like a narrowband system with a "sinc" frequency response of narrow bandwidth (its first zero-crossing is at $\Delta v$), strongly suppressing the white noise, i.e., estimating the desired amplitudes with high accuracy. The variance of the A-DCT noise at the correlator output may be shown to be given by:

$$\sigma_{N_m^A}^2 = N_0/T \quad (49)$$

It is apparent that the lock-in detection, as implemented by the A-DCT analog correlators, improves in sensitivity as the DMT-symbol interval, T, is increased. However, the tradeoff is a slower response. An upper bound to increasing T is set by the requirement that the environmental phase variations ought to be effectively frozen over the integration time, i.e., the inequality $T < T_{fr} \Box B_\phi^{-1}$ be satisfied.

The A-DMT-ANALYZER module of the overall DMT Rx is depicted in FIGS. 8 and 9, based on a bank of analog correlators with sine waveforms. Such an "analog lock-in" implementation may still be useful for a low number of DOFs, however a digital DMT-ANALYZER implementation, as depicted in Fig A(b),(d) and introduced in the sequel, is generally preferable.

Partial Derivatives Estimator (DERIV_EST)

Inspecting (47), a simple estimate for desired tone amplitude $B^{(\gamma)}[l]$ (as required for the evaluations (36),(37) of the gradient and Hessian component) may be simply obtained by setting the noise to zero and solving for $B^{(\gamma)}[l]$:

$$B^{(\gamma)}[l] = R_m^{(\gamma)}[l]/g_{Rx} \quad (50)$$

It may be shown that this estimator is the maximum likelihood one. We combine this result with (36),(37), further expressing the phase modulation index as $\beta_\alpha[l] = A_\alpha[l] g_{Tx}{}^\alpha$, as per (14) where we recall that $g_{Tx}^{(\alpha)}$ was defined as the transfer factor from the $\alpha$-th actuating voltage to the corresponding phase DOF (in case the voltage to phase mapping is non-linear we take $g_{Tx}^{(\alpha)}$ as its first-order approximation and lump the rest of the nonlinearity within the system map, I):

$$\partial_{\phi_\alpha} I[l] = B^{(1|2)}[l]/\beta_{1|2}[l] = R_m{}^{1|2}[l]/(A_{1|2}[l]g_{Tx}{}^{1|2}g_{Rx}) \quad (51)$$

where the indexes vary over, $\alpha=1, 2$ and $\gamma=1, 2, \ldots, 6$ and all indexes to the left (right) of | above (which signifies exclusive OR), should be respectively used together.

Similarly, for the evaluation of second order derivatives we have:

$$\partial_{\phi_{1|2}}^2 I[l] = 4B^{(3|4)}[l]/\beta_{1|2}^2[l] = \frac{4R_m^{(3|4)}[l]}{A_{1|2}^2[l](g_{Tx}^{(1|2)})^2 g_{Rx}} \quad (52)$$

and $$\partial_{\phi_1}\partial_{\phi_2} I[l] = 4B^{(5|6)}[l]/(\beta_1[l]\beta_2[l]) = \frac{R_m^{(5|6)}[l]}{A_1[l]A_2[l]g_{Tx}^{(1)}g_{Tx}^{(2)}g_{Rx}} \quad (53)$$

It is apparent in the last equation that either the $5^{th}$ or $6^{th}$ non-zero output of the sparse list of ADFT coefficients may be used to evaluate the mixed partial derivative. It is then advantageous to average over the two redundant expression, replacing (53) by the arithmetic average of the two alternative expressions in (53):

$$\partial_{\phi_1}\partial_{\phi_2} I[l] = \frac{R_m^{(5)}[l] + R_m^{(6)}[l]}{2A_1[l]A_2[l]g_{Tx}^{(1)}g_{Tx}^{(2)}g_{Rx}} \quad (54)$$

The five equations (51),(53),(54) fully specify the partial derivatives algorithm as implemented in the DERIV_EST module featuring in the block diagram of Fig. A (in particular (51) specifies the two gradient components, whereas (53),(54) specify the three non-redundant elements of the symmetric hessian matrix of second-order derivatives). The six dominant outputs of the A-DCT then determine to the gradient and Hessian components, up to fixed proportionality constants, wherein the electro-optic conversion factors $g_{Tx}^{(\alpha)}, g_{Rx}$ may not be known precisely but may be estimated by calibration. We shall further show that determining the first-order partial derivatives up to a fixed constant (which is typically approximately known) is acceptable, since in the iterative gradient-descent algorithm the first-order derivative is multiplied by a somewhat arbitrary step size. Moreover, in the Newton-descent algorithm, the gradient column is multiplied by the inverse of the Hessian matrix, but both mathematical objects scalarly depend on the common factor $(g_{Rx})^{-1}$ appearing in all their elements, hence at least this unknown factor cancels out, but in the Newton-descent there is also an arbitrary step size, hence the uncertainty is $g_{Tx}^{(1|2)}$ is in consequential.

DCT-Based Digital Realization of the DMT-Analyzer

In the preferred digital realization of the DMT-Analyzer (extracting the probe tones amplitudes) the optical received probe signal is photo-detected then digitized by an ADC, ideally generating the following sampled version of the electrically detected analog signal r(t) (which, as we recall, denotes either the photo-current or its proportional trans-impedance amplifier generated voltage):

$$\begin{aligned}
r_k &\equiv r(k\Delta t) \\
&= g_{Rx}I(k\Delta t) + N^{ADC}(k\Delta t) \\
&= g_{Rx}B^{(0)}[l] + g_{Rx}\sum_\gamma B^{(\gamma)}[l]\cos(2\pi m^{(\gamma)}\Delta v \cdot k\Delta t) + N_k^{ADC} \\
&= g_{Rx}B^{(0)}[l] + g_{Rx}\sum_\gamma B^{(\gamma)}[l]\cos\left(\frac{2\pi}{M}m^{(\gamma)}k\right) + N_k^{ADC}
\end{aligned} \quad (55)$$

where $N^{ADC}(t) = N(t) \otimes h_{AA}(t)$ is the analog noise at the ADC output (anti-aliasing filter output, with impulse response $h_{AA}(t)$, when this filter is fed by the white noise N(t) of one-sided spectral density $N_0$) and its samples are denoted $$N_k^{ADC} \equiv N^{ADC}(k\Delta t) = N(t) \otimes h_{AA}(t)|_{t=k\Delta t} \quad (56)$$

and in the second line of (55) we substituted (41) for I(t) and sampled that expressions at $\Delta t$ intervals, yielding the following probe intensity samples, $$\begin{aligned}
I(k\Delta t) &= B^{(0)}[l] + \sum_\gamma B^{(\gamma)}[l]\cos(\omega^{(\gamma)} t)\bigg|_{\substack{\omega^{(\gamma)}=2\pi m^{(\gamma)}\Delta v \\ t=k\Delta t}} \\
&= B^{(0)}[l] + \sum_\gamma B^{(\gamma)}[l]\cos(2\pi m^{(\gamma)}\Delta v \cdot k\Delta t)
\end{aligned} \quad (57)$$

where the expression (43) for $\omega^{(\gamma)}$ was also used.

The discrete-time signal (55) at the ADC output is amenable to digital spectral analysis by transforming each DMT-symbol of M points of the received sampled sequence to the "discrete spectral domain" by applying a DCT, as defined in (21). Applying this discrete transform to $r_k$ yields:

$$R'_m[l] = {}^mDCT\{r_k\} = \frac{2}{M}\sum_{k=0}^{M-1} r_k \cos\left(\frac{2\pi}{M}mk\right), \quad (58)$$

$$m \in \{0, 1, \ldots, M-1\}$$

where a prime was added to the output, $R'_m$, in order to distinguish it from $R_m[l] = \text{A-DCT}\{r(t)\}$ which is the analog counterpart (44) of (58).

The quasi-orthonormality of the DCT kernel sequences may be formally expressed as:

$$\begin{aligned}
{}^mDCT\left\{\cos\left(\frac{2\pi}{M}nk\right)\right\} &= \frac{2}{M}\sum_{k=0}^{M-1}\cos\left(\frac{2\pi}{M}nk\right)\cos\left(\frac{2\pi}{M}mk\right) \\
&= \left\{\begin{array}{cc} 1 & \text{mod}_M(n \pm m) = 0 \\ 0 & \text{else} \end{array}\right\}
\end{aligned} \quad (59)$$

for n, m $\in \{0, 1, 2, \ldots, M-1\}$.

Notice that for n=0, (59) is equivalent to:

$$^{m}DCT\{1\} = \sum_{k=0}^{M-1} 1 \cdot \cos\left(\frac{\pi}{M}mk\right) = \delta_{0,m} \quad (60)$$

and for n=0 and m≠0 we have:

$$^{m\neq 0}DCT\{1\} = \sum_{k=0}^{M-1} \cos\left(\frac{\pi}{M}mk\right)\bigg|_{m\neq 0} = 0 \quad (61)$$

The DCT (58) of the received discrete-time signal (55) may then be simplified as follows:

$$R'_m = g_{Rx}\sum_{\gamma} B^{(\gamma)}[l]^{m}DCT\left\{\cos\left(\frac{2\pi}{M}m^{(\gamma)}k\right)\right\} + {}^{m}DCT\{N_k^{ADC}\} \quad (62)$$

Now the DCT of the DC bias term nulls out by virtue of (61), and for the DCT of the sinusoidal term we may use (59), yielding:

$$R'_m = g_{Rx}\Sigma_{\gamma} B^{(\gamma)}[l]\delta_{m^{(\gamma)},m} + N_m^{D} \quad (63)$$

wherein, using (56), we denoted the DCT of the discrete-time noise samples at the ADC output by:

$$N_m^D = {}^{m}DCT\{N_k^{ADC}\} = {}^{m}DCT\{N(t) \otimes h_{AA}(t)|_{t=k\Delta t}\} \quad (64)$$

The noise samples $N_m^D$, are to be compared with the noise samples $N_m^A$, the A-DCT (40) of the continuous time noise white noise process. In the sequel we evaluate their variances and found out that they are very close.

At the particular frequency indexes $m^{(\gamma)}$ we then have:

$$R'_{m^{(\gamma)}} = g_{Rx}B^{(\gamma)}[l] + N_{m^{(\gamma)}}^{D} \quad (65)(a)$$

whereas at indexes $m\neq m^{(\gamma)}$ we have just noise:

$$R'_{m\neq m^{(\gamma)}} = N_m^{D} \quad (65)(b)$$

The orthogonality property (59) indicates that the DCT at the Rx essentially decouples the detections of the individual sinusoidal tones present in the output probe signal of the system under test. The amplitude $B^{(\gamma)}$ of each such tone present as a frequency component in the input is separately detected as the amplitude level at the $m^{(\gamma)}$-th output port of the DCT.

Comparing (65)(a) with (47), it is seen that both expressions scale $B^{(\gamma)}[l]$ by the $g_{Rx}$ factor, just differing in their noise terms, $N_m^A$ vs. $N_m^D$, which are generated by different methods (A-DCT vs. anti-aliasing filtering, sampling and DCT). It is interesting to compare the noise variance of $N_m^A$, already evaluated in (49) as $\sigma_{N_m^A}^2 = N_0/T$, with that of $N_m^D$ which may be evaluated once an anti-aliasing filter response is assumed. Let us take the anti-aliasing filter as a rectangular pulse of one sample, duration, $\Delta t = T/M$ and amplitude $1/\Delta t$ (the impulse-response amplitude is irrelevant as it equally scales signal and noise, not affecting the SNR). Then, similarly to (49), the $\Delta t$ seconds integration window, corresponding to a convolution with the rectangular impulse response, yields at its output the noise variance $$\sigma_{N_k^{ADC}}^2 = \frac{N_0}{2\Delta t} \quad (66)$$

Moreover, after sampling of the anti-aliasing filter out by the ADC, the various noise samples, $N_k^{ADC}$, (56) are uncorrelated. Evaluating now the variance of $N_m^D$, the DCT (64) of the uncorrelated samples, $N_k^{ADC}$, yields (denoting expectation by $\langle \Box \rangle$):

$$\sigma_{N_m^D}^2 = \langle |{}^{m}DCT\{N_k^{ADC}\}|^2\rangle \quad (67)$$

$$= \left(\frac{2}{M}\right)^2 \left\langle \left|\sum_{k=0}^{M-1} N_k^{ADC}\cos\left(\frac{2\pi}{M}mk\right)\right|^2\right\rangle$$

$$= \left(\frac{2}{M}\right)^2 \sum_{k=0}^{M-1}\sum_{k'=0}^{M-1}\langle N_k^{ADC}N_{k'}^{ADC}\rangle\cos\left(\frac{2\pi}{M}mk\right)\cos\left(\frac{2\pi}{M}mk'\right)$$

$$= \left(\frac{2}{M}\right)^2 \sum_{k=0}^{M-1}\sum_{k'=0}^{M-1}\sigma_{N_k^{ADC}}^2\delta_{kk'}\cos\left(\frac{2\pi}{M}mk\right)\cos\left(\frac{2\pi}{M}mk'\right)$$

$$= \left(\frac{2}{M}\right)^2 \frac{N_0}{2\Delta t}\sum_{k'=0}^{M-1}\cos^2\left(\frac{2\pi}{M}mk\right)$$

$$= \left(\frac{2}{M}\right)^2 \frac{N_0}{2\Delta t}\frac{M}{2}$$

$$= \frac{N_0}{M\Delta t}$$

$$= \frac{N_0}{T}$$

Remarkably, the two analog and digital noise variance expressions, (49) vs. (67) are equal thus there is no difference between the A-DCT and DCT outputs, $R_m^{(\gamma)}$ vs. $R'_m^{(\gamma)}$ (65)(a) vs. (47), and we may more conveniently adopt the digital implementation and notationally drop the prime off, $R'_m^{(\gamma)}$ writing $R_m^{(\gamma)}$ for the relevant output coefficients of the DCT. The DERIV_EST module then acts on the digitally generated $R_m^{(\gamma)}$, implementing the algorithm described in (51),(53),(54) for extracting the partial derivatives of the system map, up to second-order.

Extension to more than D=2 DOFs

For simplicity, the notation used heretofore addressed the case of two DOFs, D=2. For more DOFs, the two indexes $\alpha=1, 2$ may still be interpreted as corresponding to any pairs of frequencies selected out of the D DOF frequencies. Each of the input tones generates its own output tone at the same frequency, with amplitude linear in the first partial derivative of the system map with respect to that DOF; It also generates a second-harmonic frequency with amplitude linear in the second partial derivative with respect to that DOF. Each pair of frequencies generates sum and frequency terms with equal amplitudes linear in the mixed second-order derivatives relative to the two DOF frequencies. However, for arbitrary spectral designs, multiple sum and difference frequencies of various tone pairs may overlap, falling atop each other. Nevertheless, it is possible to have sparse spectral designs such that these overlaps be avoided or at least minimized.

C. C&C Algorithms for Iterative Optimization

In our blind ES approach, as the system map is unknown, we resort to the Derivatives Estimator (fed by the estimated tone amplitudes of DMT-analyzer) to evaluate the first and second order partial derivatives (gradient and Hessian). These estimates are fed to Tuning-DOFs-update module, running an iterative real-time optimization algorithm described in this sub-section.

Our DMT frame-based approach to ES control enables adopting iterative methods of unconstrained optimization of nonlinear maps, in order to provide improved multi-DOF stabilization for PICs, or more generally for any generic systems with multi-dimensional tuning controls.

In this section we introduce our Tuning-DOFs-update module. This module iteratively generates the sequence $C_\alpha[l]$ of commands in (12), corresponding to the sequence of staircase-DC biasing levels of the command signal applied to the α-th tuning DOF. In more complex algorithms it is possible to also use a variable sequence $A_\alpha[l]$ of dither amplitudes, though for now we shall typically hold these amplitudes constant, $A_\alpha[l]=A_\alpha$, corresponding to fixed phase dither amplitudes $\beta_\alpha$ for each DOFs. Our frame-based approach to ES control enables adopting the generic recursive unconstrained optimization Algorithm 9.1 in [6], reproduced here in our notation, by adding the derivative estimation step which is not required in [6] as the objective function there is assumed known analytically, whereas in our blind ES approach the derivatives must be repeatedly estimated. Our approach then enables applying to the ES problem any embodiment of the following unconstrained optimization algorithm below (which applies to seeking either minimum or maximum extremum (or more generally null points of derivatives of various orders, including zeroth order—the signal itself), but is formulated for definiteness as "descent" algorithm, i.e. seeking a minimum—a maximum-seeking algorithm could be readily formulated by minimizing the opposite objective function −I(.)).

We reiterate that a key difference vs. the [6] unconstrained optimization algorithm is that the derivatives (gradient and Hessian) are not assumed analytically known in our blind real-time optimization algorithm, but they are rather estimated in each frame shortly after the end of DMT-symbol reception (after a small processing delay).

Generic iterative descent algorithm
for unconstrained optimization
   given a starting point $\underline{C}[0] \in \square^D$.
   (start acquisition stage)
   Initialize algorithm parameters
   repeat
   1. Measure the Partial Derivatives,
   namely the Gradient vector $g[l] \equiv \nabla I(\underline{\phi}[l])$
and if SNR is sufficient also the Hessian matrix $H[l] \equiv \nabla^2 I(\underline{\phi}[l])$,
using the novel DMT ANALYZER
   2. Determine a Descent-Direction (Update) Vector $\underline{d}[l]$
   3. Line-Search:
Determine step-size $\mu[l]$ along the current descent direction $\underline{d}[l]$
   4. Update Coefficients:

$$\underline{C}[l+1] = \underline{C}[l] + \mu[l]\underline{d}[l] \quad (68)$$

until
   (stopping criterion, specified below)
   Enter tracking stage
   Go to Initialize above but with modified initial parameters and with no stopping criterion in the repeat.

Here $\underline{C}[l] \equiv \{C_1[l], \ldots, C_\alpha[l], \ldots, C_D[l]\}$ is the l-th command vector, and $\underline{d}[l]$ is called the update-vector or direction-vector (not necessarily a unit vector) The command-vector increment from one frame to the next one is then proportional to the direction vector, but scaled by the scalar step-size, $\mu[l]$:

$$\Delta \underline{C}[l] = \underline{C}[l+1] - \underline{C}[l] = \mu[l]\underline{d}[l] \quad (69)$$

The various iterative optimization algorithms are distinguished by various rules for generating the sequences $\mu[l]$, $\underline{d}[l]$. The two relevant unconstrained optimization algorithms are the Gradient-Descent and Newton-method ones, as extensively treated in chapter 9 [6].

Unlike in [6], past the stopping point (which marks here the termination of the acquisition phase) the C&C system does not terminate its iterative search, but it rather commences its tracking phase, in principle tracking forever, i.e. oscillating around the minimum point which may be slowly drifting (until system turned off or broken). The stopping criterion may be formulated in various ways. A particular embodiment would be:

$$\{|\nabla I(\underline{\phi}[l])| \le \varepsilon_\nabla\} \text{ AND} \quad (70)$$
$$\left\{\{H[l] \succ \varepsilon_{\nabla^2} 1_D\} \text{ OR } \left\{\frac{1}{m}\sum_{i=l-m}^{l} \mu[i] < \varepsilon_\mu\right\}\right\}$$

where $\varepsilon_{\nabla^2}$, $\varepsilon_\nabla$ are two small constants, $1_D$ is a unity matrix of size D×D and $\succ$ denotes larger-than in the positive-definite sense. Thus, we test that the gradient norm becomes sufficiently small but in order to prevent erroneously selecting the vicinity of a saddle-point instead of the vicinity of the minimum, we also test for the presence of a minimum in terms of either having a practically positive-definite (convex) Hessian, which is indicative of a local minimum (the comparison to $\varepsilon_{\nabla^2} 1_D$ rather than to 0 is to accommodate some uncertainty due to noise) or by testing that the step sizes used in the last m steps were small on the average (which is indicative of small fluctuations around the minimum).

Once the algorithm enters its tracking stage it may be run similarly to the portion of the code stated in the repeat loop, but with different parameters, e.g. a smaller in initial step size and with no stopping criterion. Thus, the track procedure goes to reinitialization of the parameters (e.g. enforcing smaller initial steps, just to overcome noise, as the system now fluctuates due to noise the vicinity of the minimum and large steps would be counterproductive as they would drive the system away from its minimum).

Another option is to slightly modify the algorithm in the tracking stage in order to improve accuracy. For example, hessian evaluation requires higher SNR than gradient evaluation. In the tracking stage, when the Hessian is no longer necessary, we may decrease the dithers amplitudes and determine $\underline{d}[l]$ just according to the gradient.

Various embodiments are possible for the bulk of the generic iterative descent algorithm above (specifically for its Initialize main repeat loop) according to known art in convex and non-convex unconstrained optimization techniques [6].

If the signal-to-noise ratio (SNR) of the detection system is sufficiently high, we may have access to accurate estimates of the Hessian matrix, as per our detection methods of inter-modulation products as disclosed above. In this case, if the Hessian is practically positive-definite, i.e. the condition $H[l] \succ \varepsilon_{\nabla^2} 1_D$ is specified, then it is useful to adopt the Newton-Descent (ND) procedure for line 2 of the algorithm, evaluating the update direction, $\underline{d}[l]$ as follows:

$$\begin{aligned}\underline{d}[l] &:= \Delta \underline{d}_{ND}[l] \equiv -H[l]^{-1} g[l] \\ &= -\{\nabla^2 I(\underline{\phi}[l])\}^{-1} \nabla I(\underline{\phi}[l])\end{aligned} \quad \text{(ND update vector)} \quad (71)$$

The Newton search pretends that the affine+quadratic Taylor series up-to-second-order approximation of the hypersurface I(.) is an accurate one, and jumps in one update step from the current operating point to the bottom (minimum) point of the hyper-paraboloid surface tangential to the actual hypersurface at the current operating point (in contrast a gradient based descent would take many steps to get to the minimum). Evidently, the deviation between the actual target function and its second-order approximation typically causes the Newton update to miss the actual minimum, yet the Newton step may get quite close to the minimum, and once it does, the 2nd-order approximation improves such that the next Newton step may get even substantially closer to the actual minimum.

The residual inaccuracy in the Newton step may be mitigated by evaluating the Newton step in line 2, then starting with an initial step size $\mu=1$ in line 3 and running the known Back-Tracking Line Search (BTLS) procedure [6] along the line parametrically described by $\underline{C}[l+1]=\underline{C}[l]+\mu \underline{d}[l]$ with variable $\mu$. The objective of the BTLS (or more generally of any line-search procedure)—step 3 in the stated algorithm above—is to evaluate a "reasonable" step-size $\mu[l]$, providing "sufficient-descent" along $\underline{d}[l]$ in step 3, by performing a sub-optimal search along the one-dimensional slice of the hyper-surface in the update vector direction, but in just a few sub-steps (as time may be better spent proceeding to a next update direction rather than optimizing along the current update direction with numerous sub-steps).

The BTLS, as applicable to a convex vicinity, is fully specified in [6].

If a Hessian measurement, H[l], is not available, then we simply adopt a Gradient-Descent (GD) update, setting in line 2 of the algorithm a descent direction collinear with that of the negative gradient, $$\underline{d}[l]:=\underline{d}_{GD}[l]=-\nabla I(\underline{\phi}[l]) \quad (72)$$

then adopt one of various line search algorithms for line 3, as per literature [6]. Notice that the Hessian, for which a measurement is unavailable now, may not be necessarily be convex, thus a BTLS line-search may fail—this calls for either adopting other line search algorithms. A simple "cope-out" is the adoption of a single arbitrary step size which may be more intelligently selected based on some partial a-priori information about the hypersurface, if available.

It remains to consider the case where a Hessian measurement is available but it does not indicate a strictly positive-definite matrix (the Hessian turns out to have at least one non-positive eigenvalue). Various non-convex optimization techniques may be adopted for this "not-convex" case, according to the vast literature on the topic. An exemplary embodiment of a sub-optimal yet simple algorithm for this case is as follows:

When the Hessian is not practically positive definite, e.g. $H[l] \not\succ \varepsilon_{\nabla^2} 1_D$, then we still use gradient search direction (72) for line 2 provided the gradient happens to be practically non-zero, $|\nabla I(\underline{\phi}[l])| \geq \varepsilon_\nabla$ then adopt various line search algorithm for line 3, as per literature. However, if the Hessian is practically positive definite while at the same time the gradient is practically zero, $|\nabla I(\underline{\phi}[l])| < \varepsilon_\nabla$, then this is the case that the current operating point is a saddle-point or maximum; to ensure fastest descent, we may now select the update vector $\underline{d}[l]$ in line 2 as collinear with the eigen-vector of H[l] associated with the most negative eigenvalue (even if $|\nabla I(\underline{\phi}[l])| \geq \varepsilon_\nabla$, we may choose $\underline{d}[l]$ to be a weighted average between the gradient and the eigenvector of H[l] associated with the most negative eigenvalue to speed up the descent time).

The overview is that our novel preferred adaptive algorithms then achieve the most rapid rate of descent (fast convergence to a local minimum) by adopting an adaptive alternation between the two known Gradient- and Newton-based methods for selecting the next descent-direction in each frame (line 2), based on testing the vicinity of the current operating point for convexity/concavity further alternating various lines search methods in line 3 of the algorithm possibly accounting for information on the nature of the Hessian, if available.

To summarize line 2 (in case g[l], H[l] are known)
1. If $H[l] \succ \varepsilon_{\nabla^2} 1_D \underline{d}[l]:=\Delta \underline{d}[l]$
2. If $H[l] \not\succ \varepsilon_{\nabla^2} 1_D$ and $|\nabla I(\underline{\phi}[l])| < \varepsilon_\nabla$ the decent direction is the eigenvector of H[l] associated with the most negative eigenvalue
3. If $H[l] \not\succ \varepsilon_{\nabla^2} 1_D$ and $|\nabla I(\underline{\phi}[l])| \geq \varepsilon_\nabla$ $\underline{d}[l]:=\underline{d}_{GD}[l]$ or a weighted average between the gradient and the eigenvector of H[l] mentioned in 2.

An exemplary embodiment of line 3 is our novel LS:
Before we present the novel LS we used, a short explanation about the Forward-Tracking Line Search (FTLS) procedure is needed.

The FTLS is an immediate expansion of the BTLS for non-convex functions. For convex functions, the first order Taylor approximation of the function is a lower bound on the function. Multiplying the slope of the first order approximation by a sufficiently small factor $0<S_{BTLS}<0.5$ will result in a new linear function that crosses the function at the OP and is bigger than the function (at least at a small environment around that OP) in the descent direction. This new linear function defines the stopping criterion of the BTLS—A sufficient step size $\mu[l]$ is step size that satisfies the following equation: $f(OP+\underline{d}[l]\mu_i[l]) < f(OP)+S_{BTLS}\underline{G}[l]\underline{d}[l]\mu_i[l]$.

If the condition above is not satisfied, that implies that step is excessive and we overshot the minimum so we must decrease the step size—$\mu_{i+1}[l]=\mu_i[l]p_{BTLS}$, $\mu_0[l]=1$, $0<p_{BTLS}<1$.

In the concave case, the first-order approximation is the upper bound on the function so every point will meet the BTLS condition—a more efficient procedure is needed. The FTLS is the immediate expansion for concave functions. The FTLS stopping criteria
$f(OP+\underline{d}[l]\mu_i[l]) < f(OP)+S_{FTLS}^d \underline{G}[l]\underline{d}[l]\mu_i[l]$
where $1 < S_{FTLS}^d$ and $\mu_{i+1}[l]=\mu_i[l]P_{FTLS}$, $\mu_0[l]=1$, $1 < P_{BTLS}$. Selecting $S_{FTLS}$ should be done carefully—on the one hand for $1 < S_{FTLS}^d \approx 1$ the concavity of the function is not fully taken advantage of; on the other hand for too large $S_{FTLS}^d$ the stopping condition is not satisfied. Since we cannot make sure that the stopping condition can be met for the selected $S_{FTLS}^d$ and since it is not guaranteed that the function stay concave as we increase $\mu[l]$ (the Taylor approximation is only accurate over a sufficiently small D-dimensional "ball" around the OP—convexity and concavity can be determined only for close environments of the OP) we add another slope- and stopping criterion:
$f(OP+\underline{d}[l]\mu_i[l]) > f(OP)+S_{FTLS}^u \underline{G}[l]\underline{d}[l]\mu_i[l]$ where $1 \geq S_{FTLS}^u$ and $\mu_{i+1}[l]=\mu_i[l]p_{FTLS}$, $\mu_0[l]=1$, $1 < p_{BTLS}$.

This criterion makes sure that at least one stopping condition is met, and better exploiting the local concavity of the function.

In case the initial step size was excessive we need to reduce it by means of the BTLS procedure.

To summarize:
1. If $f(OP)+S_{FTLS}^d \underline{G}[l]\underline{d}[l] < f(OP+\underline{G}[l]\underline{d}[l])$—use BTLS
2. If $f(OP)+S_{FTLS}^d \underline{G}[l]\underline{d}[l]\mu_i[l] > f(OP+\underline{G}[l]d[l]\mu_i[l]) - \mu[l]=\mu_i[l]$, FTLS is done.

3. If $f(OP)+S_{FTLS}{}^u\underline{G}[l]\underline{d}[l]\mu_i[l] > f(OP+\underline{G}[l]d[l]\mu_i[l]) - \mu[l] = \mu_{i-1}[l]$, FTLS is done.

4. If $f(OP)+S_{FTLS}{}^d\underline{G}[l]\underline{d}[l]\mu_i[l] > f(OP+\underline{G}[l]d[l]\mu_i [l]) < f(OP)+S_{FTLS}{}^u\underline{G}[l]\underline{d}[l]\mu_i[l]$ we increase the step size until one of the stopping criterions is met.

The novel LS is as follows:

1. If the function is convex $(H[l] \not\succ \varepsilon_{\nabla^2} 1_D)$—use BTLS with parameters $S_{BTLS}, P_{BTLS}$ 2. If the function is not convex and $\underline{d}[l] < \varepsilon_{\nabla}(=G[l])$ that implies that the OP is a maximum or a saddle point—we move to a new OP along the direction of the eigenvector associated with the most negative eigenvalue of the Hessian.

3. If the function is not convex and $\underline{d}[l] > \varepsilon_{\nabla}(=G[l])$, that does not necessarily imply that he map is not convex in the decent direction. We then need to estimate the effective curvature in the $\underline{d}[l]$ direction: $\tilde{\lambda}=(d^T H d)/(d^T d)$ a. If $\tilde{\lambda} > \varepsilon_{\nabla^2}$—use BTLS with parameters $S_{BTLS}, P_{BTLS}$
 b. If $\tilde{\lambda} < -\varepsilon_{\nabla^2}$—use FTLS with parameters $S_{FTLS}{}^d, S_{FTLS}{}^u, P_{FTLS}$
 c. If $|\tilde{\lambda}| \leq \varepsilon_{\nabla^2}$—use FTLS with parameters $S_{FTLS\_SA}{}^d, S_{FTLS\_SA}{}^u, P_{FTLS}$ In case 3.c the curvature is small negligible—the function is semi-affine around the current OP. We use the same methods as in the concave case (with $0.5 < S_{FTLS\_SA}{}^u < 1$, $1 < S_{FTLS\_SA}{}^d < S_{FTLS}{}^d$).

Temporally, step 1 (the measurement of derivatives) runs over the time interval $T_{CP}, +T_{DMT-SYM}$ (the physical transmission for derivatives estimation) as well as over part of the $T_{PROC}$ interval (the detection latency and digital processing and the derivatives evaluations and subsequent calculations, testing the Hessian for convexity/concavity and Gradient/Newton update-vectors evaluations). Step 2 (evaluation of the update vector and step size) may partially over the $T_{PROC}$ interval and be completed within the next stage, which implements the bulk of the line search procedure which is completed during the interval of variable duration $n_{LS}T_{LS}$, where $n_{LS}$ is the number of iterations of the line search procedure which cannot be predicted in advance (but it is not a large number, by virtue of the "fast yet sufficient descent" rationale). During each of the $T_{LS}$ intervals, the voltages vector of DC bias values $\underline{C}[l]+\mu\underline{d}[l]$ are applied to the tuning DOFs (wherein the particular value μ corresponding to that particular LS iteration was evaluated as a term in a geometric sequence with ratio $p_{BTLS/FTLS}$). Notice that the dithers are turned off at the end of the DMT-symbol interval, such that during $T_{PROC}+n_{BTLS}T_{BTLS}$ there is no longer dither applied, just stair-case DC. During $T_{PROC}$, the last DC commanded value C[l] is retained (as used in the DMT-symbol). Nor is there any dither applied during the subsequent $T_{LS}$ but various DC levels $\underline{C}[l]+\mu\underline{d}[l]$ are applied (with different μ values) during these intervals.

At the end of each $T_{LS}$ interval (waiting over the interval duration to let any dynamic transient settle down), the system map response $I(\underline{C}[l]+\mu\underline{d}[l])$ is estimated as follows, $$I(\underline{C}[l]+\mu\underline{d}[l])=r[l]/g_{Rx} \quad (73)$$

based on measuring the samples r[l] of the time-domain probe electrical response, at the end of each $T_{LS}$ interval, right after the transient due to the staircase DC discontinuity (occurring at the start of the $T_{LS}$ interval) has settled down. Then the estimated value (73) along with the gradient (51) (which was earlier estimated in the DERIV_EST module) are entered into the line search comparison inequalities to test for the termination of the while loop.

Finally, now that the final line search step has been taken along the line in direction dll in the last line-search sub-interval, the algorithm evaluates the next command, $$\underline{C}[l+1]=\underline{C}[l]+\mu[l]\underline{d}[l] \quad (74)$$

and actuates new DC steps at the levels of the components of this voltage vector onto the tuning DOFs (superposed with dither signals). The iterative algorithm is now to re-start a new frame, again evaluating derivatives, determining convexity/concavity, evaluating a new direction-vector as Newton or Gradient descent and then performing a line search to determine the step size and settle on a final location along the line for this iteration, and so on.

If the electronics is relatively fast, such that the actuators and probes memory (delay spread) is short, then the durations $T_{CP}$ and $T_{LS}$ are short relatively to the DMT symbol time, T. Moreover, let us further assume that the digital processing is sufficiently powerful, such that its computational latency $T_{PROC}$ is short and the line search procedures do not require too many steps, such that $n_{LS}$ is small, then we may have $T+T_{CP} \square T_{PROC}+n_{LS}T_{LS}$, as it is not possible to reduce the DMT-symbol duration, T, too much, as then there will be limited noise tolerance. In this case, as the overall frame time is dominated by the DMT symbol time T required for derivatives estimation, the most reasonable strategy is to strive to extract as much benefit from each derivatives estimation iteration as possible, implying that it is preferable to optimize the descent along each particular line by selecting a values for the BTLS and FTLS parameters accordingly, to enable finer sub-iteration steps as well as set the slopes of the affine boundaries terminating the line search, such as to provide extra descent at the expense of somewhat increasing the number of steps of the line search sub-iteration.

The overall iterative algorithm described above stabilizes the PIC, initially acquiring its optimal operating point, then continuously tracking it in the wake of noise and environmental disturbances. Extension to actuators and probes with memory We have heretofore assumed that the PIC map (from the tuning DOFs to the probe electrical measurement) is memoryless. However, in practice, the electronics of the actuators and probes is much slower than the optics, hence actuators and probes typically display some memory (delay spread, i.e. finite duration of impulse responses). This implies that the end-to-end system is not memoryless as assumed (although the photonic core PIC is effectively memoryless at the low bandwidths of the test and response signals used for C&C). Nevertheless, having the memory relegated to the I/O interfaces (the actuators and probes) means that the modeling and C&C methodologies heretofore developed are essentially reusable with some reasonably contained modifications.

In fact the introduction of the CP preamble ahead of the DMT-symbol in each transmission frame, was intended to mitigate a key deleterious effect of the I/O interfaces memory, namely the transient step response, as discussed next.

We recall that by inserting a CP, the transmission (12) in the l-th frame is started at an earlier time $t[l]-T_{CP}, T_{CP}$ sec ahead of the start time t[l] of the DMT symbol. The CP is prepended at the same bias level as its corresponding DMT-symbol, simply replicating the dither waveform in the $T_{CP}$ sec tail of the DMT-symbol. Since the DMT-symbol contains an integer number of cycles of each of the sinusoidal dither tones, it follows that there is continuity of the sinusoidal dither phase over the time instant separating the CP interval and the DMT-symbol. Notice however, that depending on the ratio between $T_{CP}$ and T, the start of the CP dither waveform may not always occur at zero phase, but fortunately that is inconsequential for system operation. It is the usage of CP that allows the system to reach its steady state in response to the discontinuity of the DC bias at the beginning of each frame. The CP duration is selected sufficiently long (but no longer than necessary) to enable absorbing the step response transient of the actuators and probes, allowing the transient to have decayed away by the end of the CP interval.

In addition to the transient response, a second problem to contend with, in the wake of I/O interfaces memory, is the phase-shift generated in the steady state sinusoidal response due to each of the sinusoidal dither signal components (note that, over the duration T of the DMT-symbol interval, the dither response is indistinguishable from that due to a CW tone, since the transient is assumed to have already settled over the preceding CP interval $T_{CP}$).

The "phase-shift" problem is the following: Were the end-to-end system strictly memoryless, then the resulting AC signals at the probe(s) would also be cosines at the original frequencies plus their inter-modulations, all in phase with the originally injected cosines, as the propagation delay through the optics are negligible. However, due to actuators and probes memory, the electrical group delays via the I/O interfaces may not be negligible (even if the core optical system map is memoryless). In this case, the received tones (at the probe output) and their intermodulations are no longer pure cosines, but they may experience phase-shifts, relative to the corresponding exciting dither tones, therefore quadrature (sine) components would also appear in the probed output in additional to the in-phase components (which are aligned in phase with the exciting tones). To illustrate the phase-shift effect, assume for simplicity that cascaded frequency response of the I/O interfaces (the actuator linear filtering effect placed back-to-back with the probe filtering effect) is described by an all-pass transfer function, not affecting amplitudes but introducing a phase-shift $\phi_m$ in the frequency response of the m-th tone, such that the memoryless response (38) in the absence of noise, namely $$r(t)=g_{Rx}B^{(0)}[l]+\Sigma_\gamma g_{Rx}B^{(\gamma)}[l]\cos(\omega^{(\gamma)}t) \tag{75}$$

(where (41) was also used) is now replaced by $$r(t)=g_{Rx}B^{(0)}[l]+\Sigma_\gamma g_{Rx}B^{(\gamma)}[l]\cos[\omega^{(\gamma)}t+B^{(\gamma)}[l]\cos(\omega^{(\gamma)}t+\varphi_m^{(\gamma)})] \tag{76}$$

Now, we must detect sinusoidal tones of the form $g_{Rx}B^{(\gamma)}[l]\cos(\omega^{(\gamma)}t+\varphi_m^{(\gamma)})$, which are phase-shifted by frequency dependent phases $\varphi_m^{(\gamma)}$. Applying a A-DCT spectral analysis to such a phase-shifted tone yields $$^m A\text{-}DCT\{g_{Rx}B^{(\gamma)}[l]\cos(\omega^{(\gamma)}t+\varphi_m^{(\gamma)})\}=g_{Rx}B^{(\gamma)}[l]\cos\varphi_m^{(\gamma)}\delta_{m,n}^{(\gamma)} \tag{77}$$

It is apparent that the original A-DCT coefficient (in the absence of phase-shift) is now attenuated by a factor $\cos\varphi_m^{(\gamma)}$. In the worst case, if the phase-shift accrued end-to-end becomes 90°, then the detected A-DCT output completely nulls out. More generally, depending on the accrued phase-shifts at each frequency, the received values are attenuated at various levels, resulting in erroneous derivatives estimates.

To mitigate this I/O memory-induced dither phase-shift problem, we must also detect and process the energy diverted into quadrature components in addition to that in the in-phase components. This indicates that usage of just the DCT is no longer adequate in the DMT analyzer. However, we may further detect the quadrature components by means of an Analog Discrete Sine Transform (A-DST), defined as is the counterpart of the A-DCT (9), except that the cosine basis functions are replaced by sine ones:

$$A_m^C = A\text{-}DCT\{a(t)\} = \frac{2}{T}\int_0^T a(t)\cos(2\pi\cdot v_m\cdot t) \tag{78}$$

$$A_m^S = A\text{-}DST\{a(t)\} = \frac{2}{T}\int_0^T a(t)\sin(2\pi\cdot v_m\cdot t)$$

Applying now an A-DST to the shifted received sinusoidal tones (in parallel to the A-DCT), yields:

$$^m A\text{-}DCT\{g_{Rx}B^{(\gamma)}[l]\cos(\omega^{(\gamma)}t+\varphi_m^{(\gamma)})\}=g_{Rx}B^{(\gamma)}[l]\sin\varphi_m^{(\gamma)}\delta_{m,n}^{(\gamma)} \tag{79}$$

Viewing both transform coefficients at frequency index $_m$ as a vector in $\Pi^2$, we have the pair:

$$g_{Rx}B^{(\gamma)}[l]\delta_{m,n}^{(\gamma)}\{\cos\varphi_m^{(\gamma)},\sin\varphi_m^{(\gamma)}\} \tag{80}$$

The norm (root-sum-of-squares) of this 2-dimensional vector is just the sought received amplitude, $|g_{Rx}B^{(\gamma)}[l]|$ and may be presented to the next DERIV_EST stage.

In practice, we do not have to use analog DCT and DST but we may rather use digital DCT and DST transforms (the digital domain DST is readily defined in the digital domain by replacing $$\cos\left(\frac{2\pi}{M}mk\right)$$

in the DCT definition (21) by $$\sin\left(\frac{2\pi}{M}mk\right).$$

We may further complex the mathematical description, noting that the pair of transforms {DCT,DST} is isomorphic to a complex transform DCT+jDST, which is nothing but the Discrete Fourier Transform (DFT):

$$DCT\{a_k\} + jDCT\{a_k\} =$$

$$\frac{2}{M}\left[\sum_{k=0}^{M-1}a_k\cos\left(\frac{2\pi}{M}mk\right)+j\cos\left(\frac{2\pi}{M}mk\right)\right]=2\cdot DFT\{a_k\}$$

(81) where we used the following definition for the DFT:

$$DFT\{a_k\} \equiv \frac{1}{M}\sum_{k=0}^{M-1}a_k\exp\left(j\frac{2\pi}{M}mk\right) \tag{82}$$

It is apparent that evaluation of the norm of the pair {DCT,DST} (shown above to mitigate phase-shift induced attenuation) now corresponds to taking the modulus of the DFT. This indicates that in order to mitigate the memory of I/O interfaces we may simply replace the DCT in the DMT-analyzer by a DFT, and take the modulus (absolute value) of the resulting coefficient at index m (up to a constant).

More precisely, a direct evaluation of the DFT of a sinusoidal tone with arbitrary phase (with discrete frequency on the grid) indicates that there are two non-zero DFT coefficients (which are mirror images of each other relative to the center point):

$$DFT^M\{\cos(\omega^{(\gamma)}l+\varphi_{m^{(\gamma)}})\} = \begin{cases} \frac{1}{2}e^{j\varphi_{m^{(\gamma)}}}, & m = m^{(\gamma)} \\ \frac{1}{2}e^{-j\varphi_{m^{(\gamma)}}}, & m = M - m^{(\gamma)} \end{cases} \quad (83)$$

where the DFT size, M, was indicated by a superscript.

There are then two consequences to the mirror image property: (i): it is preferable to sum up or take the arithmetic average of these two coefficients at in and M-m prior to taking absolute value, rather than just evaluating the absolute value of just one of these components (ii): There is redundancy in half the spectral values (as we may not use the upper half of the M spectral coefficients generated by the M-points DFT obtain new information). Thus, we are able to discern just M/2 distinct frequencies of real-valued sinusoidal tones. However note that this is consistent with the conclusion already encapsulated in the DCT definition (21).

A modified block diagram of the DMT-Analyzer, suitable to mitigate I/O interfaces memory generates the statistics $$R^{\prime(m^{(\gamma)}}[l] = |^{m^{(\gamma)}}DFT^M\{r_k[l]\} + {}^{M-m^{(\gamma)}}DFT^M\{r_k[l]\}| \quad (84)$$

at the frequency indexes $m^{(\gamma)} \leq M-1$ of the injected tones and their intermodulation frequencies of interest, using these processed measurements instead of their original counterparts as inputs into the DERIV_EST module, replacing the $R^{(m^{(\gamma)})}$ in original the memoryless scheme based on the DCT.

It seems that at the Tx side we may still use an A-IDCT-like DMT GEN in an analog implementation or equivalently an IDCT-like DMT GEN in the digital domain, injecting pure cosine tones (or linear combinations thereof in the more general version based on a combining matrix) into each of the tuning DOFs.

Nevertheless, due to the sign ambiguity issue described below, we shall see that it is also convenient to replace the IDCT-like DMT GEN at the Tx side with an IDFT-like DMT GEN, generating complex-valued tones rather than cosine tones, and further perform digital pre-equalization as described next.

However, at the Rx side, once the DCT is replaced by a Discrete Fourier Transform (DFT), the absolute values of the sum of DFT mirror coefficients should be generated and these absolute values should be used in lieu of the original DCT coefficients $R_{m'}[l]$. An alternative may be to estimate the phases of the spectral samples at the DFT output (which turns out to be useful in the calibration procedure described further below) and de-rotate the complex samples by these phases in order to make the received phasors point along the real axis, and then simply take the real parts of the de-rotated phasors (which equal the moduli of the phasors before pre-rotation). Such operations, as modulus evaluation and phase (de-)rotation may be efficiently implanted in digital hardware by the CORDIC algorithm.

Sign Ambiguity Correction in the Wake of Phase-Shift

There remains an issue with determining the direction of descent, occurring whenever the phase-shift due to the I/O memory effects exceeds +90°. Indeed, in this case, a negative gradient sign along any direction vector is measured and processed as a positive gradient and vice versa. E.g., if the phase-shift is precisely +180° there occurs a simple phase reversal of the detected photocurrent harmonic component, relative to the optical intensity harmonic component; now the descent and ascent directions are interchanged (running the algorithm like before would result in ascent rather than descent). Notice that the phase rotation does not affect the detected gradient magnitude, if IQ detection (or equivalently DFT processing) is used, but an issue remains with the phase ambiguity arising when the phase rotation is too large. This sign-ambiguity issue may be mitigated by a suitable calibration procedure, referred to as Equalizing Calibration (EQZ-CAL) plus pre-equalization (PRE-EQZ) as described next.

EQZ-CAL and Tx-Side PRE-EQZ

We have heretofore assumed that the PIC map (from the tuning DOFs to the probe electrical measurement) is memoryless. However, in practice the electronics of the actuators and probes is much slower than the optics, hence actuators and probes typically display some memory (delay spread, i.e. finite duration of impulse responses). This implies that the end-to-end system is not memoryless as assumed (although the photonic core PIC is effectively memoryless at the low bandwidths of the test and response signals used for C&C). Nevertheless, having the memory relegated to the I/O interfaces (the actuators and probes) means that the modeling and C&C methodologies heretofore developed are essentially reusable with some reasonably contained modifications.

In fact the introduction of the CP preamble ahead of the DMT-symbol in each transmission frame, was intended to mitigate a key deleterious effect of the I/O interfaces memory, namely the transient step response, as discussed next.

We recall that by inserting a CP the transmission (12) in the l-th frame is started at an earlier time $t[l]-T_{CP}$, $T_{CP}$ sec ahead of the start time $t[l]$ of the DMT symbol. The CP is prepended at the same bias level as the corresponding DMT-symbol, replicating the dither waveform in the $T_{CP}$ sec tail of the DMT-symbol. Since the DMT-symbol contains an integer number of cycles of sinusoidal tone(s), it follows that we have continuity of the sinusoidal dither phase over the boundary between the CP and the DMT-symbol. However, depending on the ratio between $T_{CP}$ and T, the start of the CP dither waveform may not always occur at zero phase, but that is inconsequential for system operation. It is the usage of CP that allows the system to reach its steady state in response to the discontinuity of the DC bias at the beginning of each frame. The CP duration is selected sufficiently long (but no longer than necessary) to absorb the transient step response of the actuators and probes, such that the transient has died out at the end of the CP interval.

In addition to the transient response, a second problem to contend with in the wake of I/O interfaces memory, is the phase-shift generated in the steady state sinusoidal response of the dither signal (note that the dither response is indistinguishable from that due to a CW tone over the duration T of the DMT-symbol interval, once the transient settled over the preceding CP interval $T_{CP}$). Were the end-to-end system strictly memoryless, then the resulting AC signals at the probe(s) would also be cosines at the original frequencies plus their inter-modulations, all in phase with the originally injected cosines, as the propagation delay through the optics are negligible.

However, due to actuators and probes memory, the electrical group delays via these I/O interfaces may not be negligible. In this case, the received tones (at the probe output) and their intermodulations are no longer pure cosines, but they may experience phase-shifts, therefore quadrature (sine) components would appear in the probed output.

Figure 10:
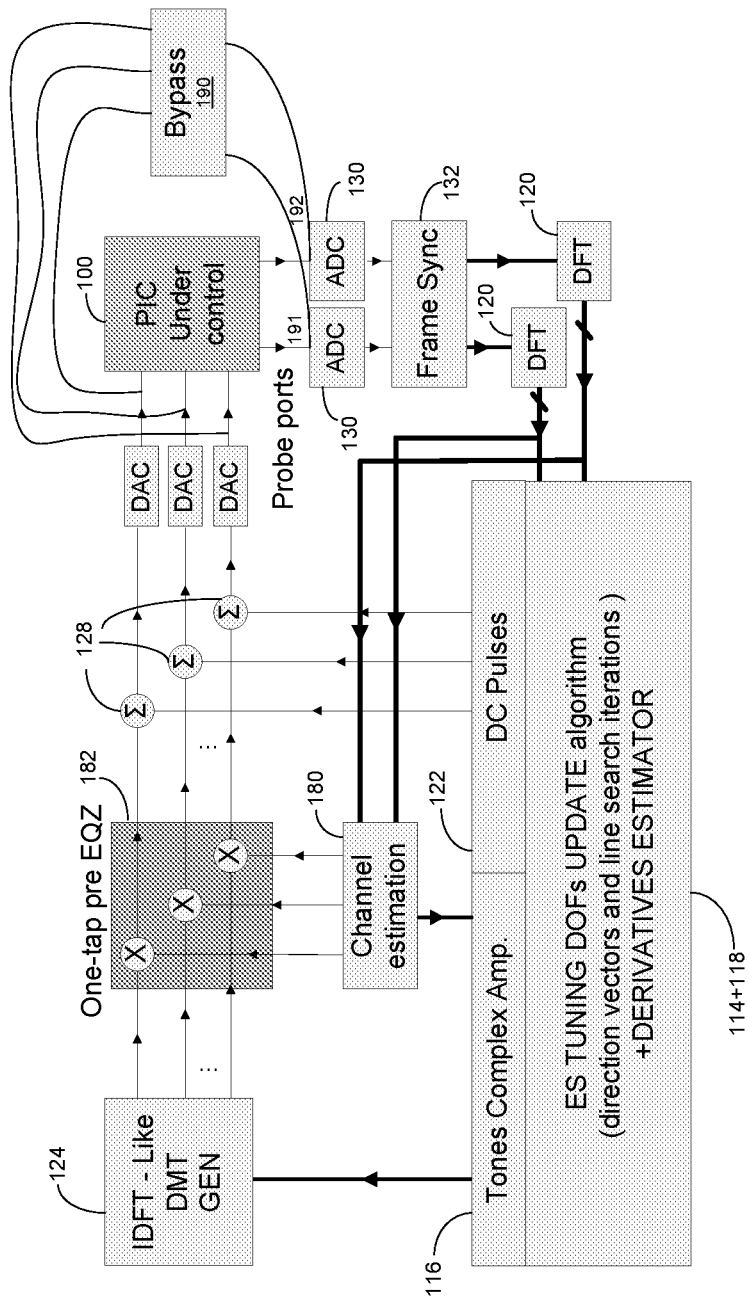
FIG. 10 illustrates a control system and a controlled system that is an PIC according to an embodiment of the invention.

Assuming that the main phase shift effects happens due to the electronic components and not the PIC, it is proposed here to replace the DCTs by Discrete Fourier Transforms (DFT) as shown in FIG. 10, thus estimate both the magnitude gain and attenuation and the phase-shift (the complex transfer function) and calibrate the electronic system back-to-back. The EQZ-CAL procedure consists of removing any PIC short-circuiting the input and output analog ports of the C&C controller. Actually, as there are typically multiple (D) output ports (actuator ports leading to the tuning DOFs of the PIC) but one or just a few input ports (leading from the probe(s) to the C&C controller) then we should physically connect each of the D tuning ports in turn to the single probe or to each of the few probe(s), as applicable. In each case we should have the multi-tone-generator generate all applicable dither tones and apply them to each of the tuning DOFs in turn, then measure the corresponding complex amplitudes at the output of a DFT, and divide each DFT output complex amplitude by the corresponding input amplitude (which has zero phase as it is a discrete cosine) such that a complex sample of the transfer function at that particular frequency is effectively measured (both its amplitude and phase or equivalently real and imaginary parts). The inverse of this transfer function should then be applied at the Tx side, incorporated within the multi-tone generator, in effect scaling the amplitude of the transmitted sine tones and de-rotating their phases in advance such that by the time the signals propagate through the back-to-back front-end interfaces of the C&C controller, they are received with no attenuation and with zero phase shift. This should mitigate any memory effects.

The preferred implementation of a digital multi-tone generator plus the equalization stage of the EQZ-CAL procedure is shown in FIG. 10. FIG. 10 illustrates a bypass circuit 190 and switches 191 and 192 that allow to bypass the PIC under control 100 $i$ order to learn the transfer function of the controlling device.

It replaces the IDCT-like DMT GEN in the Tx by an IDFT-like DMT GEN generating complex tones, each preceded by one-tap pre-equalizers 182, realized as multipliers by the complex samples of the inverse transfer function measured in the course of the calibration procedure at the corresponding tone frequencies. These equalizing taps (inverses of the transfer function samples) are generated by the CHANNEL ESTIMATION module 180, which also switches in a different set of complex amplitudes for the tones in the calibration stage (e.g., all complex amplitudes real-valued) than the complex tone amplitudes generated by the TONES_COMPLEX_AMP MODULE of the digital controller during the working phases (acquisition and tracking). The CHANNEL ESTIMATION module evaluates the transfer function samples by dividing the received and transmitted complex amplitudes, as well as computing the equalization taps by taking the inverses of the estimated transfer function complex amplitudes. The DMT ANALYZER now consists of DFTs applied to each of the probe signals. The DFT spectral coefficients feed both the TUNING DOFs UPDATE ALGORITHM as well as the CHANNEL ESTIMATION module. The role of the FRAME_SYNC module is to act in the buffered raw received data from the ADC(s) and synchronize the extraction of the DMT_symbol time interval out of the overall frame interval (as the C&C controller has access to both Tx and Rx, this synchronization is very simple).

Evidently, while many of the embodiments in this disclosure pertain to PIC devices under test, the same principles of realizing ES control in a novel way apply to any generic system under test, provided it may be viewed as a memoryless (very broadband) core system with I/O interfaces which may have memory.

In summary, to contend with memory effects in the I/O interfaces, the realization of the DMT analyzer based on a DFT for each tone, rather than a DCT is required at the Rx, the realization of the DMT GEN and the EQZ-CAL procedure should be run to mitigate the frequency-dependent phase shifts (in the worst case sign reversals) as well as frequency-dependent attenuation in the I/O interfaces.

Nevertheless, in the simulations presented the following section for a particular microring modulator device, it was assumed for simplicity that the system is memoryless, hence DCT rather than DFT was used.

Oversampling ADC operation

Assume now the ADC sampling rate, $f_{ADC}$, is higher than the sampling frequency $f_s$ required by the ES system.

In this case it is possible to perform a decimation operation on the stream of ADC samples, consisting of an anti-aliasing filter and a down-sampler as conventionally known.

A preferred alternative is to perform a larger size DFT than M, say a DFT sized N=KM K is an integer larger than unity, called the oversampling ratio, which is close to the ratio ~$f_{ADC}/f_s$. In each frame of the DFT (a block of N=KM points on which the DFT acted) just the output points of the DFT corresponding to the M lowest frequencies are retained. Thus, during the time that K M points where collected, just M points are made available, which amounts to a slow-down (down-sampling decimation) by a downsampling factor of K, equal to the oversampling ratio. This corresponds to approximating generating $f_s$ samples per second, the desired sampling ratio. The discarded KM−M=M (K−1) samples amount to a sharp (brickwall rectangular) low-pass filtering operation ahead of the down-sampling. The complexity for achieving this filtering via an FFT is approximately $$\frac{N/2\log(N)}{N} = N/2\log(N)$$

multiplications per sample, where the final division by N corresponds to having to perform one FFT in each N samples frame. E.g., if $f_{ADC}$=256 MHz and we require $f_s$=1 MHz, and M=16 (such that the inter-tones spacing is 1/16 MHz) then a slowdown by a K=256 factor may be accomplished by performing and FFT sized N=KM=256·16=4096 and retaining just the 16 baseband samples.

II. C&C of Microring Device with Two Tuning DOFs

A tacit assumption in integrated photonic circuit (PIC) designs is their stabilization to the desired operating point in the multi-dimensional space of parametric degrees of freedom (DOF), typically by thermally controllable phase-shifting. E.g. a microring resonator (MR) based drop-filter has a pair of tuning DOFs, the phase θ controlling the cavity resonance and the phase φ controlling the coupling coefficient κ=sin φ. More complex MR based PICs or other types of PICs may possess multiple DOFs available to tune these devices to their optimal operating points.

In particular, heretofore, for micro-ring based PICs, thermal stabilization of just a single tuning DOF, the resonant phase, θ, has been demonstrated either by means of analog dithering [1,2] or by digital control [3].

In this section we exemplify the ES approach by simultaneous digital control of a pair of tuning DOFs θ,ϕ (D=2), for a microring based Binary Phase Shift Keying Modulator (BPSK-MOD). This MR based BPSK modulator device-under-control (DUC) (FIGS. 11 and 12), is akin to the MR based DPSK modulator recently introduced in [5] (it differs from [5] in that a plain MZM is used, rather than loading the MZM by a pair of tiny ring phase-shifters).

Figure 12:
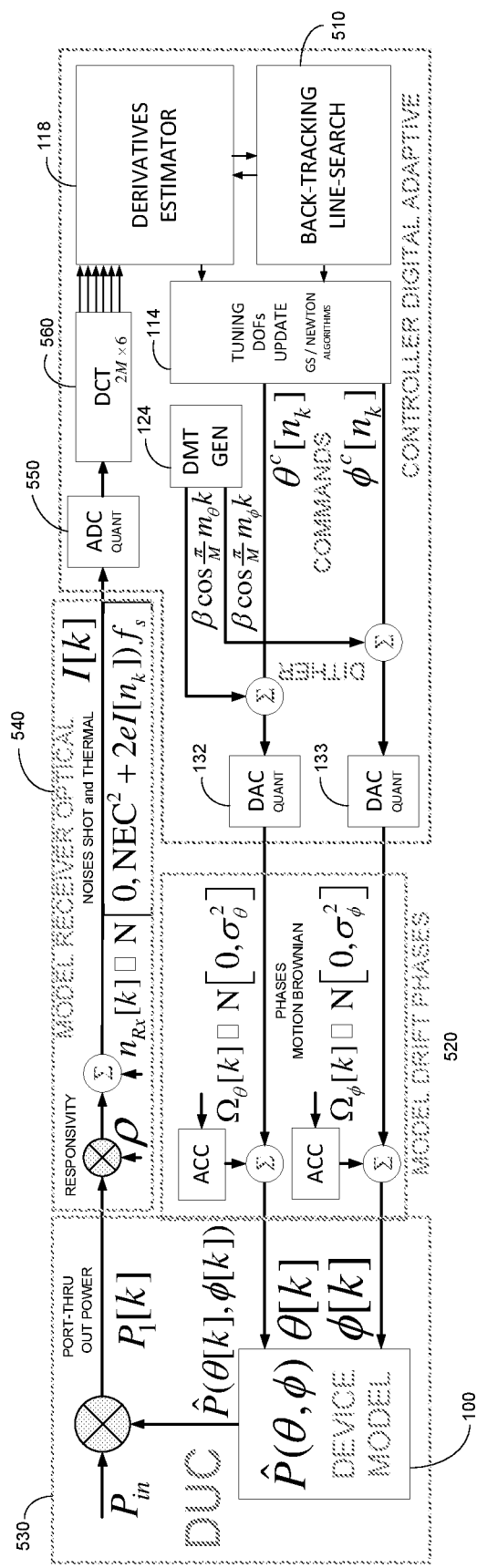
FIG. 12 illustrates a mode of a control system and a model of a controlled system according to an embodiment of the invention.

FIG. 12 illustrates a simulation of a controlling device and of a controlled device (DUC 100). The model of the controlled device 530 is virtually coupled to an optical receiver model 540 that is virtually coupled to a phase drift model 520 and an adaptive digital controller 510. The model of the controlling device 530 includes a ADC 550 followed by DCT 560, followed by derivatives estimator 118, back tracking line search 510, tuning DOF update 114. The outputs of tuning DOF update 114 and DMT generator (DMT GEN) 124 are summed together and are fed to DACs 132 and 133.

Without concurrent stabilization of both tuning DOFs, θ,ϕ, neither our BPSK modulator, nor the similar device in [5], would be able to properly function, as it would drift out of resonance and out of the critical coupling condition.

Here we present simulations of the proposed novel frame-based ES digital controller accounting for thermal and shot noises, ADC/DAC distortion and environmental drifts modeled as Brownian motions of the phases at rate $$1 \frac{\text{rad}}{\sqrt{\text{day}}}.$$

We re-iterate that the novel adaptive controller is non-model-based (needs no knowledge of actual model or parameters ranges). In its initial acquisition stage, starting at any ($\theta_0$, $\phi_0$), it rapidly navigates to extremum operating points ($\theta_*,\phi_*$) within <1.4 msec (for worst initial condition, FIG. 13—graphs 610 and 620, see also FIG. 14 graphs 710 and 720), locking the microring to the laser wavelength while also enforcing critical coupling. Once the system converges, it starts tracking, opposing random phase disturbances, while the optical modulation index fluctuations induced by the control settle at the imperceptible RMS level <5.3·10$^{-6}$. Our phases dithering amplitudes, β=1 mrad ↔ ΔT~0.05° K may be much reduced by relaxing the RMS error and/or slowing down convergence, as we have large design margins.

Analytical Model of Selected Device-Under-Control (DUC)—Microring Based BPSK Modulator Akin to [5]

Figure 11:
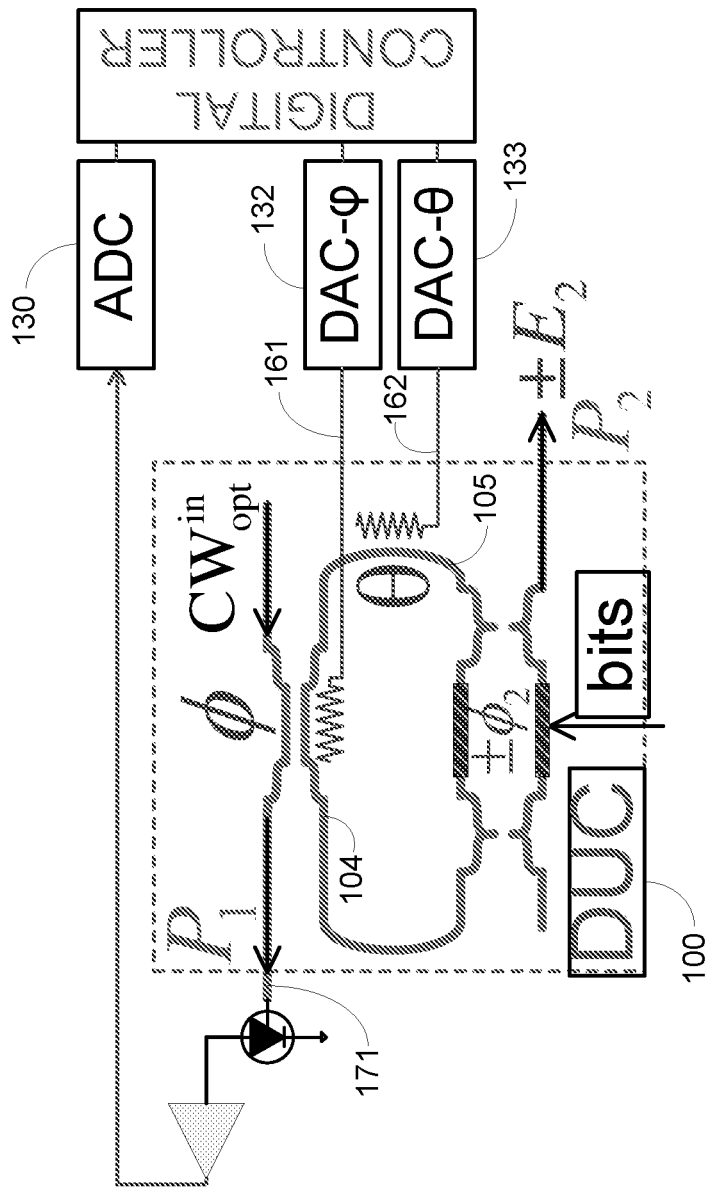
FIG. 11 illustrates a control system and a controlled system that includes two DOC points according to an embodiment of the invention.

Our DUC (FIG. 11 is essentially an MR-based drop-filter converted into BPSK modulator, generating a bi-polar ±$E_2$ output optical field by antipodally modulating its drop-coupler coupling coefficient $\kappa_2=\pm|\kappa_2|=\sin(\pm\phi_2)$ (antipodally=switch-sign, retain-magnitude). The top coupler, with coupling coefficient κ=sin ϕ, is to be tuned by adjusting its control phase ϕ, to attain the critical coupling condition maximizing the cavity field, while concurrently adjusting the cavity round trip phase, θ to resonance. The (lower) drop-coupler is realized as an MZM, with differential phase-shifts ±2$\phi_2$ between its two arms (signs selected by the modulating bits). As $|\sigma_2|^2+|\pm\kappa_2|^2=1$, then $\sigma_2=\cos(\pm\phi_2)=\cos\phi_2$ is constant, irrespective of the phase antipodal switching, ±$\phi_2$, hence there is no difference between modeling the MR BPSK-MOD vs modeling the MR drop-filter resulting when $\kappa_2$ is kept constant (its sign is not switched). Thus, the intra-cavity optical field is constant, irrespective of the ±$\phi_2$ modulation, yielding an extremely broadband device, not limited by cavity lifetime, as pointed out in [5] re their similar DPSK MOD. The thru-port power transfer characteristic (TC), $\hat{P}(\theta,\phi)$ plotted in FIGS. 13 and 14 by a grayscale diagram, is consistent with [5, Eq. 1]:

$$P_1 = \hat{P}(\theta, \phi)P_{in}; \hat{P}(\theta, \phi) \qquad (85)$$
$$= (\cos^2\phi + \cos^2\phi_2 - 2\alpha\cos\phi\cos\phi_2\cos\theta) /$$
$$(1 + \alpha^2\cos^2\phi\cos^2\phi_2 - 2\alpha\cos\phi\cos\phi_2\cos\theta)$$

The ES control monitors $P_1$ and seeks the optimal point $(\theta_*,\phi_*)=\text{argmin}_{\theta,\phi} P_1(\theta,\phi)$. The optimal tuning phase values $(\theta_*,\phi_*)$ maximize the cavity and output power $P_2=|E_2|^2$, while ideally nulling out thru-port output power, $P_1$.

Extremum Seeking (ES) Control in Two Dimensions (D=2): A Generalization of 1-DOF Dithering Approach Our novel Discrete MultiTone (DMT) digital realization of the ES controller, akin to OFDM is shown in FIGS. 11 and 12 for the case of D=2 for the particular PIC device. In the transmitter (Tx), orthogonal sinusoidal dither signals are additively injected into the tuning phases, θ,ϕ. In the n-th iteration, the phases (θ[n], ϕ[n])=[θ$^c$[n]+βcos(2π$v_1$Tk), ϕ$^c$[n]+βcos(2π$v_2$Tk)]

are injected via a pair of DACs; here n is a frame index; T is the minimal variable frame duration (frame rate T$^{-1}$=50 KHz); k is a discrete-time index at the sampling rate $f_s$=2MT$^{-1}$(=1.6 MHz, as M=16); $v_1$=2T$^{-1}$,$v_2$=5T$^{-1}$ are the two dither tone frequencies; β is the dither modulation index, set to β=10$^{-3}$. The receiver (Rx) of the ES controller detects the optical power $P_1$(t) via an ADC (ADC/DAC 15 bits available at 1.6 MS/s) and digitally demodulates the two dither signals as well as their difference and sum frequencies (generated due to the nonlinearity of the TC (1)) using a DCT-based analyzer. Lock-in detecting the DUC output amplitudes of the orthogonal dither tones and their inter-modulations, at $v_1$, $v_2$, 2$v_1$, 2$v_2$, $v_2$±$v_1$, enables estimating the 1$^{st}$ and 2$^{nd}$ partial derivatives the TC 2-D surface at the current operating point (θ[n],ϕ[n]) for the n$^{th}$ DMT frame iteration. The detected tone amplitudes at $v_1$, $v_2$ are proportional to the elements of the gradient vector, g=[∂$P_2$/∂θ∂$P_2$/∂ϕ]$^T$); The 2$^{nd}$-harmonics and intermodulations yield the 2$^{nd}$-order partial derivatives {$H_{11}$,$H_{12}$=$H_{21}$,$H_{22}$}={∂$^2P_1$/∂θ$^2$, ∂$^2P_1$/∂θ∂ϕ∂$^2P_1$/∂$^2$ϕ}), forming the 2×2 Hessian matrix, H. Thus, all partial derivatives are estimated in real-time up to 2$^{nd}$-order (without prior knowledge of DUC TC surface shape, eq. (1)). Based on the estimated g[n] alone, a Gradient Search (GS) algorithm may be run for the sequence (θ$^c$[n], ϕ$^c$[n]) of commanded control values, acquiring and tracking the minimum of the 2-D surface $P_1$(θ,ϕ) in the presence of phase drifts and noise; Estimating H[n] enables further speeding up the algorithm and increasing accuracy by using Newton iterative optimization [6]. In fact, our iterative algorithm adaptively switches between the GS and Newton iterative algorithms in every frame, based on testing H[n] for convexity at the iterated point in θ,ϕ plane.

Simulation Results: Rapid (<1.4 msec) Acquisition from any Initial Points & Robust Tracking ( <5.3·10$^{-6}$ RMS Error)

Figures 13, 14:
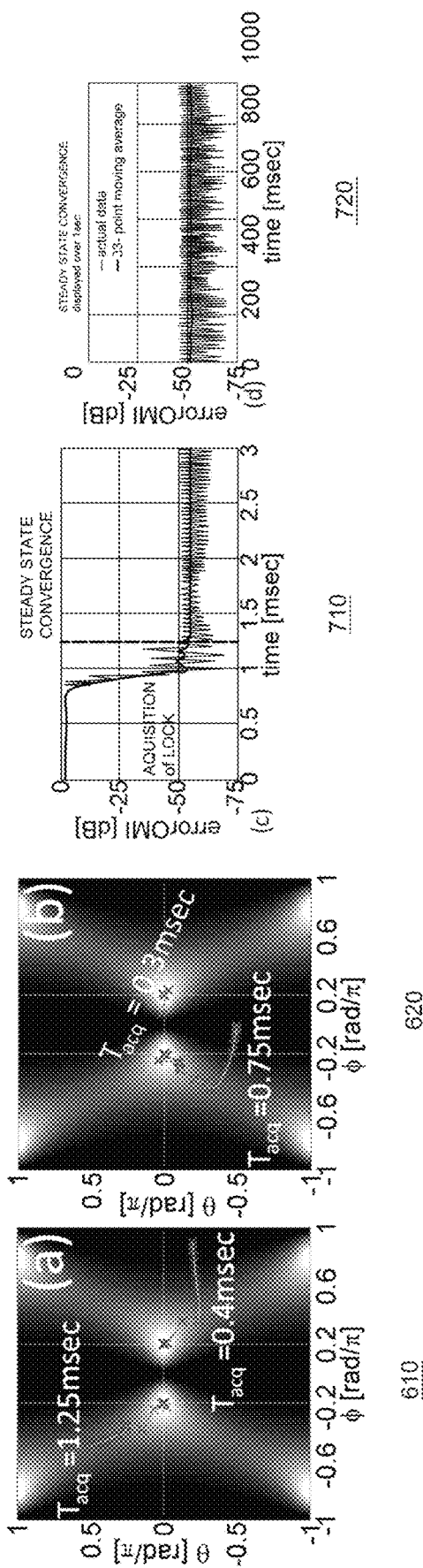
FIG. 13 illustrates a convergence process according to an embodiment of the invention.
FIG. 14 illustrates a convergence process according to an embodiment of the invention.

The Simulink™ simulation presented in FIGS. 13 and 14 rapidly acquires and maintains robust lock, (θ$_*$,ϕ$_*$). The dual-port MZM was set at 3 dB $$\left(\phi_2 = \frac{\pi}{4}\right);$$

$P_{in}=3$ dBm; $\rho=0.8$ Impairments were Rx shot and thermal noises, $$NEC = 0.2 \frac{pA}{\sqrt{Hz}},$$

DACs/AUC quantization noise, Brownian motion of the phase DOFs $\theta[n], \phi[n]$, accumulating random $[N[0,\sigma_{dist}^2]$ independent increments per frame iteration, to model $$1 \frac{rad}{\sqrt{day}}$$

phase drifts. FIGS. 13 and 14 depicts convergence trajectories. All acquisition times are <1.4 msec; Converged steady-state RMS optical modulation index for $P_1$ is $<5.3 \cdot 10^{-6}$ (ideally $P_1=0$).

III. C&C of IQ Modulator (D=3 Tuning DOFs)

Figure 15:
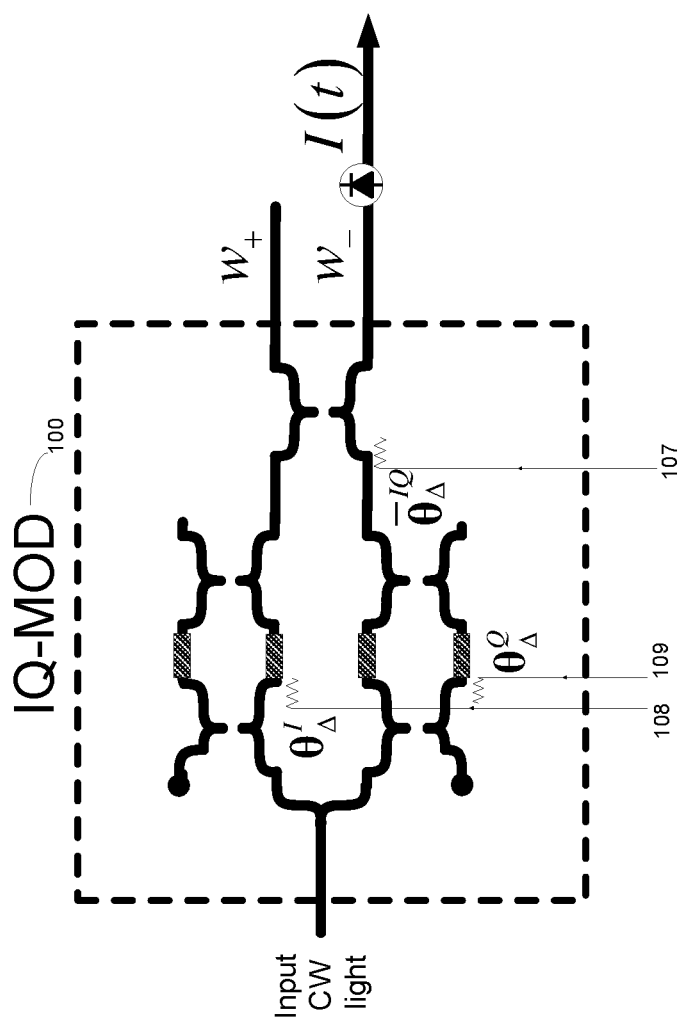
FIG. 15 illustrates a control system and a controlled system that includes two DOC points according to an embodiment of the invention.

The objective of this C&C embodiment is to control an IQ modulator (IQ-MOD), which photonic device is depicted in FIG. 15. For this particular PIC DUC we present in this section particular embodiment of the C&C generic system described in this disclosure with a particular enhancement suitable for this case, in that conventional zero-regulation PLL feedback control is to be included in addition to the ES control.

Figure 16:
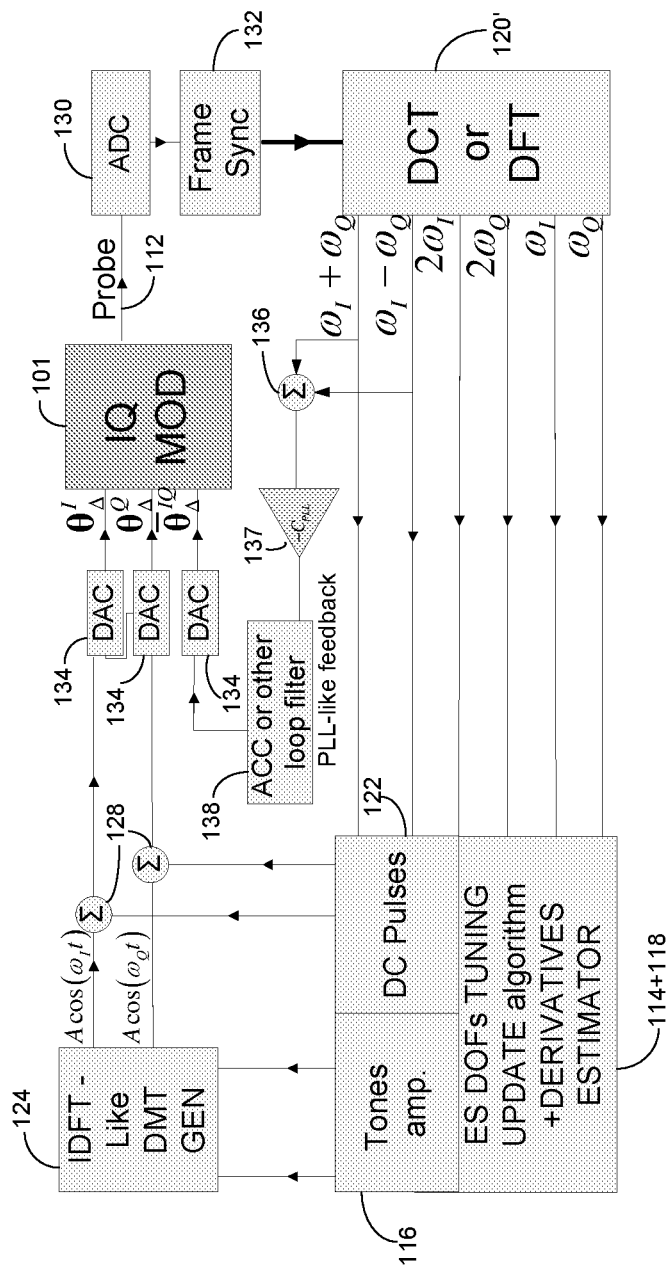
FIG. 16 illustrates a control system and a controlled system that is an IQ modulator according to an embodiment of the invention.

The block diagram of the proposed C&C controller for the IQ-MOD is presented in FIG. 16. The stabilization of this device requires D=3 tuning DOFs, namely the relative phases between the two arms of each of the two "children" Mach-Zehnder Modulators, as well as the relative phase $\phi_{IQ}$ prior to entering the final coupler combining the two children-MZM outputs (the tuning of this phase ensures lack of IQ-imbalance, i.e. the resulting I and Q components in the useful high frequency communication signals are 90 degrees out of phase).

FIG. 16 illustrates a frame synchronization unit 132 (Active during the first portion of the frame-during Tcp) that precedes DCT, wherein digital DCT unit 120' (may also be a DFT) outputs multiple signals ($\omega I+\omega Q$, $\omega I-\omega Q$, $2\omega I$, $2\omega Q$, $\omega I$ and $\omega Q$) that are fed to ES DOFs tuning update algorithm 114 and derivatives estimator 118. Two of these signals are fed to adder 136, the output of adder is fed to amplifier 137 that outputs a signal to ACC or other loop filter. The output of ACC or other loop filter 138 is fed to DAC 134.

We shall introduce a C&C methodology, consistent with the teachings of this invention, stabilizing the three tuning DOFs of the IQ-MOD just based on observing a single probe point (one of the arms of the final combining coupler of the two children) We disclose here for the first time a scheme whereby the device is simply stabilized just by dithering two of the three DOFs, namely the tuning phases $\phi_I$, $\phi_Q$ of the children MZM, by means of DMT symbols respectively comprising two orthogonal dither tones, at radian frequencies $\omega_I$, $\omega_Q$ respectively ($\omega_I$ applied to the I-MZM, $\omega_Q$ applied to the Q-MZM) whereas no dither at all is applied to the third control port for the combiner of the two children MZM, i.e., the relative phase, between the two children MZMs is just controlled by a piecewise-DC signal free of any AC dither signals.

The proposed algorithm then has its DMT analyzer monitoring, within the DCT or DFT spectrum of the single probe output, first harmonic tones at frequencies $\omega_I$, $\omega_Q$ as well second-harmonic tones at $2\omega_I$, $2\omega_Q$, $\omega_I \pm \omega_Q$, and having the C&C system perform a search in the ($\phi_I, \phi_Q$) plane in order to seek the minimum of the probe output. However, there is no need for two separate probes, but just a single probe is used on the $w_-$ monitor optical output, whereas the $w_+$ optical output is the useful broadband signal output generating the IQ complex modulation, in terms of the two modulating voltages applied to the two children MZMs. Moreover the $w_-$ probe is also used to control the combining phase between the two children MZMs.

An augmentation of the extremum-seeking strategy described heretofore is adopted here (FIG. 16): whereas the control of the ($\phi_I, \phi_Q$) DOFs is extremum-seeking, as per the teachings of this disclosure, the control of the third DOF is not an extremum-seeking one but it is rather zero-seeking control (conventional control regulation to a value, which happens to be zero here). Specifically, the sum and difference frequencies $\omega_I \pm \omega_Q$ in the probe output extracted from the DCT (or DFT) spectral outputs and the complex amplitude components at these two frequencies are coherently combined (i.e. combined in-phase to average out their noises), then the signed amplitude of this quantity is regulated to zero by means of discrete-time integral control akin to a digital Phase-Locked Loop (PLL), as described in FIG. 15, by inputting this amplitude into a discrete-time accumulator (or a more sophisticated loop filter, and feeding back the accumulator output, after scaling by a positive factor $C_{PLL}$ sign-reversal (multiplication by $-1$ required to provide negative) into the IQ-DOF, $\phi_{IQ}$. We note that this C&C controller for the IQ-MOD actually features D=3 tuning DOFs. While the I-DOF and Q-DOF $\phi_I$, $\phi_Q$ are jointly stabilized as usual, using ES techniques as taught above, the new element of the algorithm is that the IQ-DOF $\phi_{IQ}$ dither amplitude is effectively set to zero and null-seeking rather than extremum seeking control is practiced on this third DOF, all concurrently with the extremum-seeking control of the first two DOFs.

To prove that the proposed C&C algorithm indeed attains and holds its optimal operating point, we first derive an electro-optic model of the overall IQ-MOD device and then proceed to analyze the proposed algorithm IQ-MOD Electro-Optic Model Considering FIG. 15, the photonic building blocks are a splitter, with an amplitude transfer factor of $1/\sqrt{2}$ from input to output and 3-dB directional couplers, with transfer matrix $$\frac{1}{\sqrt{2}} \begin{bmatrix} 1 & j \\ j & 1 \end{bmatrix},$$

as well as uncoupled waveguide pair sections, with transfer matrix $$\frac{1}{\sqrt{2}} \begin{bmatrix} e^{j\phi_+} & 0 \\ 0 & e^{j\phi_-} \end{bmatrix} = \frac{e^{j\bar{\phi}}}{\sqrt{2}} \begin{bmatrix} e^{j\phi_\Delta} & 0 \\ 0 & e^{-j\phi_\Delta} \end{bmatrix} \quad (86)$$

where $\phi_\pm = \bar{\phi} \pm \phi_\Delta$ are expressed as $\phi_\pm = \bar{\phi} \pm \phi_\Delta$, in terms of two transformed quantities (common and difference modes): $\bar{\phi} = \frac{1}{2}(\phi_+ + \phi_-)$, $\phi_\Delta = \frac{1}{2}(\phi_+ - \phi_-)$. This decomposition of the straight waveguide sections is applied to each of the free-space waveguide sections wherein the I-DOF, Q-DOF and the IQ-DOF phase shifts are applied to just one of the two uncoupled waveguides in the pair. In this vein, let the input field to the device be normalized to unity, then the children Mach-Zehnder modulators are modeled as follows:

$$\begin{bmatrix} u_I^+ \\ u_I^- \end{bmatrix} = \frac{1}{\sqrt{2}} \begin{bmatrix} 1 & j \\ j & 1 \end{bmatrix} e^{j\overline{\phi}^I} \begin{bmatrix} e^{j\phi_\Delta^I} & 0 \\ 0 & e^{-j\phi_\Delta^I} \end{bmatrix} \frac{1}{\sqrt{2}} \begin{bmatrix} 1 & j \\ j & 1 \end{bmatrix} \begin{bmatrix} 0 \\ \frac{1}{\sqrt{2}} \end{bmatrix} \quad (87)$$

$$= \frac{1}{2\sqrt{2}} e^{j\overline{\phi}^I} \begin{bmatrix} j\cos\phi_\Delta^I \\ -\sin\phi_\Delta^I \end{bmatrix}$$

(this may be alternatively derived by following pairs of interfering paths, from the active MZM input to each of the two outputs).

Similarly, it may be shown (or inferred from the mirror symmetry of the upper and lower MZMs) that $$\begin{bmatrix} u_Q^+ \\ u_Q^- \end{bmatrix} = \frac{1}{2\sqrt{2}} e^{j\overline{\phi}^Q} \begin{bmatrix} \sin\phi_\Delta^Q \\ j\cos\phi_\Delta^Q \end{bmatrix} \quad (88)$$

From the last two equations, $$u_I^- = -\frac{1}{2\sqrt{2}} e^{j\overline{\phi}^I} \sin\phi_\Delta^I \quad (89)$$

$$u_Q^+ = \frac{1}{2\sqrt{2}} e^{j\overline{\phi}^Q} \sin\phi_\Delta^Q$$

Finally, the coupler combining the two children MZM, outputs (89) is preceded by the two uncoupled waveguides section, with a phase shifter $\phi_P$ placed on the lower arm, half of each contributes a controlled component to the overall relative phase-shift $\overline{\phi}_\Delta^{IQ}$ (difference mode) between the common phases of the two arms (this phase factor is also assumed to comprise possible structural or thermal phase imbalances between the common phases of each of the two children MZM). Half the phase-shift $\phi_P$ also contributes to the common phase $\overline{\phi}^{IQ}$ at the entrance plane of the combining coupler, but this common phase is inconsequential. Formally, expressing all quantities in terms of common and difference mode components, we have $$\phi_\pm^I = \overline{\phi}^I \pm \phi_\Delta^I \Big|_{\overline{\phi}^I = \overline{\phi}^{IQ} + \overline{\phi}_\Delta^{IQ}} = \overline{\phi}^{IQ} + \overline{\phi}_\Delta^{IQ} \pm \phi_\Delta^I \quad (90)$$

$$\phi_\pm^Q = \overline{\phi}^Q \pm \phi_\Delta^Q \Big|_{\overline{\phi}^Q = \overline{\phi}^{IQ} - \overline{\phi}_\Delta^{IQ}} = \overline{\phi}^{IQ} - \overline{\phi}_\Delta^{IQ} \pm \phi_\Delta^I$$

where, $$\overline{\phi}^{IQ} \equiv \frac{1}{2}(\overline{\phi}^I + \overline{\phi}^Q); \overline{\phi}_\Delta^{IQ} \equiv \frac{1}{2}(\overline{\phi}^I - \overline{\phi}^Q) \quad (91)$$

For a structurally and thermally symmetric layout, except the phase shift induced in the upper arm leading to the combining coupler, we have: $\overline{\phi}^{IQ} = \overline{\phi}_\Delta^{IQ} = \frac{1}{2}\phi_P$. Otherwise, there might be fixed biases in the two terms $$\overline{\phi}^{IQ} = \overline{\phi}_o^{IQ} + \frac{1}{2}\phi_P; \overline{\phi}_\Delta^{IQ} = \overline{\phi}_{\Delta o}^{IQ} + \frac{1}{2}\phi_P. \quad (92)$$

The common phase $\overline{\phi}^{IQ}$ is inconsequential to the IQ modulator operation (as it contributes an overall phase rotation of the generated complex field) but the difference-of-common-phases of the two children modulators, namely the term $\overline{\phi}_\Delta^{IQ}$ is critical in determining IQ-imbalance, which deleterious effect should be suppressed. To see this, let us express the two combining coupler outputs as follows:

$$\begin{bmatrix} w_+ \\ w_- \end{bmatrix} = \frac{1}{\sqrt{2}} \begin{bmatrix} 1 & j \\ j & 1 \end{bmatrix} \begin{bmatrix} u_I^- \\ u_Q^+ \end{bmatrix} = \frac{1}{\sqrt{2}} \begin{bmatrix} u_I^- + ju_Q^+ \\ ju_I^- + u_Q^+ \end{bmatrix} \quad (93)$$

Thus, $w_+ = u_I^- + ju_Q^+$ as expected of an IQ modulator, whereby $u_I^-, u_Q^+$ are the I and Q (real and imag) components of the complex signal output $w_+$. Expressing this signal port output in terms of (89) yields:

$$w_+ = u_I^- + ju_Q^+ \quad (94)$$

$$= \frac{1}{2\sqrt{2}} \left[ e^{j\overline{\phi}^I} \sin\phi_\Delta^I + je^{j\overline{\phi}^Q} \sin\phi_\Delta^Q \right]$$

$$= \frac{e^{j\overline{\phi}^I}}{2\sqrt{2}} \left[ e^{j\overline{\phi}^I} \sin\phi_\Delta^I + je^{j\overline{\phi}^Q} \sin\phi_\Delta^Q \right]$$

$$= \frac{e^{j\overline{\phi}^I}}{2\sqrt{2}} e^{j\overline{\phi}^I} \left[ \sin\phi_\Delta^I + je^{j(\overline{\phi}^I - \overline{\phi}^Q)} \sin\phi_\Delta^Q \right]$$

$$= \frac{e^{j\overline{\phi}^I}}{2\sqrt{2}} \left[ \sin\phi_\Delta^I + e^{j(\pi/2 + 2\overline{\phi}_\Delta^{IQ})} \sin\phi_\Delta^Q \right]$$

In this expression we should set, $$\phi_\Delta^I = \theta^{Ic}(t) + \theta^{Ienv}(t) + \beta\cos\omega_I t + \theta^{Is}(t)$$

$$\phi_\Delta^Q = \theta^{Qc}(t) + \theta^{Qenv}(t) + \beta\cos\omega_Q t + \theta^{Qs}(t)$$

$$\overline{\phi}_\Delta^{IQ} = \overline{\theta}_\Delta^{IQ}(t) + \overline{\theta}_\Delta^{IQenv} \quad (95)$$

where $\theta^{Ic}(t)$, $\theta^{Qc}(t)$ are the commanded I and Q tuning phases, $\theta^{Ienv}, \theta^{Qenv}(t)$ are the phase environmental drifts (disturbances), $\beta\cos\omega_I t$, $\beta\cos\omega_Q t$ are the two dither signals applied to the children MZM and $\theta^{Is}(t), \theta^{Qs}(t)$ are the broadband modulation signals respectively applied to these MZMs and we shall see below that we need not apply dither to $\overline{\phi}_\Delta^{IQ}$, just apply staircase-DC command to counteract the environmental disturbance $\overline{\theta}_\Delta^{IQenv}$. The objective of the optimal control in this case is to ensure that $$\theta^{Ic}(t) + \theta^{Ienv}(t) \equiv \theta^I(t) \to 0, \pm\pi$$

$$\theta^{Qc}(t) + \theta^{Qenv}(t) \equiv \theta^Q(t) \to 0, \pm\pi,$$

$$\overline{\theta}_\Delta^{IQc}(t) + \overline{\theta}_\Delta^{IQenv}(t) \equiv \overline{\theta}_\Delta^{IQ}(t) \to 0, \pm\pi \quad (96)$$

where "→0, ±π" means that the phase should be taken to any one of the values →.

Thus, three respective commanded phases should work against the environmental phase disturbances, to null out the overall phases, such that $$w_+(t) = u_I^-(t) + ju_Q^+(t) \to \quad (97)$$

$$\frac{e^{j\overline{\phi}^I}}{2\sqrt{2}} [\pm\sin(\beta\cos\omega_I t + \theta^{Is}(t)) \pm e^{j\pi/2}\sin(\beta\cos\omega_Q t + \theta^{Qs}(t))]$$

$$\cong \frac{e^{j\overline{\phi}^I}}{2\sqrt{2}} [\pm(\beta\cos\omega_I t + \theta^{Is}(t)) \pm j(\beta\cos\omega_Q t + \theta_a^{Qs}(t))]$$

$$= \frac{e^{j\overline{\phi}^I}}{2\sqrt{2}} [\pm\theta^{Is}(t) \pm j\theta^{Qs}(t) \pm \beta\cos\omega_I t \pm j\beta\cos\omega_Q t]$$

Inspecting the last expression it is apparent that once the system is stabilized as per (96), then the IQ-MOD output field envelope contains the desired $\theta^{Is}(t)+j\theta^{Qs}(t)$ broadband modulation (or closely related versions, $\pm\theta^{Is}(t)\pm j\theta^{Qs}(t)$ which should also be acceptable) and in addition, additively superposed on it, it contains two low-frequency modulation tones, which should not disturb the detection of the broadband IQ-modulated signal.

It remains to show how the stabilization indicated in (96) may be attained, by observing just the low-frequency components of the intensity at the port $w_-$. At this probe port we have:

$$w_- = ju_I^- + u_Q^+ = j(u_I^- - ju_Q^+) = jw_+^* \tag{98}$$

Expressing this probe output in terms of (89) yields:

$$w_- = ju_I^- + u_Q^+ = -\frac{1}{2\sqrt{2}} e^{j\bar{\phi}^I} j\sin\phi_\Delta^I + \frac{1}{2\sqrt{2}} e^{j\bar{\phi}^Q} \sin\phi_\Delta^Q \tag{99}$$

Now the probe intensity is $$I = |w_-|^2 \tag{100}$$

$$= |ju_I^- + u_Q^+|^2$$

$$= \left| -\frac{1}{2\sqrt{2}} e^{j\bar{\phi}^I} j\sin\phi_\Delta^I + \frac{1}{2\sqrt{2}} e^{j\bar{\phi}^Q} \sin\phi_\Delta^Q \right|^2$$

$$= \frac{1}{8}\left(\sin^2\phi_\Delta^I + \sin^2\phi_\Delta^Q + 2\mathrm{Re}\left\{-je^{j\bar{\phi}^I}\sin\phi_\Delta^I\left(e^{j\bar{\phi}^Q}\right)^*\sin\phi_\Delta^Q\right\}\right)$$

$$= \frac{1}{8}\left(\sin^2\phi_\Delta^I + \sin^2\phi_\Delta^Q + 2\sin\phi_\Delta^I\sin\phi_\Delta^Q\mathrm{Im}\left\{e^{j(\bar{\phi}^I-\bar{\phi}^Q)}\right\}\right)$$

$$= \frac{1}{8}\left(\sin^2\phi_\Delta^I + \sin^2\phi_\Delta^Q + 2\sin\phi_\Delta^I\sin\phi_\Delta^Q\sin(\bar{\phi}^I-\bar{\phi}^Q)\right)$$

or finally, $$I(\phi_\Delta^I,\phi_\Delta^Q,\bar{\phi}_\Delta^{IQ}) = \tfrac{1}{8}(\sin^2\phi_\Delta^I + \sin^2\phi_\Delta^Q + 2\sin\phi_\Delta^I\sin\phi_\Delta^Q\sin 2\bar{\phi}_\Delta^{IQ}) \tag{101}$$

This is the sought IQ-MOD model, for which we shall analyze the C&C algorithm proposed above.

Algorithm Analysis

We note that the probe intensity (101) attains its zero minimum for any the three following settings of its arguments:

$$\left(\phi_\Delta^I, \phi_\Delta^Q, \bar{\phi}_\Delta^{IQ}\right) = \begin{cases} (0, 0, \phi') \\ (\phi, \phi, -\frac{\pi}{4}) \\ (\phi, -\phi, \frac{\pi}{4}) \end{cases} \tag{102}$$

wherein $\phi,\phi'$ are arbitrary parameters and the second and third cases correspond to having $\sin(2\bar{\phi}_\Delta^{IQ}) = \sin(2(\mp\pi/4)) = \mp 1$.

In the sequel we show that practically the system converges onto the first condition in (102), and furthermore, a PLL-like feedback loop regulator will be used to take $\phi' \to 0$ i.e. the extremum-seeking system navigates to the following stable minimum-probe-intensity operation point nulling out the intensity at the $w_-$ probe port:

$$(\phi_\Delta^I, \phi_\Delta^Q, \bar{\phi}_\Delta^{IQ}) \to (0,0,0) \tag{103}$$

We note that it is this operation point which provides the correct IQ-balance condition at the $w_+$ broadband signal port, as well as maximizing the efficiency of the two children MZMs.

Let us apply sinusoidal dithers to the two children modulators as per (96) (but not to the combining phase $\phi_P$, thus just $\phi_\Delta^I, \phi_\Delta^Q$ are dithered while $\bar{\phi}_\Delta^{IQ}$ is not):

$$\phi_\Delta^I = \theta_\Delta^I(t) + \beta^I\cos\omega_I t, \phi_\Delta^Q = \theta_\Delta^Q(t) + \beta^Q\cos\omega_Q t \tag{104}$$

whereas $\bar{\phi}_\Delta^{IQ} = \bar{\theta}_\Delta^{IQ} = \bar{\theta}_\Delta^{IQc}(t) + \bar{\theta}_\Delta^{IQenv}$ is not dithered but is just applied stepwise-DC command voltages (i.e. over each DMT symbol this phase is constant). Substituting these expressions into (101) yields $$I = \tfrac{1}{8}[\sin^2(\theta_\Delta^I(t)+\beta\cos\omega_I t) + \sin^2(\theta_\Delta^Q(t)+\beta\cos\omega_Q t) + 2\sin(\theta_\Delta^I(t)+\beta\cos\omega_I t)\sin(\theta_\Delta^Q(t)+\beta\cos\omega_Q t)\sin 2\bar{\phi}_\Delta^{IQc}] \tag{105}$$

Now, assuming $\beta^I = \beta^Q \equiv \beta \ll 1$ we approximate:

$$\sin(\theta_\Delta^I(t)+\beta\cos\omega_I t) = \sin\theta_\Delta^I(t)\cos(\beta\cos\omega_I t) - \cos\theta_\Delta^I(t)\sin(\beta\cos\omega_I t) \tag{106}$$

$$\cong \sin\theta_\Delta^I(t) - \beta\cos\theta_\Delta^I(t)\cos\omega_I t$$

and similarly, $$\sin(\theta_\Delta^Q(t)+\beta\cos\omega_Q t) \cong \sin\theta_\Delta^Q(t) - \beta\cos\theta_\Delta^Q(t)\cos\omega_Q t \tag{107}$$

Note that if the condition $\beta \ll 1$ does not hold, it is possible to extend the analysis by using Bessel function expansions of expressions of the form $\sin(\phi+\beta\cos\omega t)$, however the more general Bessel-functions based analysis does not yield qualitatively different conclusions but it just changes the numerical coefficients ahead of the various functional expressions. Therefore, we proceed with the analysis under the small modulation index assumption, $\beta \ll 1$.

Substituting the last two equations into (105) and expanding the squares and multiplications yields:

$$I = \frac{1}{8}\left[(\sin\theta_\Delta^I - \beta\cos\theta_\Delta^I\cos\omega_I t)^2 + (\sin\theta_\Delta^Q - \beta\cos\theta_\Delta^Q\cos\omega_Q t)^2 + 2(\sin\theta_\Delta^I - \beta\cos\theta_\Delta^I\cos\omega_I t)(\sin\theta_\Delta^Q - \beta\cos\theta_\Delta^Q\cos\omega_Q t)\sin 2\bar{\theta}_\Delta^{IQ}\right] = \tag{108}$$

$$\frac{1}{8}\left[(\sin^2\theta_\Delta^I + \beta^2\cos^2\theta_\Delta^I\cos^2\omega_I t - \beta\sin 2\theta_\Delta^I\cos\omega_I t) + (\sin^2\theta_\Delta^Q + \beta^2\cos^2\theta_\Delta^Q\cos^2\omega_Q t - \beta\sin 2\theta_\Delta^Q\cos\omega_Q t) + 2(\sin\theta_\Delta^I\sin\theta_\Delta^{Qc} - \beta\cos\theta_\Delta^I\sin\theta_\Delta^Q\cos\omega_I t - \beta\sin\theta_\Delta^I\cos\theta_\Delta^Q\cos\omega_Q t)\sin 2\bar{\theta}_\Delta^{IQ} - 2\beta^2\cos\theta_\Delta^I\cos\theta_\Delta^Q\sin 2\bar{\theta}_\Delta^{IQc}\cos\omega_I t\cos\omega_Q t\right]$$

or $$I = \frac{1}{8}\left[\left(\sin^2\theta_\Delta^I + \beta^2\cos^2\theta_\Delta^I\left(\frac{1}{2}+\frac{1}{2}\cos 2\omega_I t\right) - \beta\sin 2\theta_\Delta^I\cos\omega_I t\right) + \left(\sin^2\theta_\Delta^Q + \beta^2\cos^2\theta_\Delta^Q\left(\frac{1}{2}+\frac{1}{2}\cos 2\omega_Q t\right) - \beta\sin 2\theta_\Delta^Q\cos\omega_Q t\right) + 2\left(\sin\theta_\Delta^I\sin\theta_\Delta^{Qc} - \beta\cos\theta_\Delta^I\sin\theta_\Delta^Q\cos\omega_I t - \beta\sin\theta_\Delta^I\cos\theta_\Delta^Q\cos\omega_Q t\right)\sin 2\bar{\theta}_\Delta^{IQ} - \beta^2\cos\theta_\Delta^I\cos\theta_\Delta^Q\sin 2\bar{\theta}_\Delta^{IQ}\sum_{\pm}\cos(\omega_I\pm\omega_Q)t\right]$$

The last equation indicates the presence of six spectral components in the probed intensity at frequencies $\omega_I, \omega_Q, 2\omega_I, 2\omega_Q, \omega_I\pm\omega_Q$. The spectral components of interest are the first harmonics, $\omega_I, \omega_Q$, of respective amplitudes $$I_{\omega_I}(t) = -\beta\sin 2\theta_\Delta^I - 2\beta\cos\theta_\Delta^I\sin\theta_\Delta^Q\sin 2\bar{\theta}_\Delta^{IQ}$$

$$I_{\omega_Q}(t) = -\beta\sin 2\theta_\Delta^Q - 2\beta\sin\theta_\Delta^I\cos\theta_\Delta^Q\sin 2\bar{\theta}_\Delta^{IQ} \tag{109}$$

the second-harmonics $2\omega_I, 2\omega_Q$, of respective amplitudes $$I_{2\omega_I}(t) = \tfrac{1}{2}\beta^2 \cos^2\theta_A^I(t), I_{2\omega_Q}(t) = \tfrac{1}{2}\beta^2 \cos^2\theta_A^Q \quad (110)$$

and the sum/difference frequencies $\omega_I \pm \omega_Q$ both at amplitude $$I_{\omega_I \pm \omega_Q}(t) = \beta^2 \cos\theta_A^I(t)\cos\theta_A^Q(t)\sin 2\bar\theta_A^{IQ}(t). \quad (111)$$

Ideally we require, as per (96), that $$\theta_A^I(t) \to 0, \theta_A^Q(t) \to 0 \text{ and } \bar\theta_A^{IQ} = 0 \quad (112)$$

in order for the IQ modulator useful signal port, $w_+$ (upper combining coupler output) to optimally perform its high-speed optical modulation function.

Stabilizing $\bar\theta_A^{IQ}$ is not being done by extremum-seeking control but rather by conventional zero-value-seeking control, amounting to tuning $\bar\theta_A^{IQ}(t)$ towards zero, as the sin 2 $\bar\theta_A^{IQ}(t)$ term is an odd function nulling out at the origin (while its amplitude factor, $2\beta^2 \cos\theta_A^I(t)\cos\theta_A^Q(t)$ scaling out the sine tends to a non-zero value, $2\beta^2$). To this end it suffices to monitor one of the spectral terms at $\omega_I \pm \omega_Q$ or preferably their sum or average and steer this term to zero by conventional feedback control $$I_{\omega_I+\omega_Q}(t) + I_{\omega_I-\omega_Q}(t) = 2\beta^2 \cos\theta_A^I(t)\cos\theta_A^Q(t)\sin 2\bar\theta_A^{IQ}(t) \to 0 \quad (113)$$

Notice that the expression above may assume any value in the range $[-2\beta^2, 2\beta^2]$, thus bringing it to zero is not characterized as conventional ES control.

The feedback control system nulling $I_{\omega_I+\omega_Q}(t) + I_{\omega_I-\omega_Q}(t)$ may be realized by feeding the two coefficients of the DCT or DFT output corresponding to frequencies $\omega_I \pm \omega_Q$ into an adder then feeding its discrete-time output into a feedback loop (in the simplest embodiment the feedback loop is just a discrete accumulator the discrete time output of which provides the l-th frame DC command $C_A^{IQ}[l]$ (the voltage corresponding to $\bar\theta_A^{IQ}[l]$) in, to be fed directly into the coupling phase tuning port (the relative phase between the children MZMs). This loop regulates $I_{\omega_I+\omega_Q}(t) + I_{\omega_I-\omega_Q}(t)$ towards zero (such that the accumulator, once fed by zero, holds its last value—but as soon as a phase disturbance is added or subtracted in, the discrete-integrator feedback system starts tracking it as its output rises or drops but is fed with negative sign into the tuning phase control, causing it to move in a sense opposing the disturbance).

This proposed feedback control for $\bar\theta_A^{IQ}[l]$ is formally equivalent to a phase-lock loop (PLL) intended to null out the sine of the phase, $\sin 2\bar\theta_A^{IQ}(t)$, The simple digital PLL approach, is illustrated in FIG. 16, feeding the sampled output of $I_{\omega_I+\omega_Q}(t) + I_{\omega_I-\omega_Q}(t)$ into a discrete-time accumulator via an appropriate scaling factor. A more general loop filter may be optionally used in lieu of the accumulator; typically this filter would have at least one pole at DC (like the accumulator does).

Finally, considering the potential interactions between the PLL control for $\bar\theta_A^{IQ}[l]$ and the ES control for $\theta_A^I(t), \theta_A^Q(t)$ we note that the PLL control would break down if the amplitude factor multiplying $\sin 2\bar\theta_A^{IQ}(t)$ were to approach zero (see (113)). However, as the extremum-seeking control navigates $\theta_A^I(t), \theta_A^Q(t)$ tends to the amplitude term, $2\beta^2 \cos\theta_A^I(t)\cos\theta_A^Q(t)$, preceding $\sin 2\bar\theta_A^{IQ}(t)$ in (113) tends to $2\beta^2$ providing sufficient gain to the PLL loop. Granted, there might be a pathological case wherein either of $\theta_A^I(t), \theta_A^Q(t)$ are momentarily equal to $$\pm\frac{\pi}{2},$$

incapacitating the PLL loop, however this condition would not persist as the ES control will drive the values of $\theta_A^I(t), \theta_A^Q(t)$ away from $$\pm\frac{\pi}{2}$$

towards their stable point at 0.

Notwithstanding, there is one "pathological" case wherein this strategy would seemingly break down, namely a specific operating point whereat the system is already at the minimum of I by virtue of the second or third conditions in (102), specifically the operating point, $$(\phi_\Delta^I, \phi_\Delta^Q, \bar\phi_\Delta^{IQ}) = (\pm\frac{\pi}{2}, \pm\frac{\pi}{2}, \pm\frac{\pi}{4}) \quad (114)$$

which realizes the minimum of (102). In this case, in the absence of noise, the ES system would ideally cease moving, as the probe intensity is already at its minimum by virtue of the last equation, but now the values $\pm\pi/2$ would null out the amplitude term $2\beta^2 \cos\theta_A^I(t)\cos\theta_A^Q(t)$ in the PLL, thus neither the ES system nor the PLL would further move and the values of the three phase tuning DOFs would not be steered to their optimum.

Fortunately, those pathological cases can be distinguished from the desired operation point by examining the hessian matrix $$H_{(\pm\frac{\pi}{2},\pm\frac{\pi}{2},\pm\frac{\pi}{4})} \propto \begin{bmatrix} 1 & 0 \\ 0 & 1 \end{bmatrix}, H_{(0,0,0)} \propto \begin{bmatrix} 0 & 0 \\ 0 & 0 \end{bmatrix}$$

or more precisely examining $h_{11} \propto I_{2\omega_I}(t)$ or $h_{22} \propto I_{2\omega_Q}(t)$. The system than move away from this undesired point and As soon as that occurs both the ES and the PLL start taking small steps further driving away from this unstable pathological minimum and entering its functional regime.

The adaptive controller, shown in the simulations to stabilize a pair of DOFs at once, is scalable to arbitrarily many tuning DOFs, providing a generic control platform for large-scale PICs with multiple inter-dependent tuning parameters.

It is expected that the novel proposed C&C algorithms are a crucial enabler for large-scale photonic integration. However, the techniques extend beyond control of PICs to extremum-seeking control of generic systems.

According to various embodiments of the invention there may be provided a control device (for example control device 10 of FIG. 1, control device 11 of FIG. 2, control device 13 of FIG. 3, control device 14 of FIG. 4, control device 16 of FIG. 10 and control device 11 of FIG. 16) for controlling a controlled system (such as system (PIC) under control 100 of FIGS. 1-4 and IQ modulator 101 of FIG. 16). The control device may include at least one input (such as inputs 171 and 172 of FIGS. 1, 2, 3, 4), multiple output ports (such as output ports 171, 172 and 173 of FIGS. 1-4), a processor and a transceiver.

In FIG. 1 the processor is illustrated as including A-DMT analyzer 120, derivative estimator 118 and tuning DOFs update ES algorithm 114.

The signal generator is illustrated as including (i) DC pulses module ("DC pulses" 122) for generating the DC components of the actuating signals and for generating the line search pulses, (ii) tone amplitude generator 116, analog DMT generator 124 and combining matrix 126 for generating the AC components of the actuating signals. Combining matrix 126 may sum multiple input AC signals from analog DMT generator 124, and (iii) adders 128 for adding, during a first phase of a frame, the AC components and DC components of the actuating signals.

Control device 11 of FIG. 2 differs from control device 10 of FIG. 1 by having a processor that includes D-DMT analyzer 120' instead of A-DMT analyzer 120. D-DMT analyzer 120' if preceded by ADCc 130. Control device 11 of FIG. 2 differs from control device 10 of FIG. 1 by having a signals generator that includes DACs 132 that are coupled between adders 128 and output ports 161, 162 and 163.

Control device 13 of FIG. 3 differs from control device 10 of FIG. 1 by not including the combining matrix 126.

Control device 14 of FIG. 4 differs from control device 11 of FIG. 2 by not including the combining matrix 126.

Figure 5:
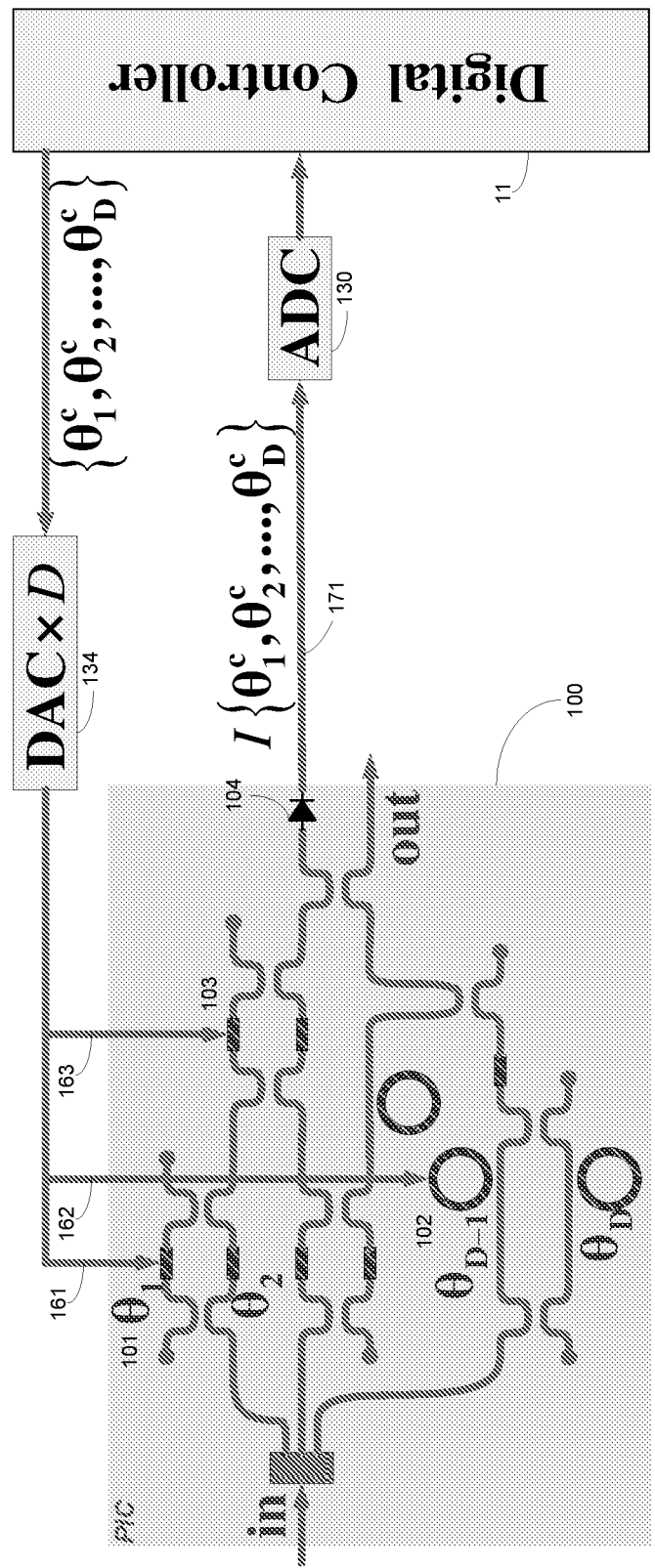
FIG. 5 illustrates a portion of a controlled system and a control system according to an embodiment of the invention.

FIG. 5 illustrates a portion of PIC 100 that includes three DOFs 101, 102 and 103 and a single probe 104 that are coupled to output ports 161, 162 and 163 (via DACc 134) and to input port 171 (via ADC 130), respectively.

Figure 6A:
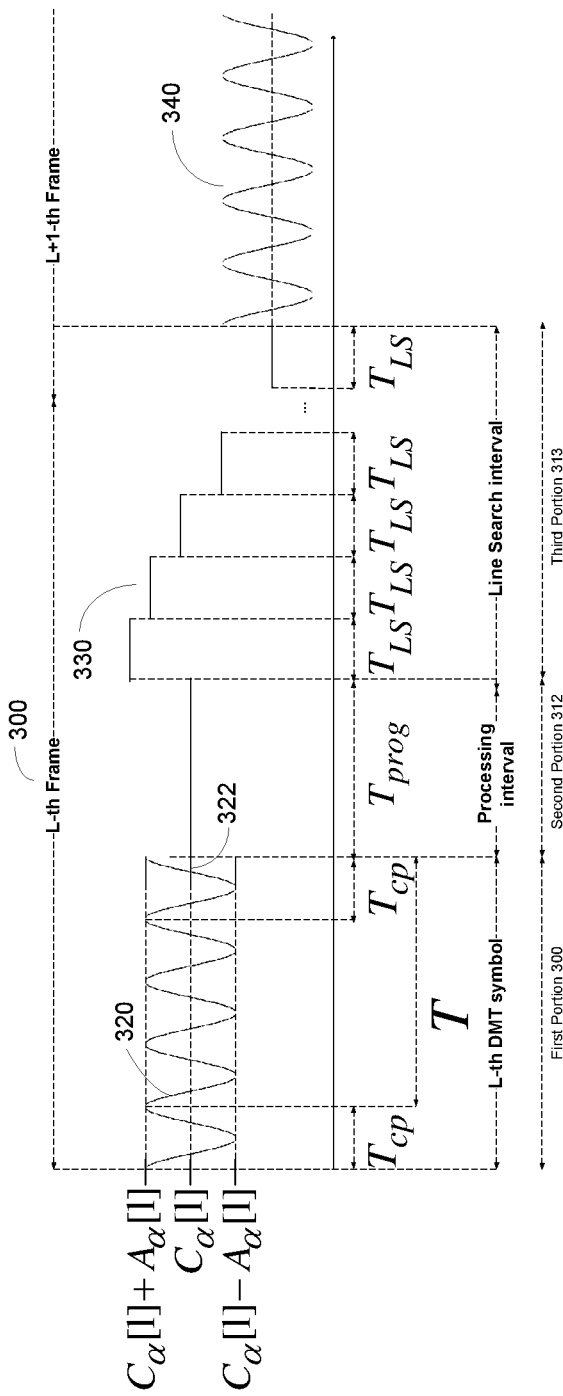
FIG. 6A illustrates signals sent during a frame according to an embodiment of the invention.
Figure 6B:
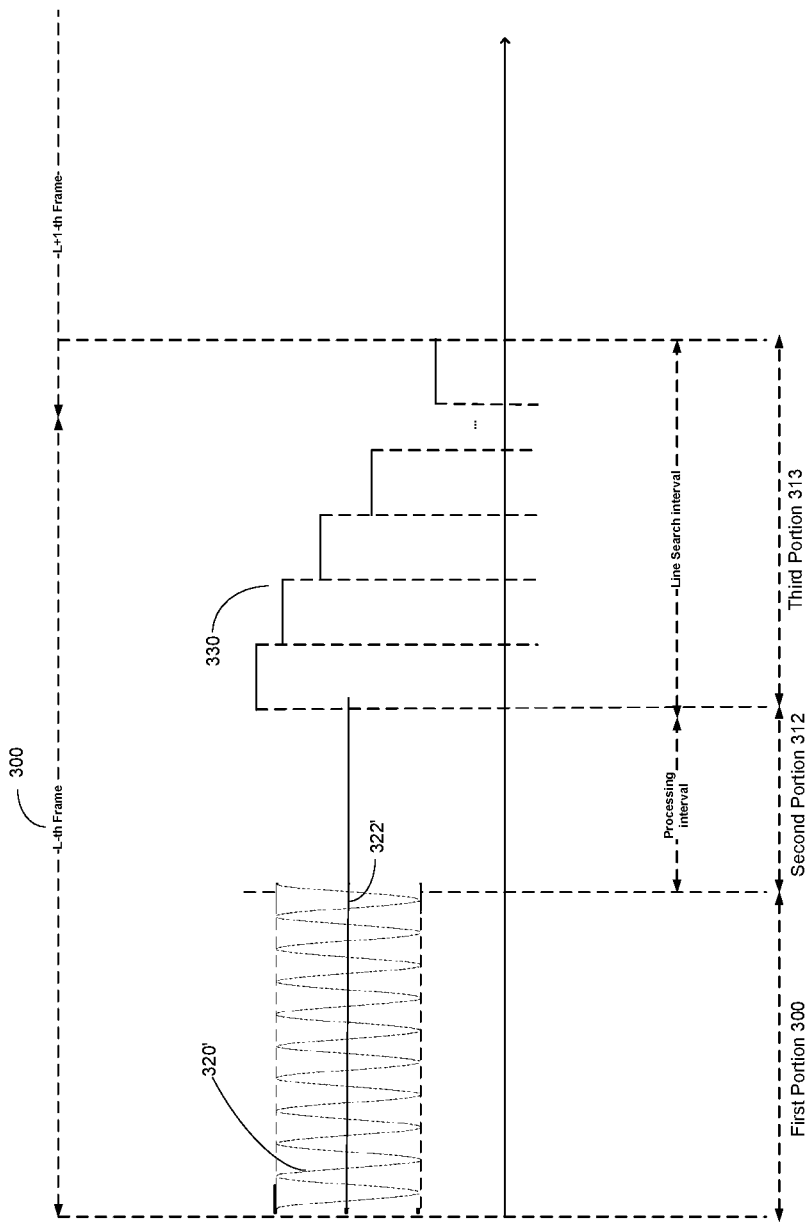
FIG. 6B illustrates signals sent during a frame according to an embodiment of the invention.

FIG. 6A is a timing diagram of signals sent via a first output port of the control device, according to an embodiment of the invention. FIG. 6B is a timing diagram of signals sent via a second output port of the control device, according to an embodiment of the invention.

The signal generator is configured to transmit, during a first portion (first phase) 310 of a frame period 300, multiple actuation signals to multiple degree of freedom (DOF) points of the controlled system.

During the first phase the actuating signal sent to the first output port of the control device includes a DC component 322 and an AC component 320 (as illustrated in FIG. 6A). During the first phase the actuating signal sent to the SECOND output port of the control device includes a DC component 322' and an AC component 320' (as illustrated in FIG. 6B).

AC component 320 is orthogonal to AC component 320'.

The processor may be configured to measure, during a first portion (phase 310) of the frame period, at least one feedback signal from at least one probe point of the controlled syst. The number of DOF points exceeds a number of the at least one probe point. For example in FIGS. 1-4 there are three DOF (and three output ports 171, 172 and 173 of the control device) and a pair of input ports 171 and 172.

The processor may be configured to determine, during the second portion (phase 312) of the frame period, based upon the at least one feedback signal, values of line search pulses to be sent to the multiple DOF points during at least one line search iteration.

The signal generator and the processor may be configured to participate in a performing, during a third portion of the frame period, of the at least one line search iteration. In FIGS. 6A and 6B line search pulses of descending level 330 and 330' are sent to the first and second output ports respectively.

Reference numbers 340 and 340' refer to AC components of actuating signals sent during the next frame.

The determining of the values of the line search pulses may be responsive to a value of a multidimensional function that represents a relationship between at least one state of the at least one probe point and multiple states of the multiple DOF points.

The performing, during the third portion of the frame period, the at least one line search iteration may include searching for an extremum of the multidimensional function. This may involve applying an ES algorithm.

The control device wherein the determining of the values of line search pulses to be sent to the multiple DOF points during the at least one line search iteration may be responsive to second derivatives of the multidimensional function. The derivatives (first derivatives, second derivatives and the like) may be calculated by the derivatives estimator 118.

FIG. 17 illustrates method 800 according to an embodiment of the invention.

Method 800 may start by step 810 of transmitting multiple actuation signals to multiple degree of freedom (DOF) points of the controlled system. The multiple actuation signals includes multiple alternating current (AC) components that are mutually orthogonal. Step 810 may also include measuring at least one feedback signal from at least one probe point of the controlled system. A number of DOF points of the controlled system exceeds a number of the at least one probe point.

The multiple AC components of the multiple actuation signals may be sinusoidal waves, may be non-sinusoidal waves, may be rectangular signals, and the like.

Step 810 may include comprising determining the multiple actuation signals transmitted to the multiple DOF points of the controlled system.

Step 810 may include generating the multiple AC components by summing (for example by combining matrix 126 of FIGS. 1 and 2) a plurality of input AC components. The input AC components (fed to the combining matrix) are mutually orthogonal.

Step 810 may be followed by step 820 of determining based upon the at least one feedback signal, values of line search pulses to be sent to the multiple DOF points during at least one line search iteration.

Step 820 may include determining the values of the line search pulses is responsive to a value of a multidimensional function that represents a relationship between at least one state of the at least one probe point and multiple states of the multiple DOF points.

Step 820 may be followed by step 830 of performing, the at least one line search iteration.

Step 830 may include performing a back tracking line search iteration.

Step 830 may include performing a forward tracking line search iteration.

Step 830 may include searching for an extremum of the multidimensional function.

Step 830 may include performing a predefined number of line search iterations regardless of the outcome of the line search iterations. Alternatively, step 830 may include stopping (before completion) the line search iterations in response to an outcome of at least one line search iteration.

Step 830 may be followed by step 840 of determining whether to perform a next iteration of steps 810, 820 and 830.

If so—jumping to step 810. The value of the actuation signals provided during a next iteration of step 810-830 may be determined based upon the outcome of step 830 of the current iteration of steps 810-830.

Step 840 may be responsive to a number of iterations that should be executed, to an outcome of one or more iterations of steps 810-830 or to a combination of both.

Step 840 may include determining to execute a next iterations of steps 810-830 in response to a failure of the at least one line search iteration to place the controlled system at an optimum operating point.

Each iteration of steps 810-830 may be executed during a frame period. Multiple iterations of steps 810-830 may be executed during multiple frame periods. The multiple frame periods may be spaced apart from each other or form a continuous sequence of frame periods.

The controlled system may be a photonic integrated circuit (PIC) or any other system.

The searching for the extremum of the multidimensional function may include determining a descent direction of the multidimensional function.

The searching for the extremum of the multidimensional function may include selecting between different types of descent direction determinations.

Step 820 may be responsive to at least one of the first and second derivatives of the multidimensional function.

Method 800 may include step 805 of learning, during a calibration phase, a transfer function between at least one input port and multiple output ports of the control device, wherein the multiple actuation signals are provided via the multiple output ports of the control device and wherein the at least one feedback signal is received via the at least one input port of the control device. See, for example, FIG. 10). Step 820 of determining of the values of line search pulses is responsive to the transfer function.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for controlling a controlled system by a control device, the method comprises: transmitting multiple actuation signals to multiple degree of freedom (DOF) points of the controlled system; wherein the multiple actuation signals comprise multiple alternating current (AC) components that are mutually orthogonal; measuring at least one feedback signal from at least one probe point of the controlled system; wherein a number of DOF points of the controlled system exceeds a number of the at least one probe point; determining based upon the at least one feedback signal, values of line search pulses to be sent to the multiple DOF points during at least one line search iteration; and performing, the at least one line search iteration.

2. The method according to claim 1 wherein the transmitting of the multiple actuation signals occurs during a first portion of a frame period; wherein the determining occurs during a second portion of the frame period and the performing of the at least one line search iteration occurs during a third portion of the frame period.

3. The method according to claim 1 wherein the controlled system is a photonic integrated circuit.

4. The method according to claim 1 wherein the at least one line search iteration is a back tracking line search iteration.

5. The method according to claim 1 wherein the at least one line search iteration is a forward tracking line search iteration.

6. The method according to claim 1 further comprising deciding to repeat the transmitting, the measuring, the determining and the preforming during a next frame period upon a failure of the at least one line search iteration to place the controlled system at an optimum operating point.

7. The method according to claim 1 comprising repeating the transmitting, the measuring, the determining and the preforming during multiple frames.

8. The method according to claim 1 wherein the determining of the values of the line search pulses is responsive to a value of a multidimensional function that represents a relationship between at least one state of the at least one probe point and multiple states of the multiple DOF points.

9. The method according to claim 8 wherein the performing of the at least one line search iteration comprises searching for an extremum of the multidimensional function.

10. The method according to claim 9 wherein the searching for the extremum of the multidimensional function comprises determining a descent direction of the multidimensional function.

11. The method according to claim 8 wherein the searching for the extremum of the multidimensional function comprises selecting between different types of descent direction determinations.

12. The method according to claim 8 wherein the determining of the values of line search pulses to be sent to the multiple DOF points during the at least one line search iteration is responsive to at least one of the first and second derivatives of the multidimensional function.

13. The method according to claim 1 wherein the multiple actuation signals comprise the multiple AC components.

14. The method according to claim 1 wherein the multiple AC components of the multiple actuation signals are sinusoidal waves.

15. The method according to claim 1 wherein the multiple AC components of the multiple actuation signals are not sinusoidal waves.

16. The method according to claim 1 wherein the multiple AC components of the multiple actuation signals are rectangular signals.

17. The method according to claim 1, comprising determining the multiple actuation signals transmitted to the multiple DOF points of the controlled system.

18. The method according to claim 1 comprises learning, during a calibration phase, a transfer function between at least one input port and multiple output ports of the control device, wherein the multiple actuation signals are provided via the multiple output ports of the control device and wherein the at least one feedback signal is received via the at least one input port of the control device.

19. The method according to claim 18, wherein the determining of the values of line search pulses is responsive to the transfer function.

20. The method according to claim 1 comprising generating the multiple AC components by summing a plurality of input AC components; wherein the input AC components are mutually orthogonal.

21. A control device for controlling a controlled system, wherein the control device comprises at least one input, multiple output ports, a processor and a signal generator; wherein the signal generator is configured to transmit multiple actuation signals to multiple degree of freedom (DOF) points of the controlled system; wherein the multiple actuation signals comprise multiple alternating current (AC) components that are mutually orthogonal; wherein the processor is configured to measure at least one feedback signal from at least one probe point of the controlled system; wherein a number of DOF points of the controlled system exceeds a number of the at least one probe point; wherein the processor is configured to determine, based upon the at least one feedback signal, values of line search pulses to be sent to the multiple DOF points during at least one line search iteration; and wherein the signal generator and the processor are configured to participate in a performing, of the at least one line search iteration.

22. A non-transitory computer readable medium that stores instructions that once executed by a control device cause the control device to execute the steps of: transmitting multiple actuation signals to multiple degree of freedom (DOF) points of the controlled system; wherein the multiple actuation signals comprise multiple alternating current (AC) components that are mutually orthogonal; measuring at least one feedback signal from at least one probe point of the controlled system; wherein a number of DOF points exceeds a number of the at least one probe point;

determining, based upon the at least one feedback signal, values of line search pulses to be sent to the multiple DOF points during at least one line search iteration; and performing the at least one line search iteration.

23. The non-transitory computer readable medium of claim 22 wherein the transmitting of the multiple actuation signals occurs during a first portion of a frame period; wherein the determining occurs during a second portion of the frame period and the performing of the at least one line search iteration occurs during a third portion of the frame period.

* * * * *